United States Patent [19]

Hirosaki et al.

[11] 4,392,220

[45] Jul. 5, 1983

[54] MODEM TO BE COUPLED TO A DIRECTIONAL TRANSMISSION LINE OF AN SS MULTIPLEX COMMUNICATION NETWORK

[75] Inventors: Botaro Hirosaki; Satoshi Hasegawa, both of Tokyo, Japan

[73] Assignee: Nippon Electric Co., Ltd., Tokyo, Japan

[21] Appl. No.: 264,163

[22] Filed: May 15, 1981

[30] Foreign Application Priority Data

| May 30, 1980 | [JP] | Japan | 55-72352 |
| Jun. 3, 1980 | [JP] | Japan | 55-74468 |
| Jun. 3, 1980 | [JP] | Japan | 55-74469 |
| Jun. 3, 1980 | [JP] | Japan | 55-74470 |
| Nov. 21, 1980 | [JP] | Japan | 55-164344 |
| Feb. 3, 1981 | [JP] | Japan | 56-14884 |
| Feb. 3, 1981 | [JP] | Japan | 56-14885 |

[51] Int. Cl.³ .................... H03K 13/01; H04J 11/00; H04J 13/00
[52] U.S. Cl. .................................... 370/18; 370/19
[58] Field of Search .............. 370/18, 19, 20, 21, 370/22, 77, 78, 79; 375/38, 39, 100, 103; 364/572; 455/12, 19

[56] References Cited

U.S. PATENT DOCUMENTS 4,281,409  7/1981  Schneider ........................... 370/18
4,293,953 10/1981  Gutleber ............................. 370/18
4,301,530 11/1981  Gutleber ............................. 370/18

Primary Examiner—Thomas A. Robinson
Attorney, Agent, or Firm—Sughrue, Mion, Zinn, Macpeak and Seas

[57] ABSTRACT

In an SS (spread spectrum) modem, a high-pass filter (81) for rejecting a low frequency component including an information signal received by demodulation, produces an SS signal component modified by a PN (pseudo noise) code sequence used for the demodulation. A multiplier (82) substantially regenerates the SS signal component. Band division may be resorted to, in which case an input filter (161) selects a partial band SS signal for the demodulation. A transit filter (164) rejects the partial band SS signal. An SS signal is sent to a destination modem through one of output filters (162) selected for the destination modem. Each generator (67, 71) may generate a PN code sequence given by a product of PN codes, one having a frame period equal to an integral multiple (unity allowed) of the PN clock period of another. Each partial band may be about 1/5 of the entire frequency band of the PN code sequence. A center portion of the band may be used in transmitting a narrow-band synchronizing signal. In a band division network, the highest partial band may be used for an SS (multiplex) signal and other partial bands, collectively for a baseband TDM signal.

26 Claims, 37 Drawing Figures

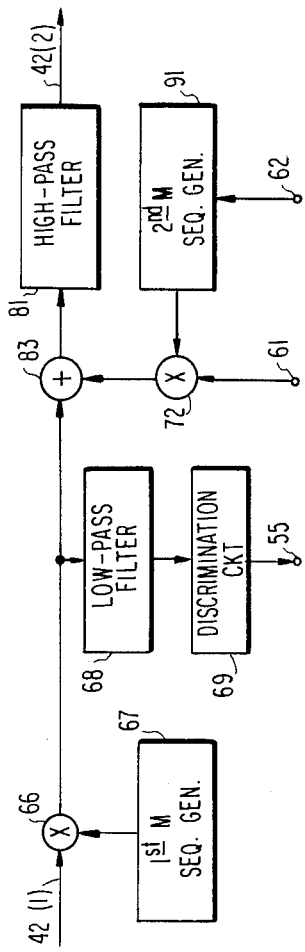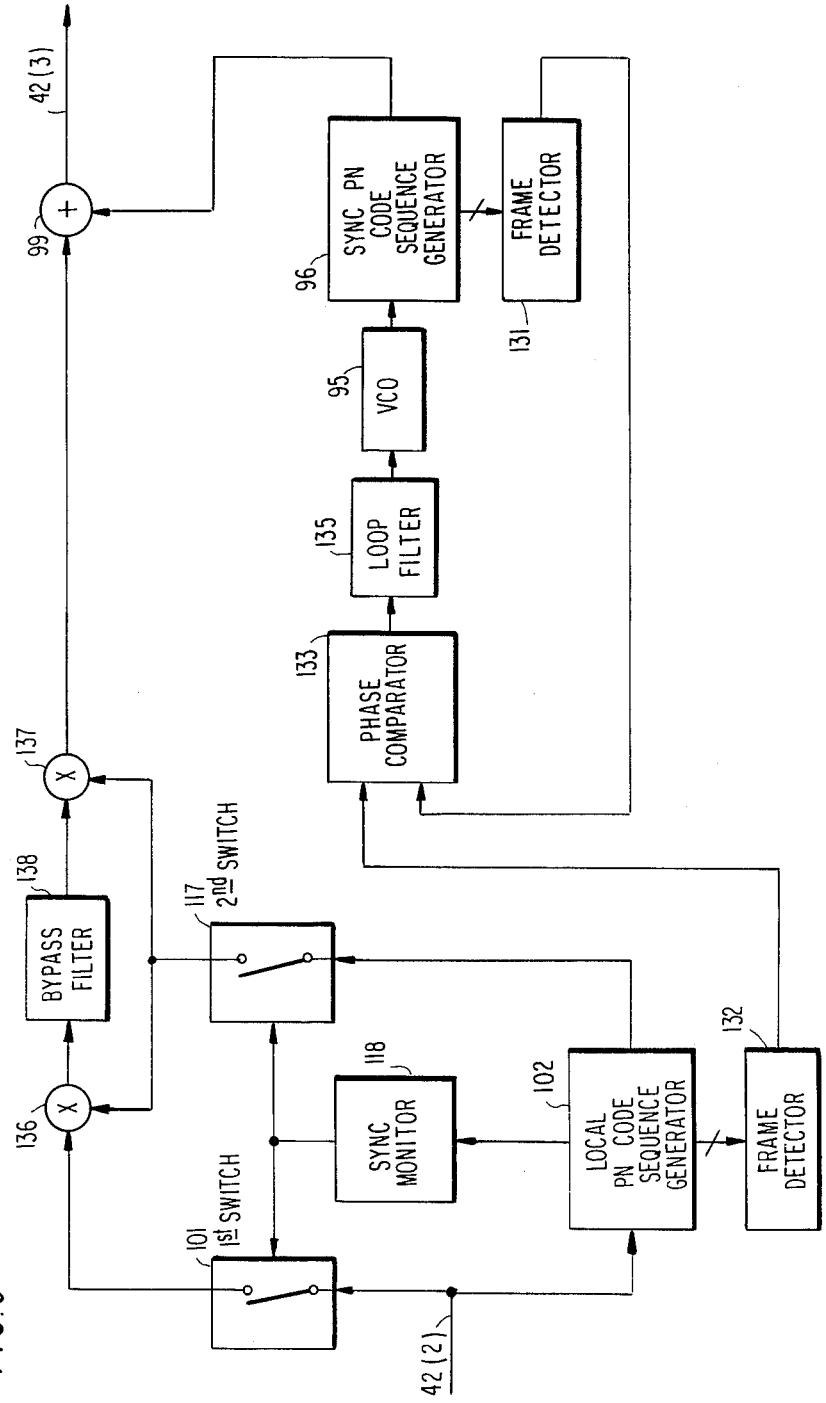

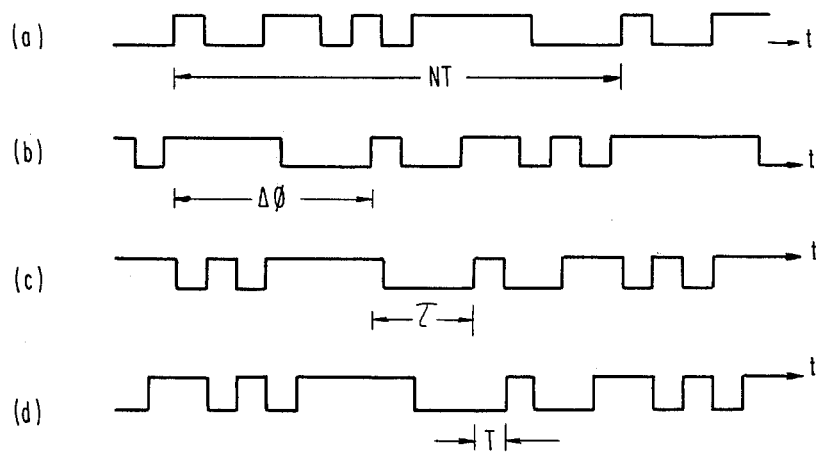
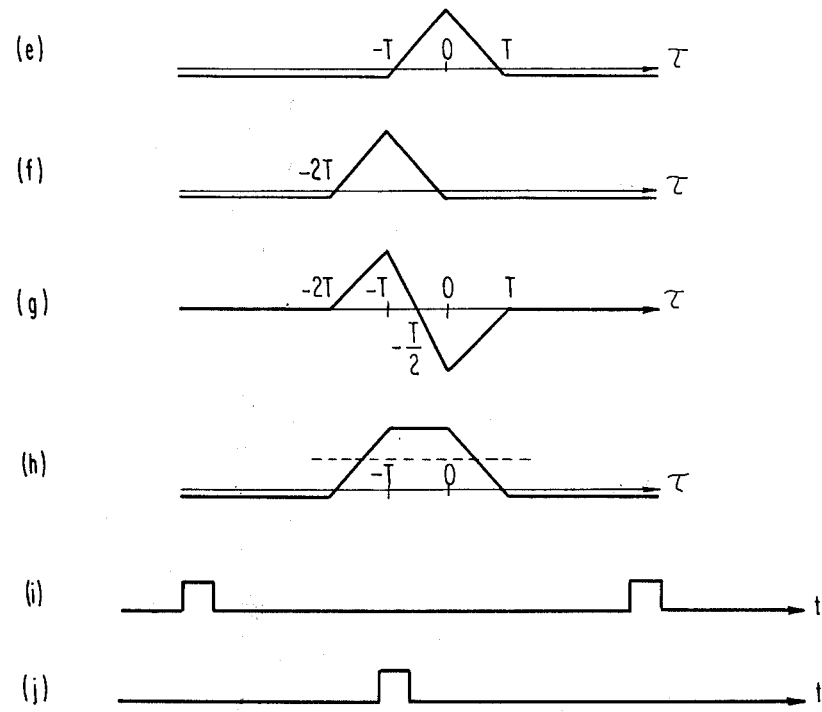
FIG.10
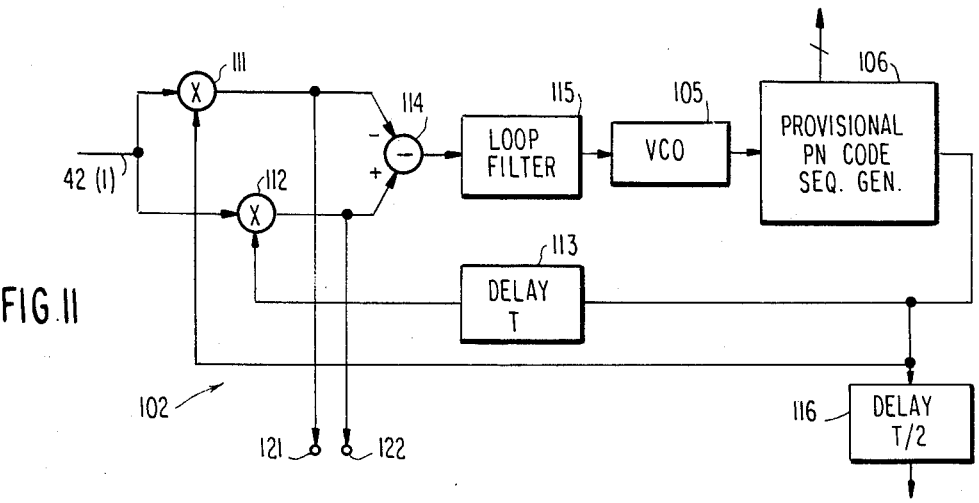
FIG.11

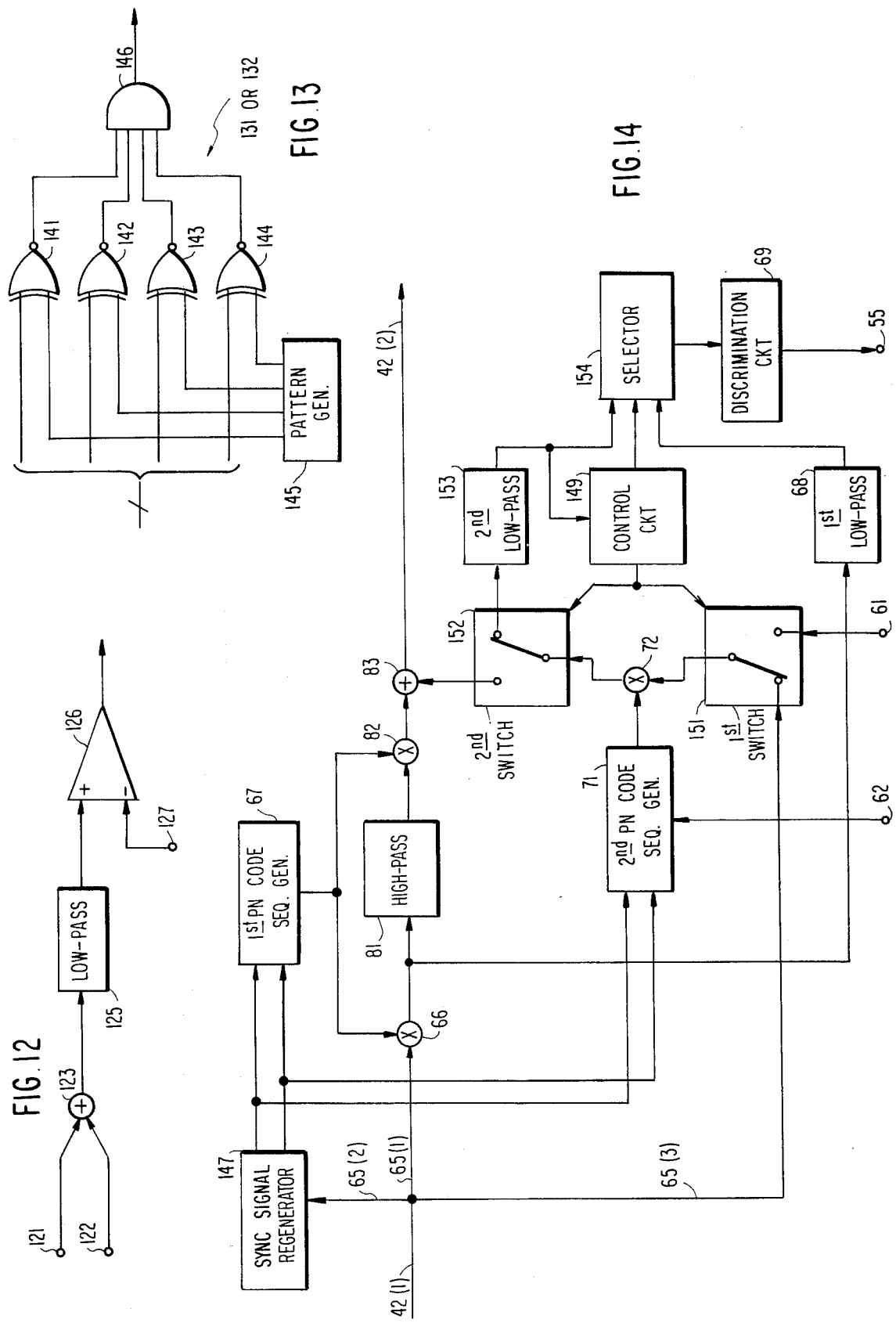

(a)
(b)
(c)
(d)
(e)

MODEM TO BE COUPLED TO A DIRECTIONAL TRANSMISSION LINE OF AN SS MULTIPLEX COMMUNICATION NETWORK

BACKGROUND OF THE INVENTION

This invention relates to a modem for use in a spread spectrum (often abbreviated in the art to SS) multiplex communication network comprising a directional or directive transmission line or bus as, for example, a closed-loop or closed-circuit transmission line. A modem will be called a transmitter-receiver as the case may be.

An SS multiplex communication network comprises a transmission line capable of transmitting an SS multiplex signal. The transmission line may be of the form of a closed loop or may have two ends. A plurality of modems are coupled to the transmission line. Generally speaking, the modems carry out transmission and reception of information signals, such as speech, data, and/or picture signals, with the spectra thereof spread by pseudorandom or pseudo noise (usually abbreviated to PN) code sequences. For this purpose, a plurality of PN code sequences may preliminarily be assigned or allotted to the respective modems. Each PN code sequence is a pseudorandom succession of unit pulses, positive and negative, of a considerably high PN code sequence generating clock (briefly, PN clock) rate. A PN code of a relatively large number of such pulses is repeatedly used in the PN code sequence. The period of repetition will herein be named a frame period. When expressed by the number of pulses or bits, the frame period will be referred to as a frame length.

On transmitting a transmission information signal from an originating modem to a destination modem, a PN code sequence is modulated by the information signal into an SS signal and sent through the transmission line. As will later be described more in detail, the PN code sequence used as a modulation carrier is usually the PN code sequence assigned to the destination modem. No severe restriction is imposed on the information signal except that the information signal should have a data clock rate appreciably lower than the PN clock rate as will presently be described if the information signal is a digital signal. Merely by way of example, the information signal may be a PCM (pulse code modulated) signal having a data clock rate of 64 kHz. When the PN and the data clock rates are denoted by $f_0$ and $f_D$ and the frame length, by N, the restriction is such that the data clock rate $f_D$ should not be higher than the PN clock rate divided by the frame length $f_0/N$. A typical PN clock rate is 8.13 MHz for a frame length of one hundred and twenty-seven bits. The PN clock rate may be as high as several hundred megahertzes.

Other modems may concurrently supply SS signals to the transmission line. Inasmuch as such SS signals are multiplexed into an SS multiplex signal carried by different PN code sequences, the SS multiplex communication technique or scheme is often called a code division multiplex communication technique. At the destination modem, the SS multiplex signal is demodulated into a received information signal. Briefly speaking, the demodulation is carried out by correlating the SS multiplex signal to the PN code sequence assigned to the destination modem. The received information signal is a reproduction of the transmission information signal. The modems, which thus carry out SS modulation and demodulation, will be named SS modems.

In a conventional multiplex communication network, such as a TDM (time division multiplex) communication network, a certain number of channels are used in multiplexing information signals. The number of channels is predetermined in consideration of traffic in the network and is usually less than the number of modems accommodated by the network. Even when a call is initiated by a modem towards a destination modem, which is idle, the connection for the call is not established when all channels are busy. In other words, call loss is inevitable.

In an SS multiplex communication network, the transmission line must be capable of transmitting signals of a wide or broad frequency band because the information signals are spectrum spread by the PN code sequences into a frequency band between a substantially zero clock rate and the PN clock rate. The transmission line should therefore be, for example, a coaxial cable or an optical fiber. On the other hand, the SS multiplex signal has a small spectral energy density. Furthermore, the SS multiplex signal is little affected by narrow-band interference and provides a received information signal with an excellent SN (signal-to-noise) ratio. Theoretically, no call loss occurs in an SS multiplex communication network. A conventional SS multiplex communication network insures high secrecy of communication. An SS modem is compact. Power consumption is accordingly little. An SS modem is reliably operable unless the transmission line is closed.

The SS multiplex communication network has, however, been inconvenient when the transmission line forms a closed loop. This is because the information signal carried by a modulation PN code sequence repeatedly circulates through the closed-loop transmission line even after reception at a destination modem. It is therefore urgently required to provide an SS modem to be coupled to a closed-loop transmission line of an SS multiplex communication network.

A typical PN code sequence is a repetition of maximum length sequence (hereafter abbreviated to M sequence) codes. Such a repetition will herein be referred to merely as a maximum length code sequence or, more briefly, as an M sequence. As will later be described with reference to one of nearly forty figures of the accomapnying drawing, an M sequence is generated by an M sequence generator by the use of M sequence or PN code sequence generating clocks in compliance with a generating polynomial. For example, an M sequence code is a succession of fifteen bits of plus and minus unity, such as $(+--++-+-++++---)$. When the frame length is thus fifteen bits long, there are three different M sequence codes generated by common PN code sequence generating clocks in compliance with three different generating polynomials, respectively. It is therefore possible to make an SS multiplex communication network accommodate three SS modems. When the frame length is one hundred and twenty-seven bits long, the number of accommodated SS modems increases to eighteen. The number is still small for practical purposes.

An article was distributed 1979 at a meeting of a technical group of the Institute of Electronics and Communication Engineers of Japan and read by Haruo Ogiwara et al. under the title of "Syûhasû Kakusan ni yoru Kanyûsya-kei Syûsen Tazyuka Hôsiki no Teian"

(Technical Report No. SE79-104). The article is available only in Japanese except for the title, which reads in English "Subscriber Network Using Spread Spectrum Technique" according to the authors. In the article, as SS multiplex communication network is disclosed in which the SS modems, such as line concentrators of an exchange network, are assigned with M sequences generated by common PN code sequence generating clocks in compliance with different generating polynomials and cyclically bit shifted. When cyclically bit shifted, an M sequence having a frame length of N bits gives N different M sequences, a zero-bit-shifted M sequence inclusive. It may therefore appear that the number of accommodated SS modems will increase to (127×18) when cyclically bit shifted M sequences of one-hundred-and-twenty-seven-bit long M sequence codes are used as the different PN code sequences. As discussed in the article and will briefly described hereinafter, a typical number of SS modems is only three hundred and eighty-one under the circumstances. It is therefore desirable more to increase the number of SS modems accommodated in an SS multiplex communication network.

The reason why it is not practical to accommodate (127×18) modems, mainly resides in the fact that interference occurs between channels to a considerable extent. Use of M sequences derived by cyclically bit shifting a single M sequence is preferred as regards the interchannel interference. It is possible to specify such M sequences as M sequences generated by clocks having a predetermined clock period in compliance with a single generating polynomial and with different initial values or conditions, respectively. For PN code sequences, what corresponds to the generating polynomial is theoretically a generating or characteristic function. In practice, each PN code sequence has a certain frame period. It would therefore be feasible depending on the circumstances to use, instead of such M sequences, PN code sequences generated by clocks having a predetermined clock period in compliance with a single generating polynominal and with different initial values. respectively.

The SS modems may deal with information signals of different data clock rates. SS signals are derived with much redundancy when information signals of lower data clock rates are SS modulated by the use of PN code sequences for the highest data clock rate. In other words, it would be possible to increase the number of accommodated SS modems if the PN code sequences are more effectively used.

When cyclically bit shifted PN code sequences are used, it becomes necessary to use a synchronizing signal in establishing frame synchronism among the SS modems. In an SS multiplex communication network comprising a closed-loop transmission line, the frame synchronism must be established as correctly as possible with a simplest possible synchronizer despite circulation of the synchronizing signal through the closed-loop transmission line.

On sending an information signal to a destination SS modem, it is desirable to preliminarily know whether or not the destination SS modem is already busy. It is therefore necessary in practice to carry out carrier sensing of sensing whether the PN code sequence used by the destination modem in modulating an information signal is present or absent in the SS signal reaching the SS modem going to initiate the call. It is also desirable depending on the circumstances to furnish as SS multiplex communication network with a broadcasting facility. Such augmentation of services would render the SS modem bulky and accordingly expensive. Power consumption will increase.

As described before, an SS multiplex signal is correlation detected into received information signals of a high SN ratio. Although no call loss theoretically occurs as pointed out also before, the quality of the reproduced information signals degenerates due to the interchannel interference if a great number of information signals are multiplexed into the SS multiplex signal. Data and/or picture signals generally have a large duty cycle, namely, last a considerably long interval of time. In addition, high transmission performance is mandatory on dealing with data and/or picture signals. It is therefore desirable that an SS multiplex communication network be capable of dealing with data and/or picture signals with excellent transmission performance.

SUMMARY OF THE INVENTION

It is therefore a principal object of the present invention to provide a modem for use in an SS multiplex communication network comprising a directional transmission line, such as a closed-loop transmission line, by which it is possible to avoid circulation through the transmission line of an SS signal carrying an information signal received by the modem.

It is a subordinate object of this invention to provide an SS modem of the type described, with which the network is enabled to accommodate an astonishingly increased number of SS modems.

It is another subordinate object of this invention to provide an SS modem of the type described, with which is is possible to effectively deal with information signals of different data clock rates and consequently to increase the number of SS modems accommodated by the network to quite an unexpected extent.

It is still another subordinate object of this invention to provide an SS modem of the type described, with which frame synchronism is established as correctly as possible without much complicating the circuitry of a frame synchronizer.

It is a further subordinate object of this invention to provide a compact and economical SS modem of the type described, by which it is possible to sense whether or not a destination SS modem is already busy.

It is a still further subordinate object of this invention to provide a compact and economical SS modem of the type described, with which it is possible to furnish the network with a broadcasting facility.

It is a yet further subordinate object of this invention to provide an SS modem of the type described, with which the network is enabled to concurrently deal with a TDM signal to provide excellent transmission performance for data and/or picture signals.

A transmitter-receiver to which this invention is applicable, is for use in a spread spectrum multiplex communication network comprising a directional transmission line and a plurality of modems coupled to the transmission line. The transmitter-receiver is comprised by each of the modems to be responsive to a first spread spectrum signal received from the transmission line and comprising a spread spectrum signal into which a first of a plurality of different pseudo noise code sequences is modulated by a particular information signal for reproducing the particular information signal and to be responsive to a transmission information signal for supplying the transmission line with a second spread spectrum signal comprising a spread spectrum signal into which a second of the pseudo noise code sequences is modulated by the transmission information signal. It is possible to specify the transmitter-receiver as including reception spread spectrum signal producing means responsive to the first spread spectrum signal for producing a reception spread spectrum signal, pseudo noise code sequence generating means for generating at least one of the different pseudo noise code sequences as the first and the second pseudo noise code sequences, first multiplying means for multiplying the reception spread spectrum signal by the first pseudo noise code sequence generated by the pseudo noise code sequence generating means to produce a first multiplied signal, low frequency component extracting means for extracting a low frequency component from the first multiplied signal to produce a low frequency signal, means responsive to the low frequency signal for producing the particular information signal, second multiplying means for multiplying an input signal by the second pseudo noise code sequence generated by the pseudo noise code sequence generating means to produce a second multiplied signal, transmission information signal supplying means for supplying the transmission information signal to the second multiplying means as the input signal, and means responsive to a transmission spread spectrum signal for producing the second spread spectrum signal.

According to this invention, the above-specified transmitter-receiver comprises combining means for combining the first and the second multiplied signals into the transmission spread spectrum signal with the low frequency component rejected from the first multiplied signal.

As will become clear as the description proceeds, the reception spread spectrum signal may be the first spread spectrum signal as it stands. When the network comprises an exchange facility, one and the same pseudo noise code sequence assigned to the modem under consideration may be used in common as the first and the second pseudo noise code sequences. Otherwise, it is preferred that the pseudo noise code sequence generating means should comprise first and second pseudo noise code sequence generating means for generating two pseudo noise code sequences, respectively. One is for use as the first pseudo noise code sequence and the other, as the second pseudo noise code sequence.

When the directional transmission line comprises a closed-loop transmission line, it is preferred that different pseudo noise code sequences be preliminarily assigned to those specific ones of the modems which are coupled to the closed-loop transmission line. If the transmitter-receiver is comprised by one of the specific modems, the first pseudo noise code sequence is preferably the pseudo noise code sequence assigned to the modem under consideration. If the destination modem is also one of the specific modems, the second pseudo noise code sequence may be the pseudo noise code sequence assigned to the destination modem.

According to an aspect of this invention, the transmitter-receiver is for use in each of the specific modems irrespective of the above-described specific assignment of the pseudo noise code sequences. In this event, the combining means comprises low frequency component rejecting means for rejecting the low frequency component from the first multiplied signal to produce a low frequency component rejected signal, third multiplying means for multiplying the low frequency component rejected signal by the first pseudo noise code sequence generated by the pseudo noise code sequence generating means to produce a third multiplied signal, and adding means for adding the second and the third multiplied signals into the transmission spread spectrum signal.

When a bit and a frame synchronizing signal are caused to circulate from a synchronizer through a closed-loop transmission line, the bit and the frame synchronizing signals would return to the synchronizer out of synchronism with the sent out bit and frame synchronizing signals. It is convenient in practice to use as the frame synchronizing signal a synchronizing pseudo noise code sequence generated with a predetermined frame period and a predetermined initial value. The predetermined frame period is usually equal to the frame period of the demodulating and the modulating pseudo noise code sequences and is considerably long. Due to the considerable length, specific attention should be directed to frame synchronism of the synchronizing pseudo noise code sequence. The frame synchronism fluctuates due to a variation in the ambient temperature of the transmission line. It has now been confirmed that a usual voltage controlled oscillator may be used in generating the pseudo noise code sequence generating clocks. The transmitter-receiver therefore comprises a controllable pseudo noise code sequence generator for generating the synchronizing pseudo noise code sequence with a controllable pseudo noise code sequence generating clock period. The synchronizing pseudo noise code sequence thereby generated has a controllable frame phase. Although the predetermined frame period is accordingly controlled, it is possible to understand that the frame period is so predetermined. The synchronizing pseudo noise code sequence returns to the synchronizer with a delayed frame phase. The controllable frame phase is synchronized to the delayed frame phase.

On carrying out carrier sensing, the reception spread spectrum signal is preferably supplied to the second multiplying means as the input signal. When the destination modem is idle, the second multiplied signal has a substantially zero amplitude. On receiving a broadcast information signal, the reception spread spectrum signal is again supplied to the second multiplying means. The second multiplied signal provides a reproduction of the broadcast information signal. The transmission information signal may either be for reception by one of the modems that is preselected as a destination modem or a braodcast information signal to be sent from the modem in question to other modems of the network.

The different pseudo noise code sequences are usually generated by clocks having a predetermined clock period in compliance with a single generating polynomial with different initial values, respectively. The predetermined clock period defines a predetermined frequency band.

According to another aspect of this invention, the predetermined frequency band is made to comprise first through I-th partial frequency bands having a substantially common partial bandwidth and not substantially overlapping each other, where I represents a predetermined integer greater than unity. The modems are classified into first through I-th groups, each group consisting of at least two of the modems. The first through the I-th partial frequency bands are allotted to the first through the I-th groups, respectively. Different ones of the different pseudo noise code sequences are assigned to the respective modems in each group. Let it now be presumed that the transmitter-receiver is comprised by a modem in a group allotted with a predetermined one of the partial frequency bands and that a destination modem is in a group allotted with a preselected one of the partial frequency bands. Let it furthermore be assumed that the first spread spectrum signal comprises a particular spread spectrum component in the predetermined partial frequency band. The reception spread spectrum signal producing means should comprise means for extracting the particular spread spectrum component from the first spread spectrum signal as the reception spread spectrum signal. The combining means should comprise first through I-th filters having passbands at the first through the I-th partial frequency bands, respectively, means for selecting one of the first through the I-th filters that has a passband at the preselected partial frequency band so that the selected filter may be responsive to the second multiplied signal to produce a partial band spread spectrum signal in the preselected partial frequency band, particular spread spectrum component rejecting means for rejecting the particular spread spectrum component from the first spread spectrum signal to produce a particular spread spectrum component rejected signal, and composing means for composing the first multiplied signal, the partial band spread spectrum signal, and the particular spread spectrum component rejected signal into the transmission spread spectrum signal with the low frequency component rejected from the first multiplied signal.

An SS multiplex communication network comprising such transmitter-receivers may be called a band division SS multiplex communication network. One and the same partial frequency band may be used in common as the predetermined and the preselected partial frequency bands. It is possible to compose a band division SS multiplex communication network by using transmitter-receivers, each comprising no combining means but instead at least one filter having a passband at the preselected partial frequency band to be responsive to the second multiplied signal for producing the partial band spread spectrum signal as the second spread spectrum signal.

It has now been confirmed that the partial bandwidth may be as narrow as about one fifth of the predetermined frequency band. On the other hand, the interchannel interference becomes appreciably objectionable when one of the partial frequency bands overlaps a center portion of the predetermined frequency band. It is therefore possible to make the predetermined frequency band further comprise a synchronizing signal transmission band at the center portion for use in transmitting a narrow-band frame synchronizing signal. Alternatively, the highest of four partial frequency bands may be used in transmitting a spread spectrum multiplex signal and three remaining partial frequency bands, collectively for transmission of a TDM signal.

When the modems deal with information signals having a plurality of different data clock periods, it is possible to unexpectedly increase the number of modems accommodated by the network by reducing the redundancy that has been inevitable for the information signals of longer data clock periods with a conventional spread spectrum multiplex communication network.

For a transmitter-receiver according to still another aspect of this invention, the different pseudo noise code sequences consist of pseudo noise code sequences of a first through a Q-th family, where Q represents a predetermined integer greater than unity. The first-family pseudo noise code sequences are for at least one of the modems that deals with information signals of a shortest of the different data clock periods. The Q-th-family pseudo noise code sequences are for at least one of the modems that deals with information signals of a longest of the different data clock periods. The first-family through the Q-th-family psuedo noise code sequences are given by pseudo noise code sequences of a first through a Q-th kind as will presently be described. The first-kind pseudo noise code sequences are generated by clocks having a first clock period in compliance with a first generating polynomial specifying a first frame period not longer than the shortest data clock period and with different initial values, respectively. The q-th-kind pseudo noise code sequences are generated by clocks having a q-th clock period in compliance with a q-th generating polynomial specifying a q-th frame period and with different initial values, respectively, where q represents an integer between two and Q, both inclusive. The q-th clock period should be equal to an integral multiple of the (q−1)-th frame period, where the integral multiple may be equal to unity. The Q-th frame period should not be longer than the longest data clock period. The first-family pseudo noise code sequences are now given by those of the first-kind pseudo noise code sequences, respectively, which are preselected with at least one first-kind pseudo noise code seqeunce left unselected. Each of the q-th-family pseudo noise code sequences is given by a product of a first through a q-th component pseudo noise code sequence, where the first through the (q−1)-th component pseudo noise code sequences are those preselected one from the at least one unselected pseudo noise code sequence of each of the first through the (q−1)-th kinds and where the q-th component pseudo noise code sequence is one preselected from the q-th-kind pseudo noise code sequence with at least one q-th-kind pseudo noise code sequence left unselected unless q is equal to Q. Furthermore, each of the component pseudo noise code sequences used to provide the product should be selected so as not to be in duplication with any one of the component pseudo noise code sequences used to provide the products for others of the q-th-family pseudo noise code sequences.

It is possible to make the pseudo noise code sequence generating means generate at least one q′-th-family pseudo noise code sequence, where q′ represents an integer selected between unity and Q, both inclusive, so that the q′-th frame period be not longer than the data clock period in question and be nearest thereto among the first through the Q-th frame periods. Alternatively, the pseudo noise code sequence generating means may generate a set of component pseudo noise code sequences for the q′-th-family pseudo noise code sequence. In this latter event, each of the first through the third multiplying means should comprise means for multiplying an input signal supplied thereto successively by the component pseudo noise code sequences unless the pseudo noise code sequence to be used in the modem is question is one of the first-family pseudo noise code sequence.

A transmitter-receiver of the last-described type may be used without the combining means and with the second multiplied signal used directly as the second spread spectrum signal.

BRIEF DESCRIPTION OF THE DRAWING

FIG. 8 is a block diagram of an SS modem according to a modification of the SS modem shown in FIG. 7;

FIG. 9 is a block diagram of an SS modem according to a third embodiment of this invention;

FIG. 10 diagrammatically shows several signals for use in describing operation of the SS modem illustrated in FIG. 9;

FIG. 11 is a block diagram of a delay lock loop for use in the SS modem shown in FIG. 9;

FIG. 12 is a block diagram of a synchronism monitor for use in the SS modem depicted in FIG. 9;

FIG. 13 is a block diagram of a frame detector for use in the SS modem illustrated in FIG. 9;

FIG. 14 is a block diagram of an SS modem according to a fourth embodiment of this invention;

DESCRIPTION OF THE PREFERRED EMBODIMENTS

Figure 1:
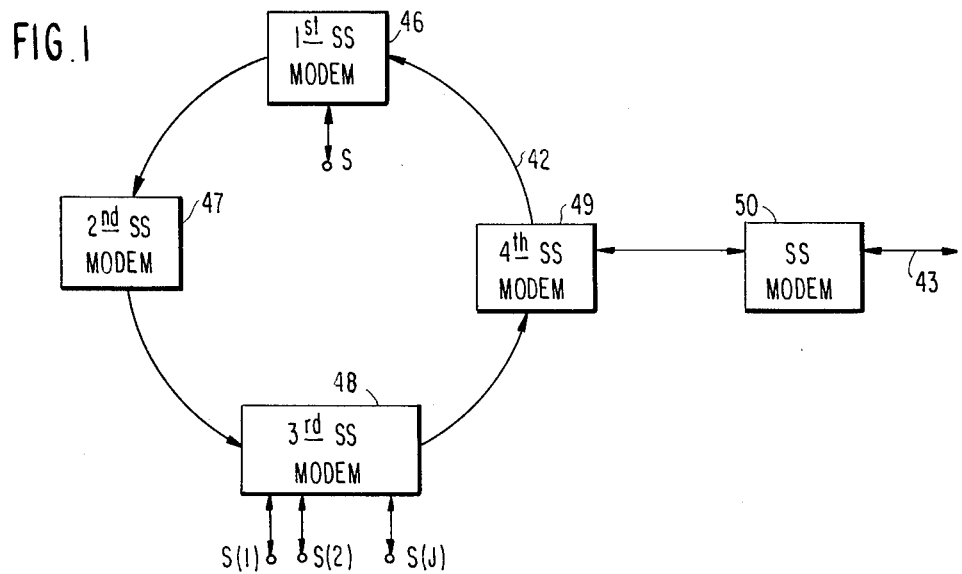
FIG. 1 is a block diagram of an SS multiplex communication network comprising SS modems to which the instant invention is applicable.

Referring to FIG. 1, an SS (spread spectrum) multiplex communication network in which an SS modem or SS transmitter-receiver according to the present invention is used, comprises a transmission line 41 exemplified in a simple form merely for brevity of description. The transmission line 41 comprises a closed-loop or loop-shaped transmission line 42 and another transmission line 43 having two ends. One end is connected to the loop transmission line 42 at a point of connection so that the transmission line 43 may branch outwardly of the loop transmission line 42 as a branch transmission line. The other end is left open. As will later become clear, the loop transmission line 42 may be a single transmission line. The branch transmission line 43 may comprise an up and a down transmission line.

A plurality of SS modems, such as 46, 47, and 48, are coupled to the loop transmission line 42. An SS modem 49 may be situated at the point of connection so as to be coupled both to the loop and the branch transmission lines 42 and 43. Other SS modems, such as 50, are coupled to the branch transmission line 43. Modems (not shown) of at least one different type, such as TDM (time division multiplex) modems, may or may not be coupled to the transmission line 41, namely, the loop and/or the branch transmission line 42 and/or 43. Each of the SS modems 46 through 49 is of the structure to be described later and gives the loop transmission line 42 a directivity of a predetermined sense indicated by arrowheads.

In the illustrated example, the SS modem 46 is for a single subscriber S. The SS modem 48 is for first through J-th subscribers S(1), S(2),-, and S(J) and may be a line concentrator. It will be presumed for the time being that all subscribers S, S(1),-, and S(J) and other subscribers (not shown) accomodated by the remaining SS modems, such as 47, 49, and 50, deal with binary information signals of a common relatively low data clock rate or frequency $f_D$. The information signals therefore have frequency components in a relatively narrow frequency band [0, $f_D$], namely, between a substantially zero frequency and an upper frequency edge equal to the data clock rate $f_D$.

Figure 2:
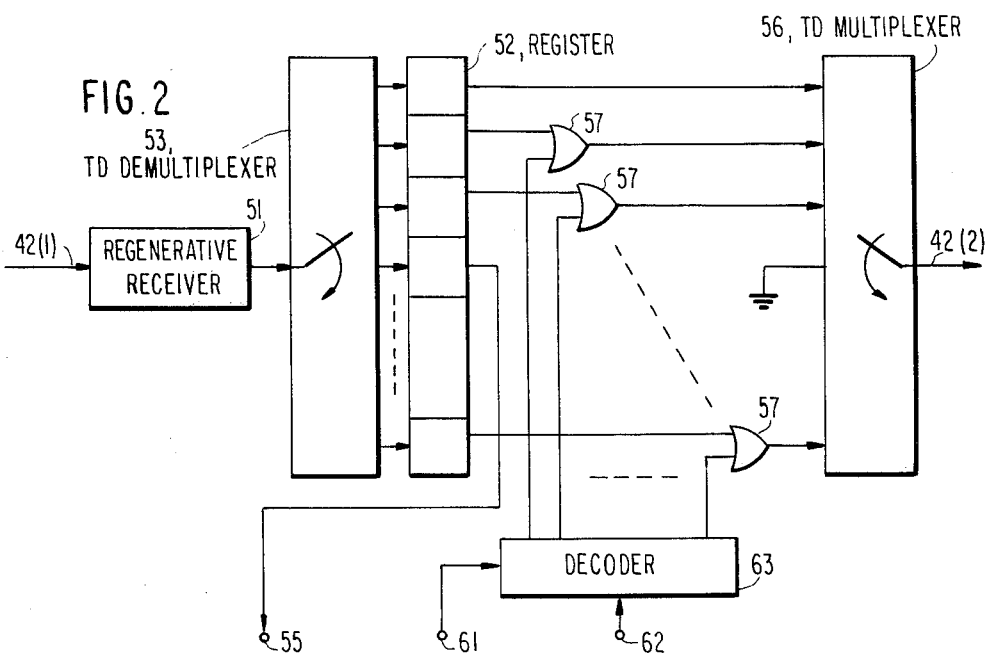
FIG. 2 is a block diagram of a TDM transmitter-receiver for use in combination with an SS transmitter-receiver in a modem according to an embodiment of this invention.
Figure 3:
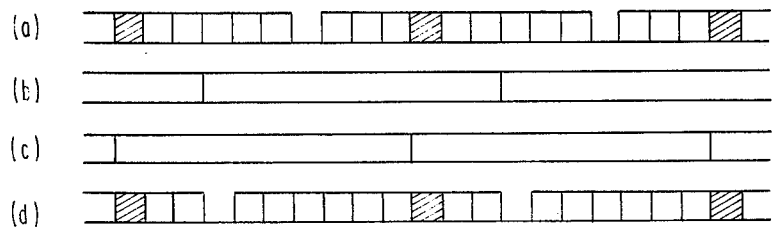
FIG. 3 schematically shows a few signals for use in describing operation of the TDM transmitter-receiver depicted in FIG. 2.

Referring to FIGS. 2 and 3, a TDM modem for use in a transmitter-receiver according to an embodiment of this invention will be described. The TDM modem is for coupling to the transmission line 41. Such TDM modems have conventionally been coupled to a loop transmission line 42. In other words, a multiplex communication network comprising a loop transmission line 42 has been a TDM communication network, in which the TDM modems carry out transmission and reception of information signals as a TDM signal consisting of a succession of frames.

By way of example, each frame of the TDM signal consists of first through tenth time or pulse slots defined by TDM clocks of a TDM clock rate equal to the data clock rate multiplied by the number of channels. In the example being illustrated, the first time slot in each frame, indicated in FIG. 3 with hatches, is used for each frame alignment bit. Other time slots are used as TDM channels, allowing nine channels to be accommodated by the TDM communication network. If the channels are allotted to the respective TDM modems, the network can accommodate nine TDM modems at most.

Merely for clarity of description, it will be assumed that the ilustrated TDM modem is receiving an information signal TDM'ed in the fourth time slot in each frame from an originating TDM modem as a particular information signal and sending a transmission information signal TDM'ed in the seventh time slot in each frame by preselecting the originating TDM modem as a destination TDM modem. The seventh time slot is idle or vacant as represented by a zero level signal in FIG. 3 at (a).

The TDM modem comprises a regenerative receiver 51 responsive to a TDM signal received from a first section of the loop transmission line 42(1) for reproducing the frame alignment bit together with information bits of the respective TDM channels as illustrated in FIG. 3 at (a). Noise may be superposed on the TDM signal received from the transmission line section 42(1) and consequently on the reproduced bits. A register 52 has first through tenth memory elements or cells, such as flip-flops, corresponding to the first through the tenth time slots of each frame, respectively. Timed by each reproduced frame alignment bit, a time division demultiplexing switch 53 distributes the reproduced information bits to the second through the tenth elements of the register 52. The fourth element of the register 52 supplies its content to an information output terminal 55. The information bits successively stored in the fourth element provide a reproduction of the particular information signal as depicted in FIG. 3 at (b).

The TDM modem further comprises a time division multiplexing switch 56 having first through tenth input terminals and an output terminal. The second, third, and fifth through tenth input terminals are supplied with contents of the corresponding memory elements of the register 52 through OR gates 57's. The fourth input terminal is grounded. The output terminal is connected to a second section of the loop transmission line 42(2). An information input terminal 61 is supplied with the transmission information signal, shown in FIG. 3 at (c), to be TDM'ed in the seventh time slot in each frame. An address input terminal 62 is supplied with an address signal specifying the destination TDM modem. Responsive to the address signal, a decoder 63 delivers the transmission information signal to one of the OR gates 57's that is connected to the seventh input terminal of the time division multiplexing switch 56. Timed by each reproduced frame alignment bit, the multiplexing switch 56 supplies a new TDM signal to the transmission line section 42(2) as depicted in FIG. 3 at (d), in which a zero level signal given by the ground is placed in the fourth time slot in each frame. The transmission information signal is located in the seventh time slot in each frame.

As described with reference to FIG. 2, the loop transmission line 42 is divided into a plurality of sections. The loop transmission line 42 is thereby rendered directional or directive. The TDM modem must comprise bulky circuit elements, such as the register 52. The bulky hardware results in an increased power consumption and a raised cost. For correct operation of the switches 53 and 56, complicated control is indispensable.

Figure 4:
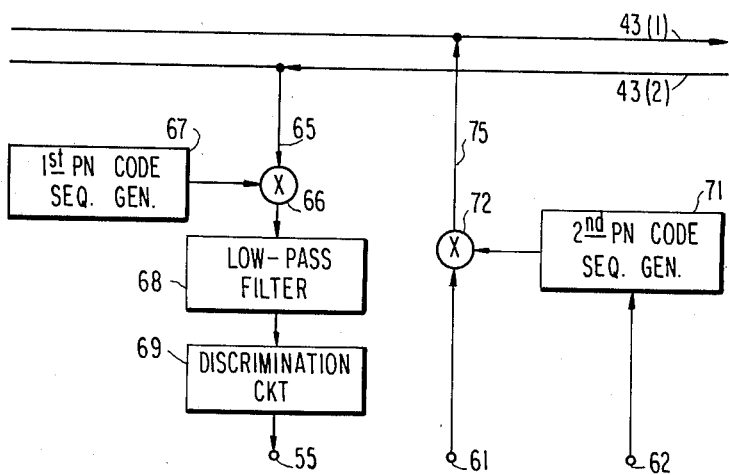
FIG. 4 is a block diagram of a conventional SS modem.

Turning to FIG. 4, a conventional SS modem will be described in order to facilitate an understanding of this invention. M sequences, or M code (maximum length sequence code) sequences, of a common PN (pseudo noise) clock rate or frequency $f_0$ will be used as PN code sequences. As will later be described again, the M sequences have frequency components in a very wide or broad frequency band B or [0, $f_0$], namely, between a substantially zero frequency and an upper frequency edge equal to the PN clock rate $f_0$. The SS modem is coupled to a branch transmission line 43, which consists of up and down transmission lines 43(1) and 43(2). A central station or an exchange station (not shown) may be connected to upstream ends of the up and the down transmission lines 43(1) and 43(2). The SS modem comprises an information output terminal 55, an information input terminal 61, and an address input terminal 62 of the type described before.

A reception SS signal is obtained through a branch 65 directly from a first SS signal reaching the branch 65 through the down transmission line 43(2) and is supplied to an SS demodulator 66, which is an analog multiplier serving as a correlation detector. The first SS signal may be an SS multiplex signal into which a plurality of SS signals are multiplexed. In this event, the reception SS signal is also an SS multiplex signal. A first M sequence generator 67 generates a first M sequence assigned to the SS modem. Such an M sequence generator will presently be described. The SS demodulator 66 multiples the reception SS signal by the first M sequence. The SS demodulator 66 may be called a first multiplier and produces a first product or multiplied signal as a correlation output signal representative of the result of correlation of the first M sequence to the reception SS signal. If a particular information signal to be received by the SS modem is carried by the first M sequence in the first SS signal, the first multiplied signal comprises an information signal component of an appreciable amplitude in a frequency range not exceeding the upper frequency edge $f_D$ of the narrow frequency band for the information signals. When the reception SS signal includes another information signal carried by another M sequence, the first multiplied signal includes an SS signal component of a very small amplitude. The SS signal component will be called an interference signal.

A low-pass filter 68 has a cutoff frequency at the upper frequency edge $f_D$ and is for extracting the information signal component from the first multiplied signal together with a low frequency interference component of the interference signal. The low frequency interference component has a negligible energy. At any rate, the low-pass filter 68 extracts a low frequency component of the first multiplied signal and produces a low frequency signal, which may comprise the information signal component and the low frequency interference component. Responsive to the low frequency signal, a discrimination circuit 69, to be described later, delivers the particular information signal to the information output terminal 55.

The information input terminal 61 is supplied with a transmission information signal to be sent to a destination SS modem coupled to the up transmission line 43(1). The address input terminal 62 is supplied with an address signal specifying the destination SS modem. Responsive to the address signal as will later be described, a second M sequence generator 71 generates a second M sequence assigned to the destination SS modem. An SS modulator 72 is a balanced modulator and serves as a second multiplier in multiplying the transmission information signal by the second M sequence to produce a second product or multiplied signal. The second multiplied signal is used, at it stands, as a transmission spread spectrum signal and is delivered through a tributary 75 to the up transmission line 43(1) in superposition on an SS (multiplex) signal, if any, arriving at the tributary 75. A second SS signal is thus sent towards the destination SS modem through the up transmission line 43(1).

Figure 5:
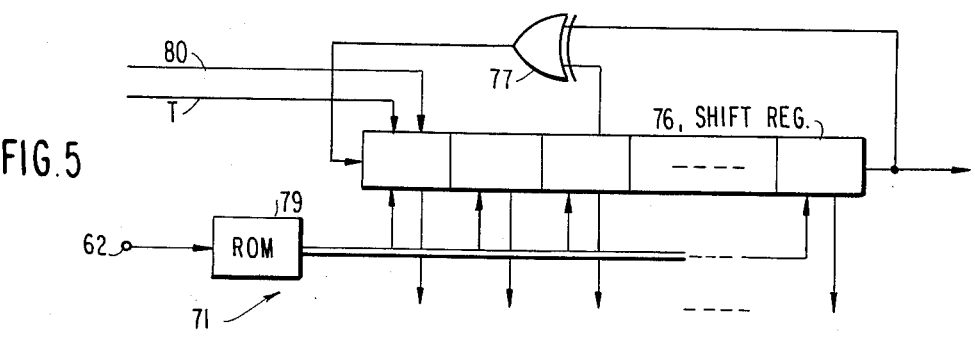
FIG. 5 is a block diagram of an M sequence generator for use in a transmitter-receiver according to this invention.

Turning further to FIG. 5 for a short while, an M sequence generator is for generating an M sequence having a PN clock rate $f_0$ and a frame length N. For M sequences, the frame length N is always represented by $(2^k-1)$, where k represents a natural number. Incidentally, the number of different M sequence codes and consequently different M sequences having the PN clock rate and the frame length in common, is given by a function of the natural number F(k) as:

$$F(k) = \phi(N)/k,$$

where $\phi(N)$ represents the Euler function of an argument N, famous in the number theory and representative of an integer equal to the number of positive integers which are less than the argument and coprime therewith, unity inclusive. The function F(k) may not necessarily have a value equal to an integer unless the frame length N or $(2^k-1)$ is equal to a Mersenne prime. In this event, the number of different M sequences is given by an integer that does not exceed the value of the function F(k).

The M sequence generator comprises a k-stage shift register 76 having first through k-th shift register stages. The k-th stage is the last shift register stage. PN clocks of the PN clock rate $f_0$ are used as shift pulses for the shift register 76. An Exclusive OR gate 77 is supplied with an output bit of a predetermined stage of the shift register 76 and another output bit of the last shift register stage. An Exclusive OR output is supplied to the first shift register stage. The bits successively produced from the last shift register stage provide an M sequence.

One or more Exclusive OR gates (not shown) may additionally be used. In this event, the gate supplied with the last shift register stage bit delivers the Exclusive OR output to another gate, which is supplied also with an output bit of a preselected one of the shift register stages except for the last and the predetermined shift register stages. The last one of such gates delivers its Exclusive OR output to the first shift register stage. The Exclusive OR gate or gates, such as 77, are connected to the shift register stages in compliance with a generating polynomial for the M sequence code. A PN code sequence is generated by a similar PN code sequence generator.

It is possible to mathematically express an M sequence p(t), having a PN clock rate $f_0$ and a frame length N, as a function of time t by:

$$p(t) = \sum_{m=-\infty}^{\infty} \sum_{n=0}^{N-1} p_n u(t - nT - mNT),$$

where m and n represent integers; $p_n$'s for $0 \leq n \leq N-1$, an M sequence code $\{P_0, P_1, -, P_{N-1}\}$; T, a PN clock period equal to the reciprocal of the PN clock rate; and u(t), a rectangular pulse signal having a pulse height rendered equal to unity only in an interval of time [0, T], namely, between zero and the PN clock period, and otherwise zero. The M sequence code $\{P_n\}$ consists of positive and negative unit pulses arranged time sequentially at the PN clock rate in compliance with a generating polynomial. Such an M sequence has frequency components distributed in the wide frequency band B or [0, $f_0$]. It is known that M sequences generated in compliance with different generating polynomials have weak cross-correlation. Each M sequence has a strong autocorrelation. In other words, a square of each M sequence is nearly equal to unity.

Turning back to FIG. 4, consideration will be given to the distortion that appears in the received information signal. At first, the illustrated SS modem will be considered to be an originating SS modem. A PAM (pulse amplitude modulated) signal of a data clock period $T_D$ equal to the reciprocal of the data clock rate will be used as a transmission information signal a(t) to be sent to a destination SS modem coupled upstream to the up transmission line 43(1). The PAM signal may be a sequence of transmission information pulses $\{a_m\}$ having pulse heights $a_m$'s and arranged time sequentially at instants $mT_D$ for integers m's varying from minus infinity to plus infinity. It is possible mathematically express the transmission information signal as:

$$a(t) = \sum_{m=-\infty}^{\infty} a_m u_D(t - mT_D),$$

where $u_D(t)$ represents a rectangular pulse signal having a pulse height rendered equal to unity only in an interval of time between zero and the data clock period and otherwise zero. The second M sequence generated by the second M sequence generator 71 will be designated by p(t) as above. The second multiplier 72 supplies the up transmission line 43(1) with the second SS signal, which is given directly by a transmission SS signal s(t) expressed as:

$$s(t) = p(t)a(t),$$

in which the second M sequence carries the transmission information signal with the spectrum spread from the narrow frequency band [0, $f_D$] to the wide frequency band [0, $f_0$].

Next, the illustrated SS modem will be considered as a destination SS modes for receiving the above-described SS signal s(t) directly as a reception SS signal r(t) from a certain SS modem coupled upstream to the down transmission line 43(2). Merely for simplicity of description, the data clock period $T_D$ will be surmised to be equal to a PN frame period NT, namely, N times the PN clock period. The first M sequence generator 62 generates the above-specified M sequence p(t). The received information signal delivered to the information output terminal 55 is a sequence of reproduced information pulses $\{\hat{a}_{m'}\}$ of pulse heights $\hat{a}_{m'}$'s for integers (m')'s varying from minus infinity to plus infinity. Each reproduced information pulse $\hat{a}_{m'}$ is given by:

$$\hat{a}_{m'} = \sum_{n=0}^{N-1} p_n r(nT + m'NT).$$

If the transmission line 41 were ideal so as to give the reception SS signal r(t) by the transmission SS signal s(t):

$$\hat{a}_{m'} = N a_{m'}.$$

That is, each reproduced information pulse is a desired signal decided by a function of a transmission information pulse $a_{m'}$ alone. The reproduced information pulse sequence is a reproduction of the transmission information pulses and includes no distortion.

As will later be discussed again, the transmission line 41 may not necessarily be ideal in practice. Distortion will appear in the reproduced information pulse sequence. Each reproduced information pulse $\hat{a}_{m'}$ is no longer determined by a function of a transmission information pulse $a_{m'}$ alone but takes a value including an intra-channel or intercode interference component dependent on adjacent transmission information pulses. More specifically:

$$\hat{a}_{m'} = K_0 a_{m'} + \sum_{\substack{w=-\infty \\ w \neq 0}}^{\infty} K_w a_{m'+w}$$

where $K_w$ for integers w's varing from minus infinity to plus infinity, represent constants dependent on the transmission characteristics and the like of the transmission line 41. The first term $K_0 a_m$, gives the desired reproduction of a transmission information pulse. The second term gives the intercode interference component.

When the desired signal and the intercode interference component are designated by S and D, it is possible to define an SD ratio (signal-to-distortion ratio) by a ratio of mean square of the desired reproductions $\overline{S^2}$ to mean square of the intercode interference components $\overline{D^2}$ and to use the SD ratio as a criterion of the degree of distortion or degradation resulting from the intercode interference. It is already known that a transmission information signal modulated into an SS signal by a PN code sequence is reproduced as a received information signal with an excellently high SD ratio even when the transmission line 41 has a frequency selectivity to give rise to spectral dispersion of the SS signal, provided that the transmission line 41 is capable of transmitting an SS signal of the wide frequency band. This is because the SS signal has a nature of white noise.

Referring far back to FIG. 1, let the SS modems 46 through 49 coupled to the loop transmission line 42 be called first through fourth SS modems and assigned with first through fourth M sequences $p_1(t)$, $p_2(t)$, $p_3(t)$, and $p_4(t)$ generated by common PN clocks in compliance with different generating polynomials specifying a predetermined frame period. Let it also be assumed that only the first SS modem 46 sends a transmission information signal $a_1(t)$, selecting the second SS modem 47 as a destination SS modem. Inasmuch as the second SS modem 47 is assigned with the second M sequence $p_2(t)$, an SS signal (not multiplexed in the example under consideration) sent from the first SS modem 46 to the transmission line 42 is represented by $p_2(t)a_1(t)$. In the second SS modem 47, the SS signal $p_2(t)a_1(t)$ is multiplied by the second M sequence $p_2(t)$. The result of multiplication is caused to pass through the low-pass filter 48 and discriminated by the discrimination circuit 69 as a reproduction of the transmission information signal.

The SS signal $p_2(t)a_1(t)$ is no longer necessary after once received at the second SS modem 47. The SS signal nevertheless circulates through the loop transmission line 42 to repeatedly reach the second SS modem 47. Reproduction of the transmission information signal is repeated to interfere with the already reproduced information signal. Furthermore, two transmission lines 43(1) and 43(2) are indispensable for the SS modem of the type illustrated with reference to FIG. 4. Even when the up and the down transmission lines 43(1) and 43(2) are used as the branch transmission line 43 rather than as the loop transmission line 42, the repeated reproduction takes place if the central station merely transmits the SS signal received from the up transmission line 43(1) to the down transmission line 43(2).

As described in conjunction with FIG. 5, eighteen different M sequences are available when each of the shift registers, such as 76, has seven stages and the frame length is accordingly one hundred and twenty-seven bits long. The SS signal, whether multiplexed or not, has frequency components in the wide frequency band B. The transmission line 41 must be capable of transmitting signals in the wide frequency range B. In other words, the wide frequency band B must be allotted to the SS multiplex communication network. If the data clock rate $f_D$ of the information signals is equal to $f_0/127$, it is possible according to the TDM technique to divide the allotted frequency band B into one hundred and twenty-seven time slots or TDM channels. In contrast, only eighteen SS channels are available at most by an SS multiplex communication network allotted with the frequency band B. The efficiency of frequency allotment is objectionably poor.

One scheme for raising the efficiency of frequency allotment is to use Gold codes, known in the art, as the PN codes Even with the Gold codes, the number of allowable SS channels increases only to $(2^k+1)$, or one hundred and twenty-nine when the common frame length of the Gold codes is one hundred and twenty-seven bits long.

Another scheme is revealed in the Ogiwara et al article referred to heretobefore. According to Ogiwara et al, the PN codes are given by M sequence codes derived by cyclically bit shifting each of M sequence codes generated by common PN clocks in compliance with different generating polynomials specifying a common frame length. The number of different M sequence codes obtained from each M sequence code is equal to the frame length, the zero-bit-shifted M sequence code inclusive. On using such M sequences as the PN code sequences, it is mandatory that the SS signal obtained by modulating an M sequence by an information signal be demodulated by the M sequence having a frame phase synchronized to the modulation M sequence. If thus phase synchronized, these M sequences have weak cross-correlation. A square of each of such M sequences is nearly equal to unity. It is therefore possible under the circumstances to accommodate (127×18) SS channels in theory.

The number of SS channels capable of being accommodated in practice is, however, restricted because of degradation of the SN ratio resulting from interference, called jamming, among the accommodated channels. The degree of jamming is dependent on the average call rate of each SS modem and consequently on the duty ratio of each information signal to be multiplexed. The degree is also dependent on the activity of a speech signal used as each information signal, namely, the ratio of voiced intervals of time to the whole duration of the speech signal. According to the Ogiwara et al article, it is possible to accommodate three hundred and eighty-one SS channels in an SS multiplex communication network in case where all the cyclically bit shifted M sequence codes of a common frame length of one hundred and twenty-seven bits are resorted to, where the information signals are encoded speech signals of an average call rate of 0.1 and an average activity of 0.25, and where an SN ratio of about 13 dB is assumed to be allowable. When the information signals are data and-/or picture signals of a high duty ratio (equivalent to an activity of 1.0), the SS multiplex communication network can accommodate only one hundred and fifty SS channels.

The jamming is unexpectedly reduced when the PN code sequences are given by M sequences derived by cyclically bit shifting only one M sequence code. The M sequences therefore have a common generating polynomial and a common PN clock rate. Mathematically speaking, cross-correlation between such M sequences is weaker than that between the cyclically bit shifted M sequences having different generating polynomials and a common PN clock rate. The interference between channels decreases by a factor of 1/N as compared with the interchannel interference inevitable in an SS multiplex communication network resorting to the cyclically bit shifted M sequences generated by common clocks in compliance with different generating polynomials having a common frame length. Using the M sequences having a common generating polynomial is advantageous also in designing an M sequence generator, such as 71 (FIG. 4), for generating an M sequence for use as a modulation M sequence. In this connection, it may be pointed out here that k successive bits of an M sequence having a frame length of $(2^k-1)$ bits, are of a specific bit pattern unless two sequences of such successive bits are spaced apart by the frame length.

When the Gold codes of a common frame length N and a common PN clock rate are allotted to the respective SS modems, the power resulting from the interchannel interference between two different channels is about 1/N if the signal power is regarded as unity. When the SS multiplex communication network comprises z SS modems, the SN ratio of an information signal received by one of the SS modems is:

10 log (N/z), in decibels. If the SN ratio should be higher than 10 dB, the number of allowable channels for the encoded speech signals exemplified above is only N/10.

In contrast, the SN ratio of an information signal received at one of such SS modems is:

10 log ($N^2$/z), in decibels, when the PN code sequences are provided by cyclically bit shifted M sequences having a common generating polynomial and a common PN clock rate. Even when the number z is as great as the allowable maximum number N, the SN ratio is (10 logN) decibels. It is therefore possible by the use of a longer frame length N to increase the number of accommodated SS channels and to raise the SN ratio.

Referring to FIG. 5 again, it is usual that the shift register 76 has parallel input and output signal leads. When the cyclically bit shifted M sequences have a common generating polynomial and a common PN clock rate, the M sequence generator for use as the second M sequence generator 71 (FIG. 4) may be accompanied by an ROM (read only memory) 79 having an address input signal lead connected to the address input terminal 62 and k parallel output signal leads connected to the respective parallel input signal leads of the shift register 76. Addressed by the address signal, the ROM 79 supplies an initial value consisting of k bits to the shift register 76. The initial value specifies a particular one of the cyclically bit shifted M sequences and is set in the respective shift register stages by an initial value set signal supplied also to the shift register stages through an initial value set signal input lead 80. If the M sequence generator is for use as the first M sequence generator 67 (FIG. 4), a simple code or pattern generator for generating a predetermined bit pattern may be substituted for the ROM 79. The predetermined bit pattern is for use as an initial value for the M sequence assigned to the SS modem and is set in the respective shift register stages by a similar initial value set signal. Such an initial value set signal may be a frame synchronizing signal, to be later described, for establishing frame synchronism between the modulation and the demodulatin M sequences used in an originating and a destination SS modem.

By way of example, the ROM 79 of the second M sequence generator 71 of the first SS modem 46 (FIG. 1) has a plurality of addresses for other SS modems, such as 47 through 50, of the SS multiplex communication network. The addresses are loaded with the initial values of the M sequences $p_2(t)$ through $p_4(t)$ and others. If the second SS modem 47 is the destination SS modem, the address loaded with the initial value of the second M sequence $p_2(t)$ is accessed by the address signal.

Figure 6:
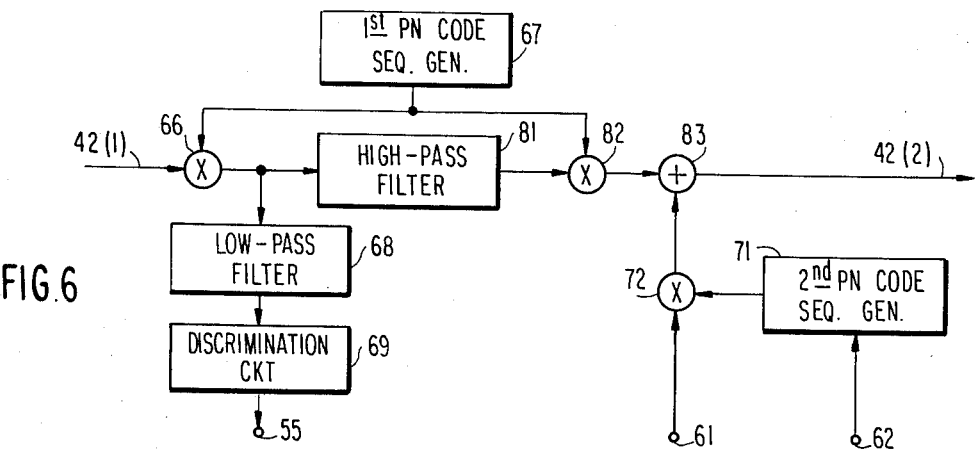
FIG. 6 is a block diagram of an SS modem according to a first embodiment of this invention.

Referring now to FIG. 6, an SS modem according to a first embodiment of this invention is for coupling to a directional transmission line, which may be a loop transmission line 42 comprising first and second loop transmission line sections 42(1) and 42(2). After once received, a particular information signal no longer circulates through the loop transmission line 42. This is rendered possible with attention directed to the fact that the SS signals have a very wide frequency band as compared with the information signals.

Similar parts are designated by like reference numerals. A combining circuit is used in combining the first and the second multiplied signals to produce the transmission SS signal with the low frequency component rejected from the first multiplied signal. More specifically, the combining circuit comprises a high-pass filter 81 having a cutoff frequency substantially at the upper frequency edge $f_D$ of the information signals. The high-pass filter 81 produces a low frequency component rejected signal by rejecting the low frequency component from the first multiplied signal. A third multiplier 82 multiplies the low frequency component rejected signal by the first M sequence and produces a third multiplied signal. An adder 83 adds the second and the third multiplied signals into a transmission SS signal, which is supplied directly to the second loop transmission line section 42(2) as the second SS signal. Incidentally, the branch 65 and the tributary 75 (FIG. 4) are extensions of the transmission line sections 42(1) and 42(2). The M sequences may be those generated by clocks having a common PN clock rate in compliance with different generating polynomials specifying a common frame length. Furthermore, the M sequences may be similar PN code sequences.

Referring back to FIG. 1 again, let each of the first through the fourth SS modems 46 to 49 be an SS modem illustrated with reference to FIG. 6. Merely for convenience of description, it will be assumed that the first through the fourth SS modems 46 to 49 are assigned with the first through the fourth M sequences $p_1(t)$ to $p_4(t)$ and are sending first through fourth transmission information signals $a_1(t)$, $a_2(t)$, $a_3(t)$, and $a_4(t)$ to the fourth SS modem 49, the first SS modem 46, the second SS modem 47, and the third SS modem 48, respectively. The modulation M sequences used in the first through the fourth SS modem 46 to 49 are the fourth, first, second, and third M sequences $p_4(t)$, $p_1(t)$, $p_2(t)$, and $p_3(t)$, respectively. For that SS signal sent by the first SS modem 46 through the loop transmission line 42 in which the fourth M sequence carries the first transmission information signal, the second and the third SS modems 47 and 48 are mere transit SS modems.

Operation of the first SS modem 46 will be considered. When denoted by $r(t)$, the first SS signal arriving at the branch 65 leading to the first multiplier 66 of the first SS modem 46 through the loop transmission line 42 is:

$$r(t)=p_1(t)a_2(t)+p_2(t)a_3(t)+p_3(t)a_4(t),$$

if the transmission line 42 gives no loss to the SS signals. The first multiplied signal, designated by $r'(t)$, is:

$$r'(t)=a_2(t)+d_1(t),$$

where $d_1(t)$ represents an interference signal given by:

$$d_1(t)=p_1(t)p_2(t)a_3(t)+p_1(t)p_3(t)a_4(t).$$

The first multiplied signal includes an information signal component $a_2(t)$ to be received as a received information signal at the first SS modem 46. The information signal component $a_2(t)$ has a high spectral energy density and accordingly an appreciable amplitude in the narrow frequency band $[0, f_D]$. Inasmuch as the first M sequence $p_1(t)$ has only weak cross-correlation to each of the second and the third M sequences $p_2(t)$ and $p_3(t)$, the interference signal $d_1(t)$ has a low spectral energy density in the wide frequency band B or $[0, f_0]$. The low-pass filter 68 produces a low frequency signal comprising the information signal component $a_2(t)$ and a low frequency interference component of the interference signal $d_1(t)$. The low frequency interference component has a negligible energy. A reproduction of the second transmission information signal $a_2(t)$ is therefore obtained as a received information signal with a sufficiently high SN ratio.

It is possible to understand that the correlation detection is a process of converting the wide-band SS signal $p_1(t)a_2(t)$ to a narrow-band information signal $a_2(t)$. If desired, the difference in levels between the information signal component $a_2(t)$ and the low frequency interference component of the interference signal $d_1(t)$ may be used in discriminating the received information signal from the low frequency interference component. The discrimination circuit 69 may therefore be a sampler operable at the data clock period $1/f_D$ or a peak clipper for extracting a signal component exceeding the low spectral energy density from the low frequency signal. Incidentally, the low-pass filter 68 may be a Nyquist filter. Alternatively, the low-pass filter 68 may be a reset or dump integrator reset at the data clock period $1/f_D$ as will later become clear.

The high-pass filter 81 rejects the low frequency component of the first multiplied signal $r'(t)$. The information signal component $a_2(t)$ is rejected in the low frequency component rejected signal, together with the low frequency interference component of the interference signal $d_1(t)$. Due to the low spectral energy density, the interference signal $d_1(t)$ is substantially retained in the low frequency component rejected signal. The low frequency component rejected signal, denoted by $r''(t)$, is substantially:

$$r''(t)=p_1(t)p_2(t)a_3(t)+p_1(t)p_3(t)a_4(t).$$

The third multiplier 82 multiplies the low frequency component rejected signal $r''(t)$ by the first M sequence $p_1(t)$. The third multiplied signal is therefore given by $[p_2(t)a_3(t)+p_3(t)a_4(t)]$. An SS signal component in the first SS signal that should merely transit through the first SS modem 46, is thus substantially regenerated. The adder 83 adds the third multiplied signal and the second multiplied signal $p_4(t)a_1(t)$ together. The transmission SS signal, denoted by $s(t)$, is therefore substantially:

$$s(t)=p_4(t)a_1(t)+p_2(t)a_3(t)+p_3(t)a_4(t),$$

which signal is delivered to the second loop transmission line section 42(2) as the second SS (multiplex) signal.

As would be clear from comparison of the first SS signal $r(t)$ with the second SS signal $s(t)$, the SS signal component $p_1(t)a_2(t)$ sent from the second SS modem 47 to the first SS modem 46 is no longer included in the second SS signal. Other SS signal components $p_2(t)a_3(t)$ and $p_3(t)a_4(t)$ are substantially retained in the second SS signal. Operation of the other SS modems 47 through 49 is not much different and will not be described.

When the first SS signal $r(t)$ includes no SS signal component to be received by the first SS modem 46 and is given by:

$$r(t)=p_2(t)a_3(t)+p_3(t)a_4(t),$$

the first multiplied signal becomes:

$$r'(t) = p_1(t)p_2(t)a_3(t) + p_1(t)p_3(t)a_4(t).$$

The low frequency signal consists of the low frequency interference component of the negligible energy. The low frequency component rejected signal is again given substantially by:

$$r''(t) = p_2(t)a_3(t) + p_3(t)a_4(t).$$

The SS modem illustrated with reference to FIG. 6 is operable even with any PN code sequences as pointed out before. The first and the second M sequence generators 67 and 71 may be referred to as first and second PN code sequence generators depending on the circumstances.

Figure 7:
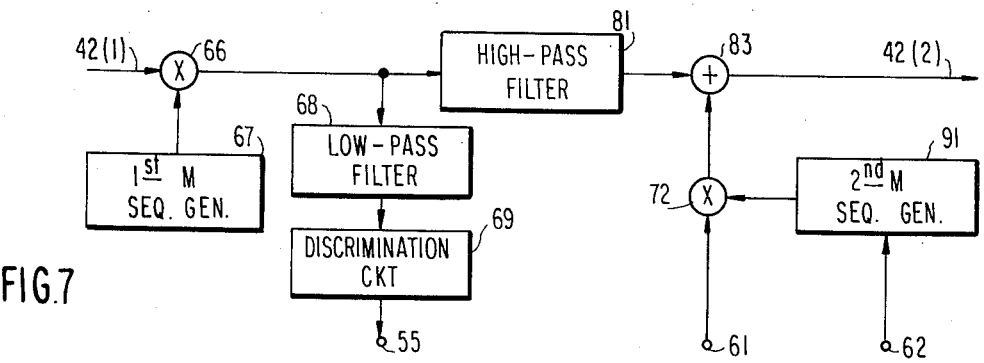
FIG. 7 is a block diagram of an SS modem according to a second embodiment of this invention.

Referring to FIG. 7, an SS modem according to a second embodiment of this invention comprises similar parts designated by like reference numerals. The SS modem is connected to the first and the second loop transmission line sections 42(1) and 42(2) and is operable by the use of M sequences derived by cyclically bit shifting an M sequence code generated by clocks having a predetermined PN clock rate in compliance with a single generating polynomial. The third multiplier 82 (FIG. 6) is removed. Instead, a novel M sequence generator 91 is substituted for the second M sequence generator 71 used in the SS modem illustrated with reference to FIG. 6. The novel M sequence generator 91 generates a second M sequence as will be discussed in the following. The combining circuit comprises the high-pass filter 81 for rejecting the low frequency component from the first multiplied signal to produce a low frequency component rejected signal, and the adder 83 for adding the low frequency component rejected signal and the second multiplied signal into the transmission SS signal.

Let it be surmised that a destination SS modem should receive a first PN code sequence $p_1(t)$ modulated at an originating SS modem by a first information signal $a_1(t)$ into an SS signal $p_1(t)a_1(t)$ and that another SS signal $p_2(t)a_2(t)$ coexists on the transmission line 42 to provide an SS multiplex signal $[p_1(t)a_1(t) + p_2(t)a_2(t)]$. At the destination SS modem, a reception signal $r(t)$ is multiplied by the first PN code sequence $p_1(t)$ into a first multiplied signal $r'(t)$ given by:

$$r'(t) = a_1(t) + p_1(t)p_2(t)a_2(t).$$

The high-pass filter 81 produces a low frequency component rejected signal $r''(t)$ defined substantially by:

$$r''(t) = p_1(t)p_2(t)a_2(t).$$

Let the low frequency component rejected signal $r''(t)$ be supplied to the transmission line 42 as the second SS signal at the destination SS modem. At another destination SS modem, the other information signal $a_2(t)$ will be reproduced when the SS signal $r''(t)$ arriving thereat is multiplied by a product of PN code suquences $p_1(t)p_2(t)$. The transmission line 42 may be the branch transmission line 43.

If Z SS signals multiplexed into an SS multiplex signal reaches a first destination SS modem having the first PN code sequence $p_1(t)$ as the demodulation PN code sequence, where Z represents an integer greater than two, the reception SS signal $r(t)$ may be represented by:

$$r(t) = p_1(t)a_1(t) + p_2(t)a_2(t) + - + p_z(t)a_z(t) + - + p_Z(t)a_Z(t),$$

where $p_z(t)$ represents a z-th PN code sequence and $a_z(t)$, a z-th information signal, z being now representative of an integer between unity and Z, both inclusive. If designated by $r_1'(t)$ rather than by $r'(t)$, the first multiplied signal produced in the first destination SS modem is:

$$r_1'(t) = a_1(t) + d_1(t).$$

where $d_1(t)$ represents a first interference signal defined by:

$$d_1(t) = p_1(t)p_2(t)a_2(t) + p_1(t)p_3(t)a_3(t) + - + p_1(t)p_Z(t)a_Z(t).$$

An SS multiplex signal substantially identical with the first interference signal reaches a second destination SS modem. The second information signal $a_2(t)$ will be reproduced when the SS multiplex signal $d_1(t)$ is multiplied by a product of the first and the second PN code sequences $p_1(t)p_2(t)$. The first multiplied signal $r_2'(t)$ derived in the second destination SS modem is given by:

$$r_2'(t) = a_2(t) + d_2(t),$$

where $d_2(t)$ represents a second interference signal represented by:

$$d_2(t) = p_2(t)p_3(t)a_3(t) + p_2(t)p_4(t)a_4(t) + - + p_2(t)p_Z(t)a_Z(t),$$

because the square of the first PN code sequence is nearly equal to unity.

In general, the first multiplied signal $r_z'(t)$ obtained in a z-th destination SS modem is given by:

$$r_z'(t) = a_z(t) + d_z(t),$$

where:

$$d_z(t) = p_z(t)p_{z+1}(t)a_{z+1}(t) + - + p_z(t)p_Z(t)a_Z(t).$$

In order that all information signals $a_1(t)$ through $a_z(t)$ be reproduced with a sufficient SN ratio throughout the processes, all PN code sequence products, such as $p_z(t)p_{z+1}(t)$, $p_z(t)p_{z+2}(t)$, -, and $p_z(t)p_Z(t)$, where z now represents an integer between unity and $(Z-1)$, both inclusive, should sufficiently be noise signals (or, have excellent spectrum spreading capabilities). Such a requisite for the Z PN code sequences $p_1(t)$ through $P_Z(t)$ will be called a signal separating condition. Availability of Z PN code sequences satisfying the signal separating condition is verified as follows.

Let the z-th PN code sequence $p_z(t)$ correspond to a certain M sequence, which has a frame length N and is represented by a z-th N-dimensional vector $\mathbf{v}_z$ having N components ($v_{z,0}$, $v_{z,1}$, -, $v_{z,n}$, -, $v_{z,N-1}$), each component having a value of plus or minus unity. It is possible to represent the z-th PN code sequence by:

$$p_z(t) = \sum_{m=-\infty}^{\infty} \sum_{n=0}^{N-1} v_{z,n} u(t - nT - mNT),$$

as before. In this manner, Z M sequences $v_1$ through $v_Z$ are allotted to the Z PN code sequences.

If all Z M sequences are generated by clocks having a predetermined PN clock rate in compliance with a single generating polynomial, any two of the Z M sequences are related to each other by the cyclic bit shift. The cyclic bit shift between two M sequences $v_z$ and $v_y$ is defined, when:

$$z = (v_{z,0}, v_{z,1}, \ldots, v_{z,N-1})$$

and $$v_y = (v_{y,0}, v_{y,1}, \ldots, v_{y,N-1}),$$

by availability of an integer x that satisfies:

$$v_{z,0} = v_{y,x'}$$

$$v_{z,1} = v_{y,x+1'}$$

$$-$$

$$v_{z,N-x-1} = v_{y,N-1'}$$

$$v_{z,N-x} = v_{y,0'}$$

$$v_{z,N-x+1} = v_{y,1'}$$

$$-$$

and $$v_{z,N-1} = v_{y,x-1'}$$

When Z M sequences are thus defined and Z PN code sequences are accordingly defined, a PN code product signal $p_z(t)p_y(t)$ corresponds to a PN code sequence defined by $v_z \otimes v_y$, where the symbol $v \otimes v$ represents operation of generating a vector having an n-th component given by a product of n-th components $v_{z,n}$ and $v_{y,n}$ of the respective vectors. It is already known, when Z M sequences $v_1$ through $v_Z$ are generated by clocks having a predetermined PN clock rate in compliance with a signal generating polynomial, that $v_z \otimes v_y$ gives an M sequence generated by the clocks having the predetermined PN clock rate in compliance with the same generating polynomial unless $v_z = v_y$.

The signal separating condition for the Z PN code sequences $p_1(t)$ through $p_Z(t)$ is as follows when differently expressed for the Z M sequences $v_1$ through $v_Z$. That is, "it is necessary that $v_z \otimes v_{z+1}$, $v_z \otimes v_{z+2}$, —, and $v_z \otimes v_Z$ be different M sequences for any value of z between unity and (Z−1), both inclusive." In other words, all Z M sequences $v_1$ through $v_Z$ should be different from one another. Such Z M sequences are readily available insofar as Z is equal to N or less than N.

Such Z M sequences will now be assigned, as first through Z-th demodulation M sequences, to the first through the Z-th SS modems scattered in the order of the serial number along the loop transmission line 42. A z-th PN code sequence $v_z$ is assigned to a z-th SS modem. If the z-th SS modem sends a z-th information signal $a_z(t)$ to a y-th SS modem, the modulation PN code sequence should be decided in consideration of the (z+1)-th through the y-th demodulation PN code sequences assigned to the (z+1)-th through the y-th SS modems. The modulation PN code sequence is not the PN code sequence assigned to the y-th SS modem but should be selected in consideration of the y-th SS modem.

For example, a first information signal $a_1(t)$ to be sent from the first SS modem to the fourth SS modem transitting through the second and the third SS modems, is modulated by a PN code sequence given by a product $p_2(t)p_3(t)p_4(t)$. The SS signal $p_2(t)p_3(t)p_4(t)a_1(t)$ is multiplied by the second PN code sequence $p_2(t)$ at the second SS modem to become $p_3(t)p_4(t)a_1(t)$. At the third SS modem, the third PN code sequence $p_3(t)$ is further multiplied to supply an SS signal $p_4(t)a_1(t)$ to the fourth SS modem. The information signal $a_1(t)$ is reproduced at the fourth SS modem. No SS signal transits through the fourth SS modem. Instead, the fourth SS modem may supply the transmission line 42 with a new SS signal carrying a fourth information signal $a_4(t)$.

In general, let it be assumed that no SS signal transits through a z-th SS modem of the first through the Z-th SS modems. The SS multiplex signal supplied to the (z−1)-th SS modem may be a multiplex of SS signals carried by (Z−1) modulation PN code sequences:

$$p_z(t),$$

$$p_z(t)p_{z+1}(t),$$

$$p_z(t)p_{z+1}(t)p_{z+2}(t),$$

$$-,$$

and $$p_z(t)p_{z+1}(t)-p_Z(t)p_1(t)-p_{z-2}(t).$$

For such loop SS multiplex communication, the differently expressed signal separating condition is as follows. Let first through Z-th sets $\Omega_1$ to $\Omega_Z$, each having (Z−1) vectors as elements, be defined by:

$$\Omega_1 = \{ v_1,$$
$$v_1 \otimes v_2,$$
$$v_1 \otimes v_2 \otimes v_3,$$
$$\ldots,$$
$$v_1 \otimes v_2 \otimes \ldots \otimes v_{Z-1} \},$$

$$\Omega_2 = \{ v_2,$$
$$v_2 \otimes v_3,$$
$$v_2 \otimes v_3 \otimes v_4,$$
$$\ldots,$$
$$v_2 \otimes v_3 \otimes \ldots \otimes v_{Z-1} \otimes v_Z \},$$

$$\Omega_3 = \{ v_3,$$
$$v_3 \otimes v_4,$$
$$v_3 \otimes v_4 \otimes \ldots \otimes v_Z \otimes v_1 \},$$
$$\ldots, \text{and}$$

$$\Omega_Z = \{ v_Z,$$
$$v_Z \otimes v_1,$$
$$v_Z \times v_1 \otimes v_2,$$
$$\ldots,$$
$$v_Z \otimes v_1 \otimes \ldots \otimes v_{Z-2} \}.$$

It is then necessary that all (Z−1) elements in any one of the first through the Z-th sets be different M sequences. This signal separating condition will be called a signal separating condition for loop SS multiplex communication or, briefly, a loop signal separating condition.

The fact that there are first through Z-th desired M sequences $v_1$ to $v_Z$ that satisfy the loop signal separating condition, is mathematically proven as follows. The number Z of SS modems should not exceed the frame length N of the M sequences.

At first, first through (Z−1)-th different M sequences $v_1'$ to $v_{Z-1}'$ are selected. These selected M sequences will be used as elements of the first set $\Omega_1$. Namely:

$$v_1 = v_1',$$
$$v_1 \otimes v_2 = v_2',$$
$$-,$$

and
$$v_1 \otimes v_2 \otimes - \otimes v_{Z-1} = v_{Z-1}'.$$

It is now possible to define first through (Z−1)-th of the Z desired M sequences by:

$$v_1 = v_1',$$
$$v_2 = v_1 \otimes v_2',$$
$$v_3 = v_2 \otimes v_3',$$
$$-,$$

and
$$v_{Z-1} = v_{Z-2} \otimes v_{Z-1}'.$$

Next and finally, let the (Z−1)-th selected M sequence $v_{Z-1}'$ be used as the Z-th desired M sequence. Namely:

$$v_Z = v_{Z-1}'.$$

The Z desired M sequences thus obtained, satisfies the loop signal separating condition. This is obvious at first because all the elements of the first set $\Omega_1$ are different M sequences.

It is also clear that first through (Z−2)-th elements $_2$ to ($v_2 \otimes v_3 \otimes - \otimes v_{Z-1}$) of the second set $\Omega_2$ are different M sequences. If a certain one element ($v_2 \otimes - \otimes v_z$) of the second set were not an M sequence and consequently identically equal to unity, an element ($v_1 \otimes v_2 \otimes - \otimes v_z$) of the first set would be equal to the first desired M sequence $v_1$. This is contradictory because the first desired M sequence $v_1$ is the first element of the first set. Now, the (Z−1)-th element of the second set is, in view of the fact in the first set that:

$$v_1 \otimes v_2 \otimes - \otimes v_{Z-1} = z,$$

it follows that:

$$v_2 \otimes \ldots \otimes z$$
$$= v_1 \otimes v_Z \otimes (v_2 \otimes \ldots \otimes v_{Z-1})$$
$$= v_1 \otimes v_Z \otimes v_Z$$
$$= v_1.$$

This shows that the (Z−1)-th element in the second set is an M sequence different from any one of the first through the (Z−2)-th elements. If not, a certain element ($v_2 \otimes \cdots \otimes v_z$) of the second set would be identically equal to the first desired M sequence $v_1$. In other word, an element ($v_1 \otimes v_2 \otimes - \otimes v_z$) of the first set would be identically equal to unity and is not an M sequence. This is again contradictory. Therefore, the first through the (Z−1)-th elements of the second set are different M sequences.

It is possible to successively induce that all (Z−1) elements of each of the third through the Z-th sets $\Omega_3$ to $\Omega_Z$ are different M sequences.

Turning back to FIGS. 1 and 7, let the first PN code sequence generators 67's of the first through the fourth SS modems 46 to 49 generate first through fourth demodulation PN code sequences $p_1(t)$ to $p_4(t)$ corresponding to the first through the fourth M sequences $v_1$ to $v_4$. Merely for brevity of description, let it be assumed that the first through the fourth SS modems 46 to 49 send first through fourth information signals $a_1(t)$ to $a_4(t)$ to the third SS modem 48, the first SS modem 46, the fourth SS modem 49, and the second SS modem 47, respectively. The second PN code sequence generators 91's of the first through the fourth SS modems 46 to 49 should generate first through fourth modulation PN code sequences $p_1'(t)$, $p_2'(t)$, $p_3'(t)$, and $p_4'(t)$, respectively, in compliance with:

$$p_1'(t) = p_2(t)p_3(t),$$
$$p_2'(t) = p_3(t)p_4(t)p_1(t),$$
$$p_3'(t) = p_4(t),$$

and
$$p_4'(t) = p_1(t)p_2(t).$$

Under the circumstances, first through fourth SS signals $r_1(t)$, $r_2(t)$, and $r_4(t)$ arriving at the first through the fourth SS modems 46 to 49 are SS multiplex signals given by:

$$r_1(t) = p_3(t)p_4(t)p_2'(t) + p_4'(t)a_4(t),$$
$$r_2(t) = p_1(t)p_4'(t)a_4(t) + p_1'(t)a_1(t),$$
$$r_3(t) = p_2(t)p_1'(t)a_1(t) + p_2(t)a_2(t),$$

and $$r_4(t) = p_3(t)p_2'(t)a_2(t) + p_3'(t)a_3(t),$$

respectively. At the first SS modem 46, the first multiplied signal $r_1'(t)$ is:

$$r_1'(t) = p_1(t)r_1(t)$$
$$= a_2(t) + p_1(t)p_4'(t)a_4(t),$$

because:

$$p_1(t)p_3(t)p_4(t)p_2'(t) = 1.$$

The SS multiplex signal sent to the second SS modem 47 is, in fact:

$$p_1(t)p_4'(t)a_4(t) + p_1'(t)a_1(t).$$

In the ROM 79 (FIG. 5) of the second M sequence generator 91 of each SS modem, the addresses should be loaded with initial values of the M sequences decided as exemplified above. In the arrangement depicted in FIG. 1, the ROM addresses in the first SS modem 46 are loaded, for selection of the SS modems 47, 48, 49, and 50 as the destination SS modems, respectively, with the initial values of M sequences:

$p_2(t)$, $p_2(t)p_3(t)$, $p_2(t)p_3(t)p_4(t)$, and $p_2(t)p_3(t)p_4(t)p_5(t)$, where $p_5(t)$ represents the M sequence assigned to the SS modem 50 for demodulation.

Turning to FIG. 8, an SS modem according to a modification of the SS modem illustrated with reference to FIG. 7 comprises similar parts designated by like reference numerals. In the combining circuit, the order of connection of the high-pass filter 81 and the adder 83 is reversed. The adder 83 adds the first and the second multiplied signals into a sum signal.

Let the SS modem by receiving an SS signal carrying a particular information signal $a(t)$ to be received and sending another SS signal in which an M sequence $p'(t)$ decided in consideration of a destination SS modem and at least one transit SS modem, if any, carries a transmission information signal $a'(t)$. The first multiplied signal is given by $[a(t)+d(t)]$, where $d(t)$ represents an interference signal of the wide frequency band. The second multiplied signal is represented by $a'(t)p'(t)$, which also has the wide frequency band. The high-pass filter 81 therefore rejects the information signal component $a(t)$, a low frequency interference component of the interference signal $d(t)$, and a low frequency component of the second multiplied signal $a'(t)p'(t)$. Inasmuch as each of the interference signal $d(t)$ and the second multiplied signal $a'(t)p'(t)$ has a low spectral energy density, the transmission information signal $a'(t)$ is little adversely affected in the transmission SS signal as is the case with the information signal or signals carried in the interference signal $d(t)$.

Among the low frequency components rejected by the high-pass filter 81, that of the first multiplied signal is most important because the same may comprise the information signal component $a(t)$ of an appreciable energy while the low frequency component of the second multiplied signal has a negligible energy. It is therefore possible to specify that the high-pass filter 81 as rejecting at least the low frequency component of the first multiplied signal.

Referring now to FIG. 9, a transmitter-receiver according to a third embodiment of this invention comprises a frame synchronizer in the selected one of the branch 65 and the tributary 75 (FIG. 4). In the illustrated example, the tributary 75 comprises the second loop transmission line section 42(2) and a third loop transmission section 42(3) farther from the high-pass filter 81 or the adder 83 (FIGS. 6 through 8) relative to the second section 42(2). The synchronizer is for supplying a frame synchronizing signal to the SS modems 46 through 49 and the SS modems, such as 50, of the SS multiplex communication network. The second section 42(2) may be long enough so that the synchronizer may look like a unit coupled to the loop transmission line 42 separately of the modems, such as 46 through 49, coupled thereto. The synchronizer will be described, assuming that cyclically bit shifted PN code sequences generated by clocks having a predetermined PN clock period in compliance with a single generating polynomial specifying a predetermined frame length N are assigned to the respective SS modems of the network, such as 46 through 50, and that the frame synchronizing signal is another PN code sequence generated by clocks of the predetermined PN clock period and having the predetermined frame length even when generated in compliance with a different generating polynomial. Such a frame synchronizing signal will be referred to as a synchronizing PN code sequence.

Turning temporarily to FIG. 10, an M sequence having a frame consisting of fifteen bits (+ − − + + − + − + + + + − − −) as depicted at (a) will be used as the synchronizing PN code sequence supplied by the frame synchronizer to the third loop transmission line section 42(3). As described before, the initial value given by a bit pattern of four leading bits (+ − − +) uniquely decides the M sequence and also defines the beginning of each frame.

Problems relating to circulation of the synchronizing PN code sequence through the loop transmission line 42 will be described, assuming that the loop transmission line 42 is L kilometers long. Signals travel through a transmission line, such as 42, with a delay of about five nanoseconds per meter irrespective of the material of the transmission line, namely, whichever of a metal coaxial cable and an optical fiber may be used as the transmission line. The synchronizing PN code sequence therefore returns to the synchronizer with a delay, called a loop delay, of about $5L \times 10^{-6}$ second after having once circulated through the loop transmission line 42 as shown in FIG. 10 at (b). Due to the loop delay, the returning PN code sequence has a frame phase having a frame phase difference $\Delta\phi$ relative to the sent PN code sequence.

Before start of communication among the SS modems of the network, the frame phase difference must be rendered equal to zero to synchronize the frame of the sent PN code sequence to the frame of the returning PN code sequence. It is possible to establish the frame synchronism by adjusting the PN clock rate of the clocks used as shift pulses for the M sequence generator shift register 76 (FIG. 5). The adjusted PN clock rate should be used also in generating the PN code sequences used as the modulation and the demodulation carriers in the respective SS modems. It is, however, possible to adjust the PN clock rate independently of the data clock rate or rates, provided that the frame period NT is kept so as not to exceed the data clock period $T_D$. The data clocks need not be synchronized to the PN clocks.

When the nominal PN clock rate is $f_0$ (hertzes), the number m of pulses of the synchronizing PN code sequence present on the loop transmission line 42 is:

$m = f_0 \times 5L \times 10^{-6}$ (pulses), which number may not necessarily be an integral multiple of the frame length N in general. Furthermore, the number m may vary depending on the ambient temperature and as a result of secular change of constants of the transmission line material. The PN clock rate should therefore be adjusted in a range $|\Delta f_0/f_0|$ given by:

$|\Delta f_0/f_0| \leq [N/2 + \Delta m]/m$
$= [N/(f_0 L)] \times 10^5 + \Delta m/m,$ where Δm/m represents a rate of variation in the number m. When the ambient temperature rises and falls 20° C. (40° C. in total), the rate of variation Δm/m resulting from the temperature change is about 200 ppm for a metallic transmission line and about 4 ppm when the transmission line is a silica optical fiber. The range $|\Delta f_0/f_0|$ is about 0.013 when the nominal PN clock rate is 200 MHz and the frame length N, one hundred and twenty-seven bits long. This is a range in which the oscillation frequency of a usual voltage controlled oscillator is variable. In other words, it is possiple to use a voltage controlled oscillator as the generator for the PN clocks.

Referring back to FIG. 9, the frame synchronizer comprises a first voltage controlled oscillator 95 for supplying PN clocks to a first M sequence generator 96 of the type illustrated with reference to FIG. 5. The voltage controlled oscillator 95 and the M sequence generator 96 serve as a controllable or synchronizing PN code sequence generator for generating a synchronizing M sequence with a controllable frame phase. An adder 99, to be described later, supplies the synchronizing M sequence to the third loop transmission line section 42(3). Having once circulated through the transmission line 42, the synchronizing M sequence returns to the synchronizer through the second loop transmission line section 42(2). As will become clear later, a first switch 101 is kept open during establishment of the frame synchronism. The returning M sequence is therefore supplied only to a delay synchronizer 102, which is a delay lock loop (usually abbreviated to DLL) as called in the art.

Referring to FIG. 11 afresh and to FIG. 10 again, the delay synchronizer 102 comprises a second voltage controlled oscillator 105 and a second M sequence generator 106 for generating a provisional or preparatory M sequence. As depicted in FIG. 10 at (c), the provisional M sequence has a bit pattern identical with the synchronizing M sequence and a frame delay τ relative to the returning M sequence illustrated in FIG. 10 at (b). The returning M sequence is supplied to a first multiplier 111 and multiplied by the provisional M sequence. The returning M sequence is supplied also to a second multiplier 112 and is multiplied by a delayed provisional M sequence given a delay of one PN clock period T by a first delay circuit 113 as depicted in FIG. 10 at (d). The first and the second multipliers 111 and 112 produce first and second product signals illustrated in FIG. 10 at (e) and (f) with the abscissae scaled by the frame phase delay τ. A subtractor 114 subtracts the first product signal from the second product signal to produce a difference signal. A loop filter 115 is for smoothing the difference signal to produce a control voltage, depicted in FIG. 10 at (g), for the second voltage controlled oscillator 105. In the illustrated example, the control is to raise and lower the oscillation frequency of the voltage controlled oscillator 105 when the control voltage is positive and negative, respectively. The delay synchronizer 102 reaches a stationary state when the frame phase delay τ becomes equal to −T/2. A second delay circuit 116 is for giving the provisional M sequence a delay of a half PN clock period T/2. The delay synchronizer 102 therefore generates a local M sequence in complete frame synchronism with the returning M sequence illustrated in FIG. 10 at (b).

In FIG. 9, the local M sequence is delivered to a second switch 117 left open during establishment of the frame synchronism. A synchronism monitor 118 is connected to the delay synchronizer 102 to monitor whether or not the local M sequence is in frame synchronism with the returning M sequence as will shortly be described. The synchronism monitor 118 produces a switching signal with a first and a second value when the local M sequence is in and out of frame synchronism with the returning M sequence, respectively. When the switching signal has the first and the second values, each of the first and the second switches 101 and 117 is closed and open, respectively.

Turning to FIG. 12 and referring to FIG. 10 once again, the synchronism monitor 118 is supplied with the first and the second product signals from the delay synchronizer 102 through monitor terminals 121 and 122 (also in FIG. 11). An adder 123 is for adding the first and the second product signals to produce a sum signal, which is smoothed by a low-pass filter 125 for producing a monitor signal depicted in FIG. 10 at (h). A comparator 126 is for comparing the monitor signal with a reference signal supplied to a reference input terminal 127 and having a reference level illustrated in FIG. 10 at (h) by a horizontal dashed line. The comparator 126 produces the switching signal.

Again in FIG. 9, the first M sequence generator 96 and the delay synchronizer 102 are accompanied by first and second frame detectors 131 and 132. As will later be described, each frame detector 131 or 132 is connected to the parallel signal output leads of the M sequence generator shift register 76 (FIG. 5) to detect the contents of the respictive shift register stages. When the synchronizing M sequence has a frame consisting of fifteen bits of a bit pattern exemplified above, the frame beginning is an instant at which the contents of the first through the fourth (last) shift register stage becomes (+ − − +). The first and the second frame detectors 131 and 132 produce first and second frame position signals illustrated in FIG. 10 at (i) and (j). Responsive to the first and the second frame position signals, a frame phase comparator 133 produces a frame phase difference signal representative of the frame phase difference Δφ. After smoothed by a loop filter 135, the phase difference signal controls the first voltage controlled oscillator 95. The control is to raise and lower the PN clock rate of the voltage controlled oscillator 95 when the controllable frame phase of the sent synchronizing M sequence lags behind and leads a delayed frame phase of the returning M sequence, respectively. A stationary state will be reached when the frame synchronism is established. At this instant, the local M sequence is also in frame synchronism with the returning M sequence as well as with the sent M sequence.

The delay synchronizer 102 serves in effect to supply the returning M sequence to the frame phase comparator 133. The phase comparator 133, in turn, serves to compare the controllable frame phase with the delayed frame phase to produce the phase difference signal.

When the synchronizing M sequence sent to the third loop transmission section 42(3) is denoted by $p_s(t)$, the returning M sequence is expressed by $p_s(t-\Delta t)$, where Δt represents the loop delay and corresponds to the frame phase difference Δφ. The frame synchronism is established when the loop delay Δt becomes equal to an integral multiple of the frame periot NT by adujstment of the PN clock period T. If the frame synchronism is put into disorder during operation of the SS multiplex communication network, the delayed frame phase varies relative to the frame phase of the local M sequence. The synchronism monitor 118 gives the second value to the switching signal. Responsive to the switching signal of the second value, the first and the second switches 101 and 117 are rendered open. In due course, the local M sequence is made to follow the variation. The frame phase comparator 133 again controls the first voltage controlled oscillator 95 through the loop filter 135 to recover the frame synchronism.

As soon as the frame synchronism is either established or recovered, the first switch 101 is closed to supply the returning M sequence to a first-stage multiplier 136 together with an input SS (multiplex) signal, if any. In the illustrated example, the input SS signal is the second SS signal supplied to the second loop transmission line section 42(2) by an SS modem accompanied by the frame synchronizer. When the frame synchronizer is interposed in the first loop transmission line section 42(1), the input SS signal is the first SS signal. The second switch 117 is concurrently closed to deliver the local M sequence to the first-stage multiplier 136 and also to a second-stage multiplier 137. It is now possible to designate the returning M sequence by $p_s(t)$. The first-stage multiplier 136 produces a first-stage product signal given by:

$$p_s^2(t) + p_s(t)p(t)a(t),$$

where $p(t)a(t)$ represents the input SS signal. In the first-stage product signal, $p_s^2(t)$ is nearly equal to unity and is a d.c. component. A bypass filter 138 is for rejecting the d.c. component to supply an SS (multiplex) component $p_s(t)p(t)a(t)$ contained in the first-stage product signal to the second-stage multiplier 137. The second-stage multiplier 137 produces a second-stage product signal consisting of a substantial reproduction of the input SS signal $p(t)a(t)$. Supplied with the second-stage product signal, the adder 99 supplies the third loop transmission section 42(3) with a multiplex of the sent M sequence $p_s(t)$ and the substantial reproduction of the input SS signal $p(t)a(t)$.

Turning to FIG. 13, a frame detector 131 or 132 may comprise first through fourth comparators 141, 142, 143, and 144, each of which may be an Exclusive NOR gate having a first and a second input terminal and an output terminal. The contents of the first through the fourth (last) stages of the M sequence generator shift register 76 (FIG. 5) are supplied to the first input terminals of the respective comparators 141 to 144 through the parallel signal output leads of the shift register 76. Bits of a reference pattern representative of the particular bit pattern defining the initial value and consequently the frame beginning are supplied to the second input terminals of the respective comparators 141 through 144 from a code or pattern generator 145. Output signals of the comparators 141 through 144 are supplied to an AND gate 146, which produces a logic "1" signal as the frame position signal depicted in FIG. 10 at (i) or (j).

Referring now to FIG. 14, an SS modem according to a fourth embodiment of this invention is connected to the first and the second loop transmission line sections 42(1) and 42(2) and is operable in a selected one of a communicating mode of communicating with a preselected SS modem of the SS multiplex communication network, a monitoring or carrier sensing mode of sensing whether or not the preselected SS modem is already busy, namely, in the communicating mode, a broadcast transmitting mode of transmitting a transmission information signal to other SS modems having a broadcast receiving facility, and a broadcast receiving mode of receiving a broadcast SS signal from another SS modem. In the communicating mode, the SS modem sends a transmission information signal to the preselected SS modem and receives a particular information signal therefrom. The illustrated SS modem is of the type illustrated with reference to FIG. 5 and is operable with cyclically bit shifted PN code sequences generated by clocks having a predetermined PN clock rate in compliance with a single generating polynominal. Different ones of the cyclically bit shifted PN code sequences are assigned to the respective SS modems as demodulation PN code sequences.

One of such PN code sequences is assigned to all SS modems as a common PN code sequence for carrying a broadcast information signal. The PN code sequence assigned in common to all SS modems may be a PN code sequence generated by clocks having the predetermined PN clock rate in compliance with a different generating polynominal. It is, however, preferred that the common PN code sequence be generated also in compliance with the single generating polynominal. This is because of the simplicity of the PN code sequence generators to be used in the SS modem. At any rate, it is necessary that the network is capable of transmitting a frame synchronizing signal to the SS modems. The frame synchronizing signal may be provided (1) by a synchronizing PN code sequence as described in conjunction with FIG. 9, (2) by frame synchronizing pulses transmitted as will later be described, or (3) by a frame synchronizing signal transmitted throught a specific signal transmission line separate from the transmission line 41. It will be assumed in the following that the scheme (1) is resorted to. Incidentally, the SS modem is normally operable in the broadcast receiving mode.

The SS modem comprises similar parts designated by like refernece numerals. The branch 65 comprises first through third subbranches 65(1), 65(2), and 65(3). The third subbranch 65(3) is novel. The first subbranch 65(1) is connected to the first multiplier 66. Responsive to the synchronizing PN code sequence supplied through the second subbranch 65(2) together with the first SS signal, a synchronizing signal regenerator 147 regenerates the synchronizing PN code sequence and recovers the PN clocks for use as the frame synchronizing signal and the PN clocks. The synchronizing signal regenerator 147 may comprise a DLL, illustrated with reference to FIG. 11, and delivers the regenerated synchronizing signal and the PN clocks to the first and the second PN code sequence generators 67 and 71 through a pair of signal leads.

By using the PN clocks and the regenerated synchronizing signal, the first PN code sequence generator 67 generates the first PN code sequence unless the SS modem is in the broadcasting mode as will presently become clear. The first PN code sequence is, as described before, the PN code sequence assigned to the SS modem as the demodulator PN code sequence for an SS signal component in which the first PN code sequence carriers a particular information signal. The second PN code sequence generator 71 normally generates the common PN code sequence. Only on initiating a call to a destination SS modem and during the communicating mode, the second PN code sequence generator 71 generates the second PN code sequence assigned to the destination SS modem. The ROM 79 (FIG. 5) has an additional address for normally producing an initial value for the common PN code sequence.

A control circuit 149 is for producing a control signal normally given a first value for use in the broadcast receiving mode and in the monitoring mode. A second value is given to the control signal only in the broadcast transmitting and the communicating modes. The control circuit 149 may be a microprocessor and will later be described again. Responsive to the control signal of the first value, a first switch 151 connects the second multiplier 72 to the third subbranch 65(3). The first SS signal is delivered to the second multiplier 72 as an input signal. Only when the control signal takes the second value, the first switch connects the second multiplier 72 to the information input terminal 61. The transmission information signal is delivered to the second multiplier 72 as the input signal.

Supplied with the control signal of the first value, a second switch 152 connects the second multiplier 72 to a low-pass filter 153 having a cutoff frequency at the upper frequency edge $f_D$ of the narrow frequency band. Only when the control signal is given the second value, the second switch 152 connects the second multiplier 72 to the adder 83. In order to discriminate from the low-pass filter 68 described heretobefore, the low-pass filter 153 will be called a first low-pass filter and the low-pass filter 68, a second low-pass filter.

For convenience of further description, the adder 83 will be said to add the third multiplied signal and an addend signal into the transmission SS signal. When the control signal has the first value, the adder 83 is supplied with no signal as the addend signal. In this event, the adder 83 delivers the third multiplied signal alone to the second loop transmission line section 42(2) as the transmission SS signal. When the control signal has the second value, the second multiplied signal is supplied to the adder 83 as the addend signal.

In the broadcast receiving mode, the third multiplier 82 substantially regenerates the reception SS signal supplied to the first multiplier 66. The adder 83 sends the regenerated SS signal to the second section 42(2). The broadcast information signal originating with a certain SS modem is reproduced through the second multiplier 72 and the first low-pass filter 153 and then supplied to a selector or multiplexer 154. Responsive to the low frequency signal supplied from the first low-pass filter 153 with an appreciable amplitude, the control circuit 149 produces a selection signal with a first level to make the selector 154 deliver the low frequency signal, which is now the broadcast information signal, to the discrimination circuit 69. The control circuit 149 may normally give the selection signal a second level of making the selector 154 connect the second low-pass filter 68 to the discrimination circuit 69.

On initiating communication with a destination SS modem, it is desirable to preliminarily confirm that the destination SS modem is idle. If not, the reception SS signal would comprise an SS signal in which the PN code sequence assigned to the destination SS modem carries an information signal. In the monitoring mode, the control signal is left at the first value. Responsive to the address signal specifying the destination SS modem, the second PN code sequence generator 71 generates the second PN code sequence assigned to the destination SS modem. According as the second PN code sequence is present and absent in the reception SS signal, the first low-pass filter 153 produces a low frequency signal of an appreciable and a negligible level, respectively.

Responsive to the low frequency signal produced by the first low-pass filter 153 with an appreciable level, the control circuit 149 switches the selection signal from the second level to the first level. The low frequency signal, passing through the selector 154 and the discrimination circuit 69, may give an indication of incapability of communicating with the destination SS modem. The control circuit 149 may furthermore produce a monitor output signal indicative of the incapability through a signal output lead (not shown).

When the destination SS modem is idle, the selection signal is kept at the second level. The discrimination circuit 69 may produce a signal indicative of capability of communicating with the destination SS modem. Alternatively, the monitor output signal may be used to indicate the capability.

On entering the communication mode, the control circuit 149 is manually or otherwise dealt with so that the control signal may be switched from the first value to the second value. The circuitry is rendered similar to that illustrated with reference to FIG. 6.

On initiating broadcast transmission, the fact that none of other SS modems is broadcasting is readily known by the output of the first low-pass filter 153 even without the carrier sense for the common PN code sequence. The control circuit 149 is made to switch the control signal from the first value to the second value. The selection signal may be left at the second level. The second PN code sequence generator 71 is kept at the state of generating the common PN code sequence. It is now possible to begin broadcast transmission to other SS modems.

Throughout the broadcast transmitting mode, the first PN code sequence generator 67 is made to generate the common PN code sequence. This is for preventing the transmission information signal broadcast from the illustrated SS modem from being repeatedly received by other SS modems. Such a first PN code generator 67 is readily implemented by adding another code or pattern generator thereto besides that described in connection with FIG. 5.

Figure 15:
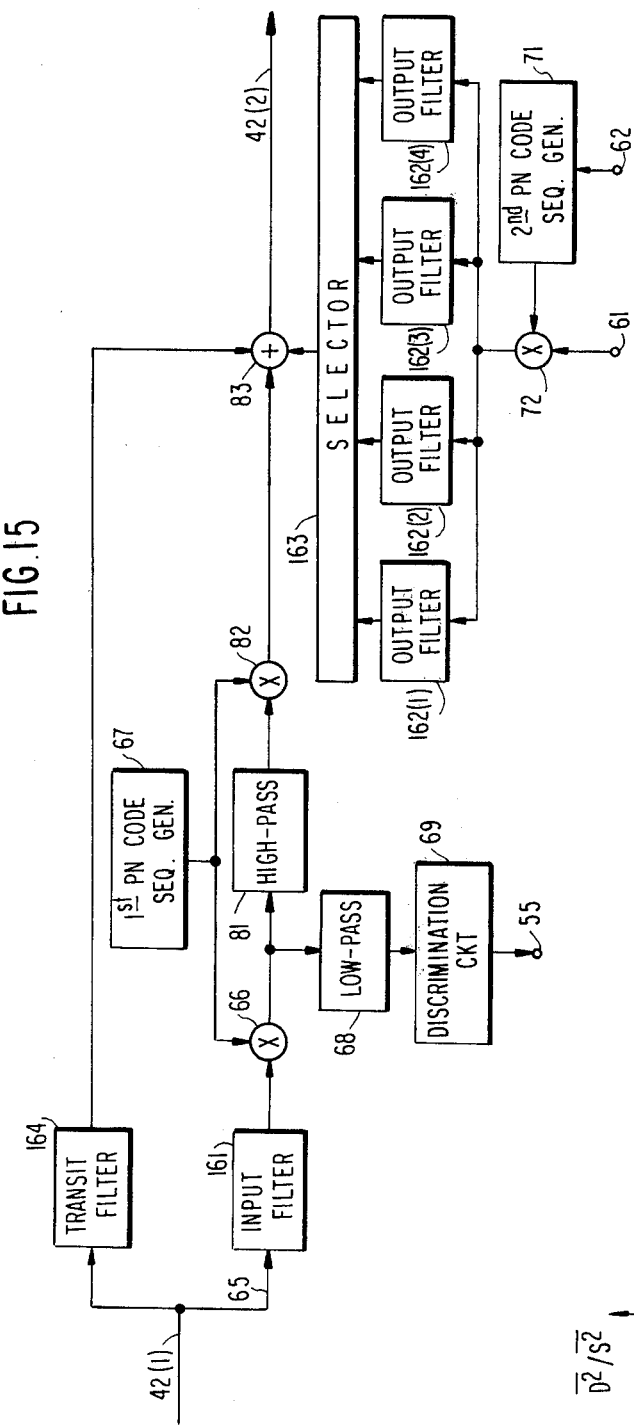
FIG. 15 is a block diagram of an SS modem according to a fifth embodiment of this invention.

Referring now to FIG. 15, an SS modem according to a fifth embodiment of this invention is of the type illustrated with reference to FIG. 6. The SS modem is for use in an SS multiplex communication network to which the wide frequency band B or [0, $f_0$] is allotted and in which SS multiplex communication is carried out with the wide frequency band divided into first through I-th partial frequency bands B(i)'s having a substantially common bandwidth b, where I represents an integer greater than unity and i, an integer between unity and I, both inclusive. The i-th partial frequency band B(i) has an i-th lower frequency edge $f_i$. The first lower frequency edge $f_1$ is a substantially zero frequency. As will become clear as the description proceeds, the lower frequency edges $f_i$'s are preferably selected so that the partial frequency bands may not substantially overlap one another. If desired, the i-th partial frequency and B(i) may be represented by [$f_i$, $f_i$+b].

The network is a novel SS multiplex communication network, which may be called a band division SS multiplex communication network. The reception SS signal r(t) described heretobefore would no longer be similar to the transmission SS signal s(t). The SD ratio will therefore be analysed in the following. The results of analysis have been confirmed by computer simulation studies. In the band division SS multiplex communication network, the cyclically bit shifted M sequences generated in compliance with a single generating polynominal are preferred for use as the PN code sequences in carrying information signals.

Figure 16:
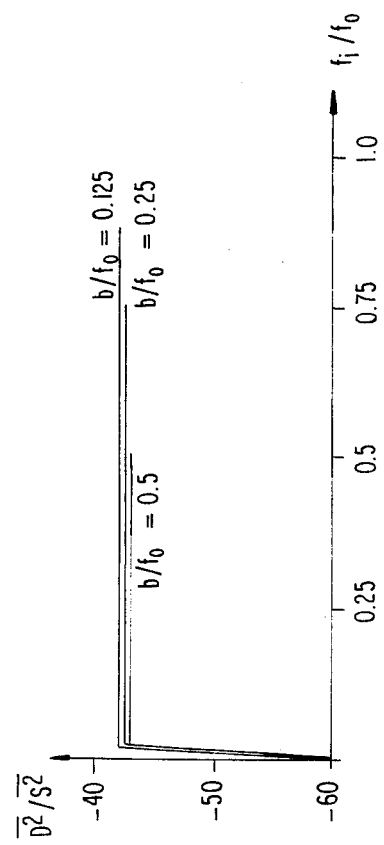
FIG. 16 shows distortion-to-signal ratios for use in describing the principles on which the SS modem illustrated in FIG. 15 is based.

Turning to FIG. 16, the reciprocal of the SD ratio, namely, $\overline{D^2}/\overline{S^2}$, of a single SS channel was calculated for various partial frequency bands B(i)'s. For convenience of analysis, the lower frequency edge $f_l$ of each partial frequency band and the common partial bandwidth b will be normalized by the PN clock rate $f_0$ of the M sequences. The abscissa is scaled by the normalized lower frequency edge $f_l/f_0$. The reciprocal of the SD ratio is plotted in decibel with the normalized partial bandwidth $b/f_0$ used as a parameter. Curves show the reciprocals for typical normalized partial bandwidths of 0.5, 0.25, and 0.125 as labelled, namely, for common partial bandwidths equal to a half, a quarter, and an eighth of the entire bandwidth B/2, B/4, and B/8.

As seen from FIG. 16, the reciprocal of the SD ratio and consequently the SD ratio is almost independent of the lower frequency edge $f_l$ and dependent only on the partial bandwidth b. It is therefore possible to divide the whole wide frequency band B into a plurality of partial frequency bands B(i)'s with the common partial bandwidth selected in consideration of an allowable SD ratio. The "substantially common" partial bandwidth may also vary according to the allowable SD ratio. With SS modems of the network classified into a plurality of groups as will presently be described, such partial frequency bands are allotted to the respective groups. Different ones of the M sequences are assigned to the SS modems in each group, respectively.

Referring back to FIG. 15, the SS modem comprises similar parts designated by like reference numerals and is coupled to the first and the second loop transmission line sections 42(1) and 42(2). The SS modem belongs to a group allotted with a particular partial frequency band and is assigned with a particular M sequence. The whole wide frequency band except for the particular partial frequency band will collectively be called a remaining partial frequency band. An SS multiplex signal will be considered as the first SS signal described hereinabove. The first SS signal comprises a particular and a remaining SS (multiplex signal) component in the particular and the remaining partial frequency bands, respectively. The particular SS component comprises a specific SS (signal) component in which the particular M sequence carries a particular information signal to be received at the SS modem. The particular SS component further comprises an interference signal as called hereinabove.

The SS modem comprises an input filter 161 in the branch 65 leading from the first loop transmission line section 42(1) to the first multiplier 66. The input filter 161 has a passband at the particular partial frequency band. Responsive to the first SS signal, the input filter 161 extracts the particular SS component to produce the same as the reception SS signal. The reception SS signal is supplied to the first multiplier 66 as before.

For transmission of a transmission information signal to a destination SS modem assigned with a preselected M sequence in a specific group allotted with a preselected partial frequency band, the SS modem comprises first through I-th output filters 162(i)'s having passbands at the first through the I-th partial frequency bands B(i)'s, respectively. Responsive to the second multiplied signal which is already an SS signal, the output filters 162(i)'s produce partial band SS signals in the first through the I-th partial frequency bands, respectively. Supplied with the address signal from the address input terminal 62 through a connection not shown, a selector 163 selects one of the partial band SS signals as a specific partial band SS signal that is in the preselected partial frequency band. The specific partial band SS signal is delivered to the adder 83. The selector 163 may be interposed between the second multiplier 72 and the output filters 162(i)'s. The illustrated arrangement is preferred because of the bandwidth to be dealt with. It is possible to understand that the output filters 162(i)'s and the selector 163 are included in the combining circuit. The third multiplier 82 substantially regenerates the interference signal as before.

The combining circuit further comprises a transit filter 164 for rejecting the particular SS component from the first SS signal to produce the remaining SS component as a particular SS component rejected signal. Supplied with the remaining SS component, the adder 83 serves as a composing circuit for supplying the second loop transmission line section 42(2) with the second SS signal in which the low frequency component is rejected from the first multiplied signal.

The SS modem illustrated with reference to FIG. 15 may comprise only one output filter having a passband at the particular partial frequency band. In this event, the SS modem is capable of communicating with those of the SS modems of the network which are accommodated by only on group allotted with the particular partial frequency band.

The SS modem may comprise the circuitry illustrated with reference to any one of FIGS. 4, 7, and 8 rather than that illustrated with reference to FIG. 6. When the circuitry of FIG. 4 is used, either the single output filter or a combination of the output filters 162(i)'s and the selector 163 should be placed in the tributary 75. It may be mentioned here that an adder should be used at a point of junction of the tributary 75 and the up transmission line 43(1). The adder, such as 83, 99, or 123, used throughout the SS modems may either be a differential amplifier or a resistance adder. The adder 83 used in the circuitry of FIG. 15 may readily be implemented by a resistance adder having three tributaries connected to the third multiplier 82, the selector 163, and the transit filter 164.

Use of the circuitry illustrated with reference to FIG. 7 will now be self-evident. When the circuitry of FIG. 8 is used, either the single output filter or a combination of the output filters 162(i)'s and the selector 163 should be placed between the second multiplier 72 and the adder 83. The output signals of the high-pass filter 81 and the transit filter 164 are composed into the transmission SS signal by another adder (not shown).

Figure 17:
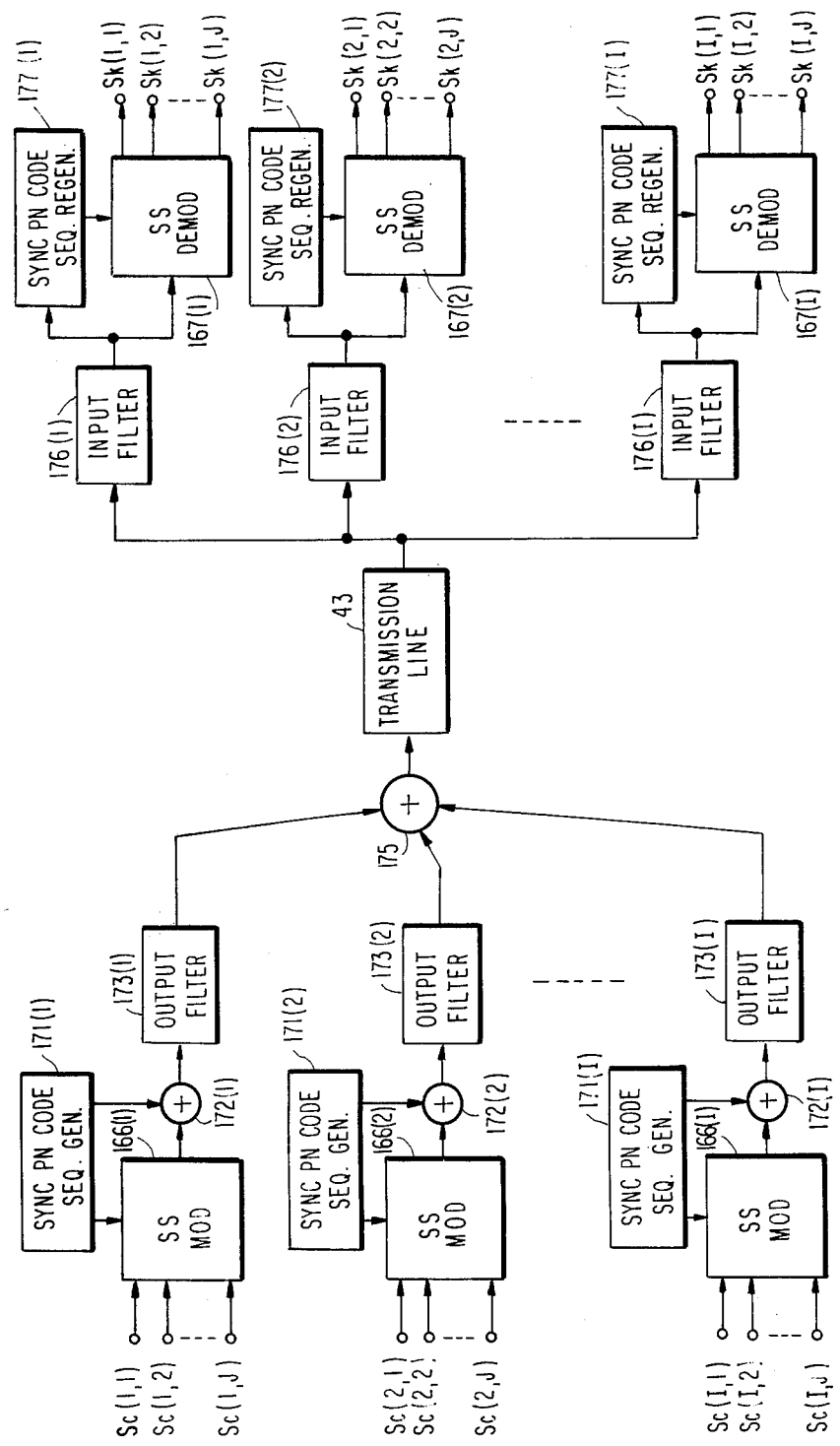
FIG. 17 is a block diagram of an SS multiplex communication network comprising SS modems of the type shown in FIG. 15.

Referring to FIG. 17, an SS modem of the type illustrated with reference to FIG. 15 is specifically preferred for use in an SS multiplex communication network for concentrating transmission information signals originating with a plurality of information sources into a SS multiplex signal and for distributing an SS multiplex signal into reception information signals for a plurality of information sinks. Merely for simplicity of description, it will be assumed that the information sources are coupled to the transmission line 43 through first through I-th SS multiplex modulators 166(i)'s and the information sinks, through first through I-th SS demodulators 167(i)'s.

The information sources are divided into first through I-th groups of sources Sc(i, j)'s, each consisting of first through J-th sources, where J represents an integer greater than unity and j, an integer between unity and J, both inclusive. The i-th group of information sources Sc(i, j)'s are accommodated by the i-th SS multiplex modulator 166(i). The information sinks are classified into first through I-th groups of sinks Sk(i, j)'s, each consisting of first through J-th sinks. The i-th group of information sinks Sk(i, j)'s are accommodated by the i-th SS multiplex demodulator 167(i). The first through the I-th partial frequency bands B(i)'s are allotted to the respective sets of SS multiplex modulators and demodulators 166(i)'s and 167(i)'s. A j-th one of the M sequences $p_j(t)$ is assigned to the j-th information sink Sk(i, j) of each group. Communication is carried out from a certain one of the information sources of the i-th group Sc(i, j)'s to the j-th information sink of the i-th group Sk(i, j) by using the j-th M sequence as the modulation carrier. The information sources and sinks are, in practice, subscribers. The number J of subscribers in each group should not exceed the frame length N of the M sequences.

The i-th SS multiplex modulator 166(i) is accompanied by an i-th synchronizing signal generator 171(i) for generating an i-th frame synchronizing signal and an i-th synchronizing M sequence of the type described in conjunction with FIG. 9 and having the same frame phase. The i-th SS multiplex modulator 166(i) comprises first through J-th modulation M sequence generators (not shown), each corresponding to the second M sequence generator 71 described in connection with FIG. 4 or 6. Controlled by the i-th frame synchronizing signal, the first through the J-th modulation M sequence generators generate first through J-th modulation M sequences $p_1(t)$ to $p_J(t)$ in the manner described in connection with FIG. 14. The i-th SS multiplex modulator 166(i) further comprises first through J-th SS modulators (not shown), each corresponding to the second multiplier 72. The j-th SS modulator modulates a pertinent one of the M sequences by a j-th transmission information signal $a_j(t)$ originating with the j-th subscriber Sc(i, j) of the i-th group and produces a j-th transmission SS signal. An adder (not shown) in the i-th SS multiplex modulator 166(i) sums up the first through the J-th transmission SS signals into an i-th SS multiplex signal s(t). An i-th adder 172(i) adds the i-th SS multiplex signal and the i-th synchronizing M sequence into an i-th transmission multiplex having the frequency components in the wide frequency band B.

An i-th output filter 173(i) having a passband at the i-th partial frequency band B(i) is for restricting the frequency band of the i-th transmission multiplex to the i-th partial frequency and and produces an i-th partial band transmission multiplex. The i-th transmission SS multiplex signal s(t) is included in the i-th partial band transmission multiplex as an i-th partial band transmission SS multiplex signal. The i-th synchronizing M sequence is comprised as an i-th partial band synchronizing M sequence. A totalizer 175 is for totalizing the first through the I-th partial band transmission multiplexes having frequency bands B(1) through B(I), respectively, into a single transmission multiplex, which is delivered to the transmission line 43. As will later be described again, the totalizer 175 may be a plurality of adders for summing up the partial band transmission multiplexes produced by the output filters 173(i)'s scattered along the transmission line 43. The first through the I-th synchronizing M sequences may have a generating polynominal in common.

A single reception multiplex obtained at the receiving end of the transmission line 43 is supplied to first through I-th input filters 176(i)'s having passbands at the first through the I-th partial frequency bands B(i)'s, respectively. The single reception multiplex is distributed into first through I-th partial band reception multiplexes having frequency bands in the first through the I-th partial frequency bands B(1) to B(I), respectively. The i-th partial band reception multiplex comprises an i-th partial band reception SS multiplex signal and an i-th partial band synchronizing M sequence. The i-th partial band reception SS multiplex signal is a substantial reproduction of the i-th partial band transmission SS multiplex signal and will be denoted by s'(t). The i-th partial band synchronizing M sequence is a substantial reproduction of the i-th synchronizing M sequence with the frequency band restricted to the i-th partial frequency band B(i). The i-th partial band reception multiplex is delivered to the i-th SS multiplex demodulator 167(i).

An i-th synchronizing signal regenerator 177(i), similar to the synchronizing signal regenerator 147 described in connection with FIG. 14, accompanies the i-th SS multiplex demodulator 167(i). Responsive to the i-th partial band reception multiplex, the i-th synchronizing signal regenerator 177(i) regenerates the i-th synchronizing M sequence of the wide frequency band B. The i-th SS multiplex demodulator 167(i) comprises first through J-th demodulation M sequence generators, first through J-th correlation detectors, first through J-th low-pass filters, and first through J-th discrimination circuits (not shown) like the SS modem illustrated with reference to FIG. 4 or 6 which comprises the first M sequence generator 67, the first multiplier 66, the low-pass filter 68, and the discrimination circuit 69. As described in conjunction with FIG. 14, the j-th demodulation M sequence generator generates the j-th M sequence $p_j(t)$ of the wide frequency band. The j-th correlation detector produces a j-th correlation output signal. The j-th low-pass filter extracts a low frequency signal, which will now be designated by $r_j(t)$, of the j-th correlation output signal. The j-th discrimination circuit supplies the j-th subscriber of the i-th group Sk(i, j) with a reproduction of a particular information signal carried by the j-th M sequence $p_j(t)$.

Figure 18:
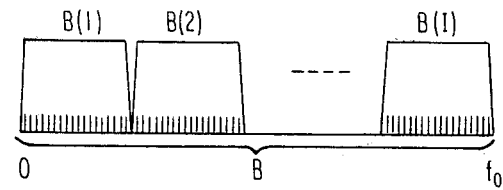
FIG. 18 diagrammatically shows a plurality of partial frequency bands and a plurality of synchronizing signals used in the network depicted in FIG. 17.

Turing to FIG. 18, the single multiplex transmitted through the transmission line 43 has frequency components in the whole wide frequency band B or [0, $f_0$]. The i-th partial band SS multiplex signal has frequency components in the i-th partial frequency band B(i). The i-th partial band synchronizing M sequence has frequency components also in the i-th partial frequency band B(i) as indicated by short upright lines.

Referring back to FIG. 17, it will be presumed merely for simplicity of denotation that one and others of the first through the J-th subscribers of the i-th group Sc(i, j)'s are sending first through J-th transmission information signals $a_j(t)$'s to the first through the J-th subscribers of the i-th group Sk(i, j)'s, respectively, through the i-th SS multiplex modulator 166(i) and the i-th SS multiplex demodulator 167(i). The i-th transmission SS multiplex signal s(t) is given by:

$$s(t) = \sum_{j=1}^{J} p_j(t)a_j(t).$$

When an i-th partial band transmission channel between the i-th output filter 173(i) and the i-th input filter 176(i) has a transfer function H(ω) of an impulse response h(t), the i-th partial band reception SS multiplex signal s'(t) is given by:

$$s'(t) = \sum_{j=1}^{J} [p_j(t)a_j(t)]*h(t)dt,$$

where the symbol * represents the convolution integration.

The j-th demodulation M sequence generator generates the j-th demodulation M sequence $p_j(t)$. As described with reference to FIG. 4, the correlation output signal produced by the j-th correlation detector comprises an information signal component of an appreciable amplitude and an interference signal of a low spectral energy density. The low frequency signal $r_j(t)$ produced by the j-th low-pass filter is represented by:

$$r_j(t) = \int_0^{NT} p_j(t)s'(t)dt,$$

and comprises the information signal component and a low frequency interference component of a negligible energy. The j-th discrimination circuit samples the low frequency signal at a sampling period equal to the frame period NT to produce a j-th sequence of samples which comprise a reproduction of the j-th transmission information signal as a desired signal and a sequence of samples of the low frequency interference component. As pointed out in conjunction with FIG. 4, an intercode interference component is superposed on the desired signal.

When the data clock period $T_D$ is not equal to the frame period NT, the reset or dump integrator used as the low-pass filter should be reset at an interval equal to the data clock period $T_D$. The sampling period should be equal also to the data clock period $T_D$.

Figure 19:
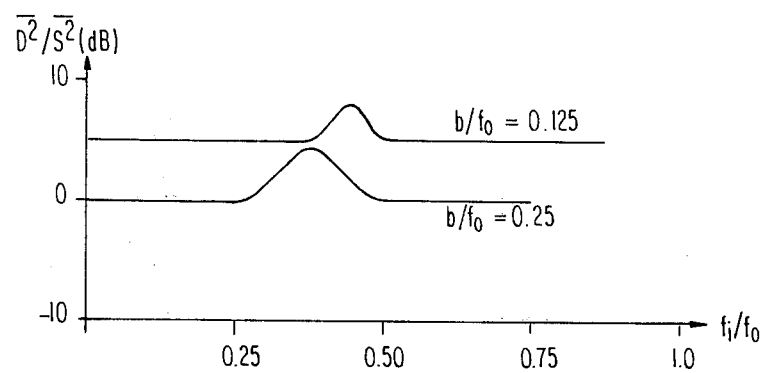
FIG. 19 shows distortion-to-signal ratios for use in describing the principles on which the network shown in FIG. 17 is based.

Referring to FIG. 19, the desired signal will be designated by S as before and the intercode and the interchannel interference components, by $D_1$ and $D_2$. In the SD ratio, the mean square $D^2$ will be defined by:

$$\overline{D^2} = \overline{D_1^2} + \overline{D_2^2}.$$

On investigating the SD ratio, let cyclically bit shifted M sequences generated in compliance with a single generating polynomial for a frame length of one hundred and twenty-seven bits be assigned to one hundred and twenty-seven subscribers, respectively. The reciprocal of the SD ratio is again plotted versus the normalized lower frequency edge $f_i/f_0$ for the normalized partial bandwidths b/$f_0$ of 0.125 and 0.25.

As seen from FIG. 19, the SD ratio is again almost independent of the lower frequency edge $f_i$ unless the lower frequency edge is at or near the center of the whole wide frequency band B. Except for a center portion of the entire frequency band B, the SD ratio depends on the partial bandwidth b. When the wide frequency band B is divided into four, a band division SS multiplex communication network can accommodate five hundred and eight subscribers dealing with speech signals of an average cell rate of 0.1 and an average activity of 0.25, when the SD ratio of as high as 16 dB is achieved.

Figure 20:
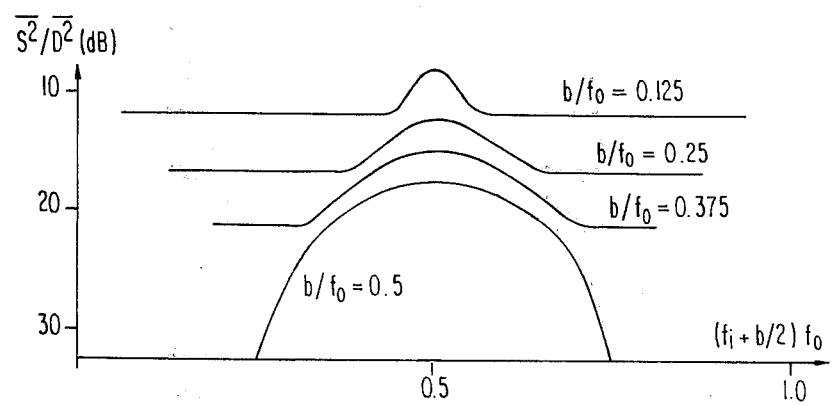
FIG. 20 shows signal-to-distortion ratios for use in describing the principles on which the network illustrated in FIG. 17 is based.

Turning to FIG. 20, each partial frequency band B(i) has a center frequency at $(f_i+b/2)$. When normalized by the PN clock rate $f_0$, the center frequency, or a normalized center frequency, is given by $(f_i+b/2)/f_0$. On calculating the SD ratio, the above-specified M sequences are again assigned to one hundred and twenty-seven subscribers, respectively. The SD ratio is plotted versus the normalized center frequency for the normalized partial bandwidths of 0.125, 0.25, 0.375, and 0.5 with the subscribers assumed to deal with speech signals of an average call rate of 0.05 and an average activity of 0.4. It is obvious from the plots that a normalized partial bandwidth of about 0.2 is sufficient in attaining an SD ratio of 13 dB under the circumstances. In view of the degradation in the SD ratio at and near the center frequency of the entire frequency band B, it is most preferred to divide the wide frequency band B into four partial frequency bands B(1) to B(4).

Figure 21:
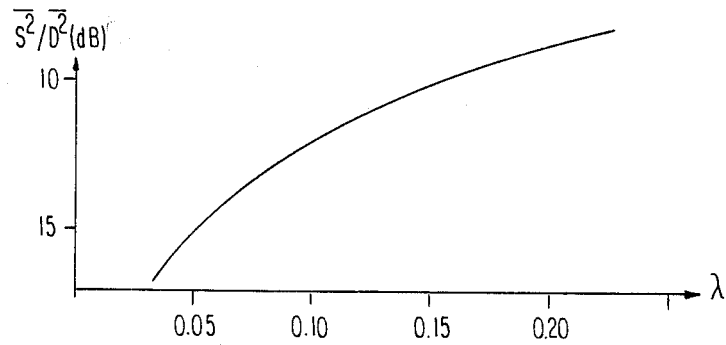
FIG. 21 shows an overload characteristic of an SS multiplex communication network.

Turning further to FIG. 21, an SS multiplex communication network is strong against overload. More specifically, the SD ratio does not objectionably degenerate as exemplified by a curve even when a call rate λ appreciably increases. The curve is plotted for speech signals of an average activity of 0.4.

Figure 22:
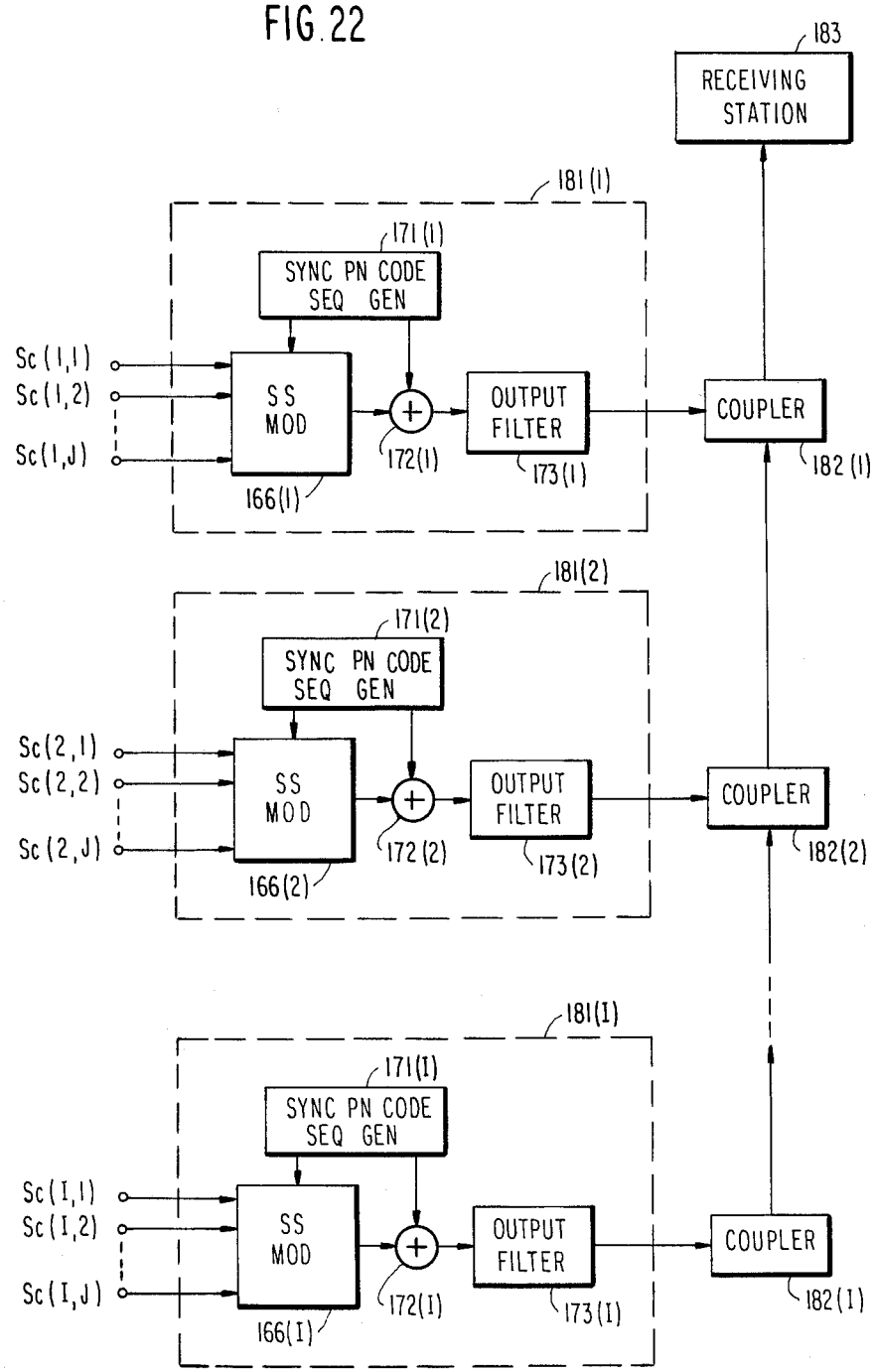
FIG. 22 is a block diagram of another SS multiplex communication network comprising SS modems of the type shown in FIG. 15.

Referring to FIG. 22, a band division SS multiplex communication network comprises first through I-th transmitting stations 181(i)'s allotted with the first through the I-th partial frequency bands B(i)'s, respectively, and scattered along an up transmission line 43(1), which may be called a highway. The i-th transmitting station 181(i) comprises an i-th SS multiplex modulator 166(i) for first through J-th subscribers or information sources Sc(i, j)'s, an i-th synchronizing signal generator 171(i), an i-th adder 172(i), and an i-th output filter 173(i) having a passband at the i-th partial frequency band B(i). The i-th partial band transmission multiplex produced by the i-th output filter 173(i) as described in conjunction with FIG. 17 is supplied to the highway 43(1) through an i-th coupler 182(i), which may be an adder in practice. Successively multiplexed at the I-th through the first couplers 182(i)'s into a single transmission multiplex, the first through the I-th partial band transmission multiplexes are delivered to a central receiving station 183, which is connected to the downstream end of the highway 43(1) and may comprise the SS multiplex demodulators 167(i)'s and others described in connection with FIG. 17. It is unnecessary that the first through the I-th partial frequency bands B(i)'s be always allotted to the transmitting stations 181(i)'s in the order from the downstream or the upstream end of the highway 43(1) to the other end.

Figure 23:
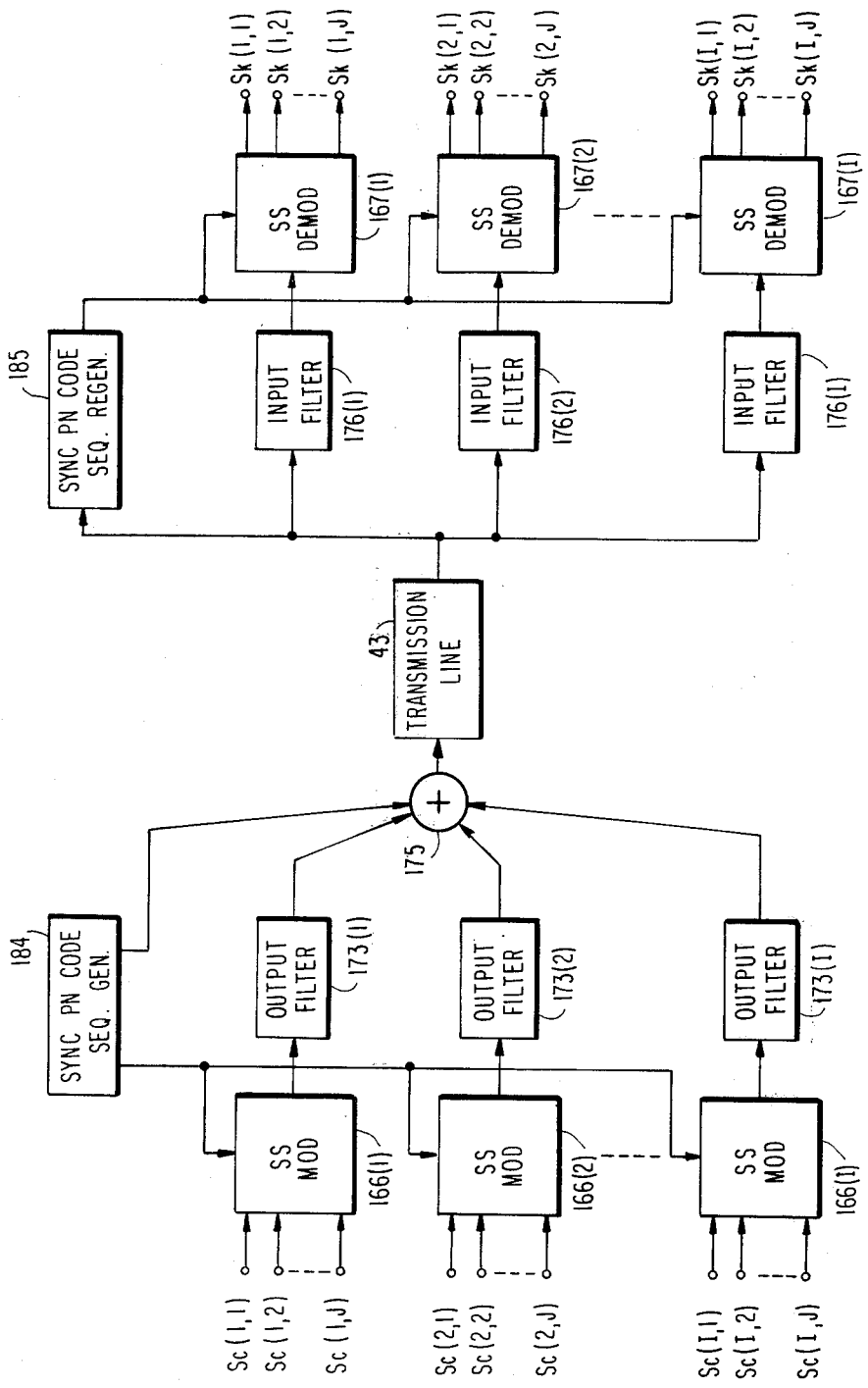
FIG. 23 is a block diagram of still another SS multiplex communication network comprising SS modems of the type depicted in FIG. 15.

Referring to FIG. 23, another band division SS multiplex communication network comprises similar parts designated by like reference numerals. A common synchronizing signal generator 184 is substituted for the first through the I-th synchronizing signal generators 171(i)'s. It is possible to supply the i-th SS multiplex signal directly to the i-th output filter 173(i) with the i-th adder 172(i) omitted. In this event, a single synchronizing M sequence is supplied to the totalizer 175. The synchronizing M sequence is transmitted through the transmission line 43 without the frequency band restricted.

Under the circumstances, a single synchronizing signal regenerator 185 is connected directly to the receiving end of the transmission line 43 in place of the first through the I-th synchronizing signal regenerators 177(i)'s and is shared by the first through the I-th SS multiplex demodulators 167(i)'s. Operation of the single synchronizing signal regenerator 185, the input filters 176(i)'s, and the SS multiplex demodulators 167(i)'s will be self-explanatory.

Figure 24:
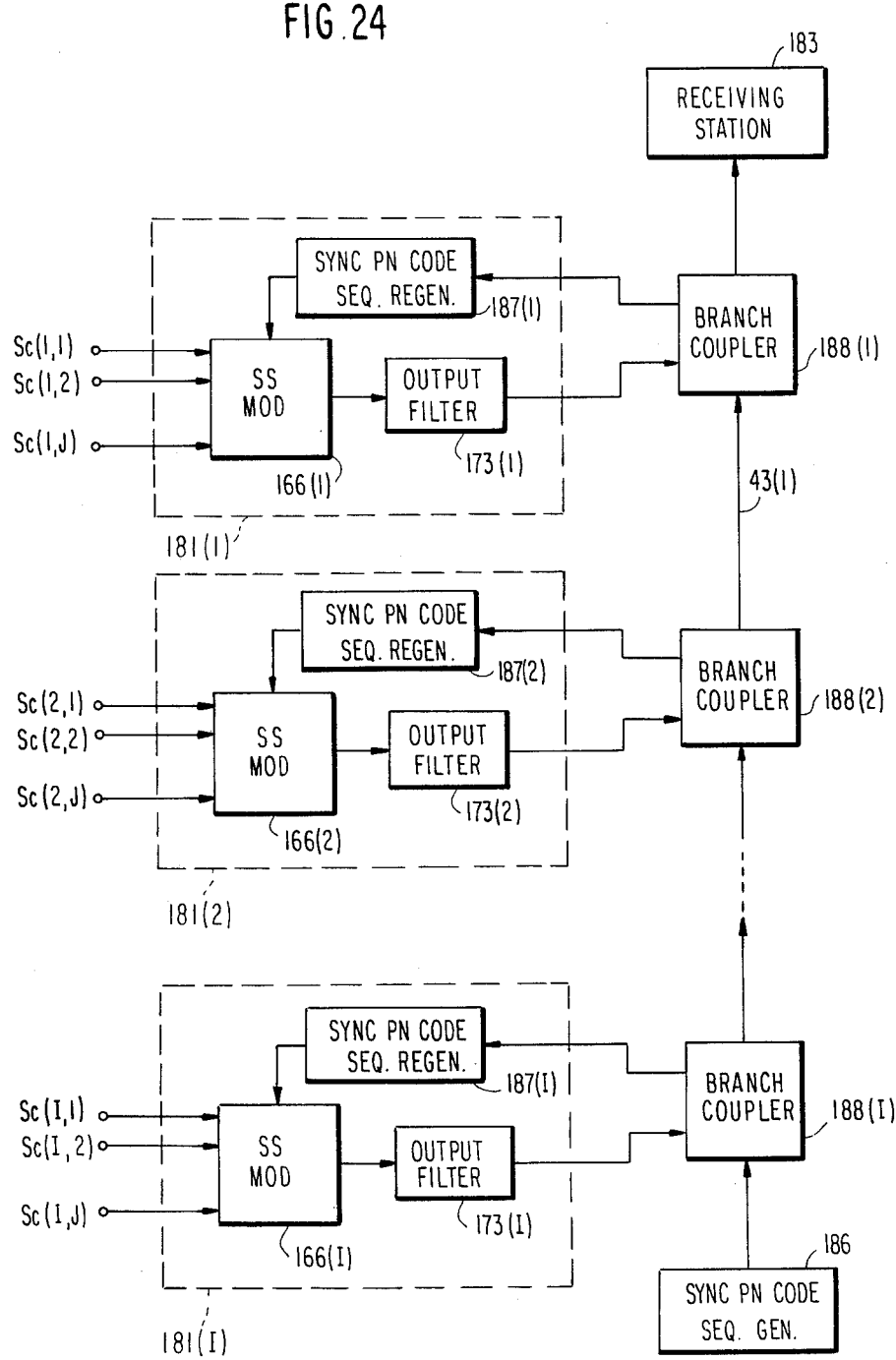
FIG. 24 is a block diagram of yet another SS multiplex communication network comprising SS modems of the type ilustrated in FIG. 15.

Referring to FIG. 24, still another band division SS multiplex communication network comprises first through I-th transmitting stations 181(i)'s allotted with the first through the I-th partial frequency bands B(i)'s, respectively, and scattered along the highway 43(1). A central receiving station 183 is connected to the upstream end of the highway 43(1). A common synchronizing signal generator 186, similar to the generator 184, is connected to the downstream end of the highway 43(1).

The i-th transmitting station 181(i) comprises similar parts designated by like reference numerals and an i-th synchronizing signal regenerator 187(i), similar to the regenerator 147 or 177(i), coupled to the highway 43(1) through an i-th branch-coupler 188(i) for recovering the PN clocks and regenerating the synchronizing M sequence from a wide-band synchronizing M sequence supplied from the common synchronizing signal generator 186. The i-th branch-coupler 188(i) may comprise elements corresponding to the second subbranch 65(2) (FIG. 14) and the i-th coupler 182(i). Responsive to the regenerated PN clocks and synchronizing M sequence, the i-th SS multiplex modulator 166(i) produces the i-th SS multiplex signal. The i-th partial band transmission multiplex produced by the i-th output filter 173(i) is delivered to the highway 43(1) through the i-th branch-coupler 188(i).

Reviewing FIGS. 17 and 22 through 24, it is reminded here that the same M sequence is assigned to the correlation detectors, one in each of the first through the I-th SS multiplex demodulators 167(i)'s. This provides interchangeability of circuit elements among the SS multiplex demodulators 167(i)'s and also among the SS multiplex modulators 166(i)'s and the like. This facilitates, furthermore, standardization of the circuit elements. Each elementary SS modulator in the i-th SS multiplex modulator 166(i) may be combined with an elementary SS demodulator in the i-th SS multiplex demodulator 167(i) into an SS modem of the type illustrated with reference to FIG. 15. The first through the I-th subscriber groups may consist of different number of subscribers.

Figure 25:
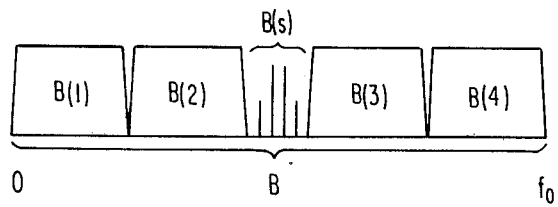
FIG. 25 schematically shows a plurality of partial frequency bands including a synchronizing signal transmission band for use in describing a modification of the network shown in FIG. 17.

Turning to FIG. 25, it is reminded that the wide frequency band B is preferably divided into first through fourth partial frequency bands B(1) to B(4). At and near the center frequency $f_0/2$ of the entire frequency band B, a vacant band is preferably left in which no partial band multiplex is transmitted. It is possible to utilize the vacant band as a synchronizing information transmission band B(s) in transmitting a synchronizing information carrying signal having discrete spectra in the synchronizing information transmission band B(s).

Figure 26:
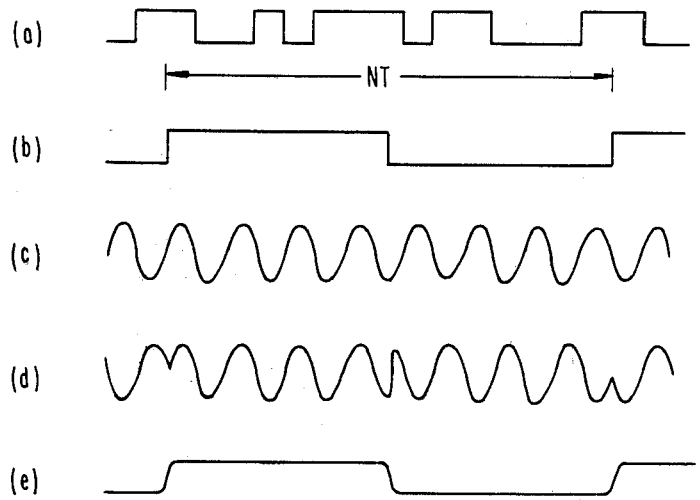
FIG. 26 diagrammatically shows several signals for use in resorting to a frame synchronizing signal to be transmitted through the synchronizing signal transmission band depicted in FIG. 25.

Further turning to FIG. 26, an M sequence exemplified at (a) is for use as a modulation and a demodulation carrier. The frame period NT is fifteen bits long. Each frame has a bit pattern of (+ − − + − + + + − + + − − − +). Although the initial condition defined by four leading bits (+ − − +) is the same as that for the M sequence exemplified in FIG. 10 at (a), the generating polynomial is different. A rectangular frame timing pulse sequence having a 50% duty cycle and a repetition period equal to the frame period NT, is generated as shown in FIG. 26 at (b). A sinusoidal signal having a frequency equal to the center frequency $f_0/2$, is also generated as illustrated in FIG. 26 at (c). The sinusoidal signal may or may not have the phase of the PN clocks. As shown at (d), the sinusoidal signal is modulated by the frame timing pulse sequence into a synchronizing information carrying signal of the type described above.

Such a synchronizing information carrying signal is generated in the common synchronizing signal generator 184 and used in common in the first through the I-th SS multiplex modulators 166(i)'s. Alternatively, the synchronizing information carrying signal is generated in the common synchronizing signal generator 186 and used in the first through the I-th synchronizing signal regenerators 187(i)'s.

Either at the single synchronizing signal regenerator 185 for use in the central receiving office or at the synchronizing signal regenerators 187(i)'s, the synchronizing information carrying signal is extracted as a received synchronizing information signal by a band-pass filter (not shown) having a passband at the synchronizing signal transmission band B(s). The received synchronizing information signal is squared and then supplied to another band-pass filter (not shown) having a narrow passband at and near the PN clock frequency $f_0$. The PN clocks are recovered. A sinusoidal signal is locally generated with a frequency equal to the center frequency $f_0/2$ and used in demodulating the received synchronizing information signal. A reproduction of the synchronizing information carrying signal is obtained as illustrated at (e).

Referring back to FIG. 15 again, the SS modem circuitry comprising the SS modem illustrated with reference to any one of FIGS. 4 and 6 through 8 may comprise a first M sequence generator 67 capable of generating a product M sequence given by a product of at least two frame synchronized component M sequences. One of the component M sequences is an M sequence preselected from cyclically bit shifted M sequences of a first kind generated by PN clocks having a first clock period t(1) in compliance with a first generating polynomial specifying a first frame period T(1). The first-kind M sequences have different initial values, respectively. The first clock period is equal to the PN clock period T of the PN clocks used in generating the M sequences which are assigned to the respective SS modems of the network and which will be called simple M sequences in contrast to the product M sequences. The first generating polynomial is the generating polynomial for the simple M sequences. Another of the component M sequences is preselected from cyclically bit shifted M sequences of a second kind generated by PN clocks of a second clock period t(2) in compliance with a second generating polynomial defining a second frame period T(2). The second-kind M sequences are generated in compliance with different initial values, respectively. The second clock period should be equal to an integral multiple of the first frame period. The integral multiple may be a multiple equal to unity. The second M sequence generator 71 may similarly produce a product M sequence.

It is possible in this manner to define a product M sequence by a product of a plurality of component M sequences, Q in number, where Q represents a predetermined integer greater than unity. A q-th component M sequence is preselected from cyclically bit shifted M sequences of a q-th kind, where q represents an integer between two and Q, both inclusive. The q-th-kind M sequences are generated by PN clocks having a q-th clock period t(q) in compliance with a q-th generating polynomial prescribing a q-th frame period T(q). The q-th-kind M sequences are generated in compliance with different initial values, respectively. The q-th clock period t(q) should be equal to an integral multiple of the (q−1)-th frame period T(q−1). The first-kind through the Q-th-kind M sequences should be frame synchronized to one another. A single generating polynomial may be used in common as the first through the Q-th generating polynomials. The integral multiple may be selected for each of the second through the Q-th clock periods [t(q)]'s. The preselected first-kind through Q-th-kind M sequences may have a single initial value in common. If necessary, the first-kind through the Q-th-kind M sequences may be designated by the respective clock periods [t(1)]'s to [t(Q)]'s.

Figure 27:
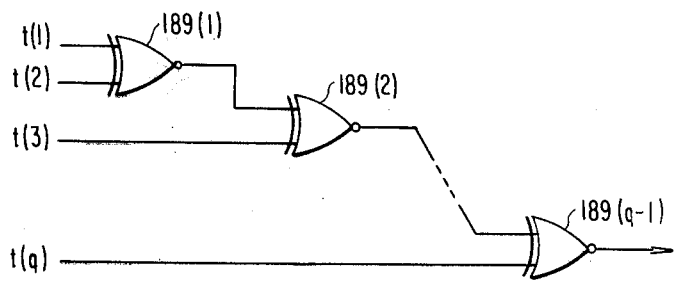
FIG. 27 is a block diagram of a combining logic.

Turning to FIG. 27, a combining logic is for producing a product M sequence in response to first-kind through q-th-kind M sequences t(1) to t(q), one preselected from the M sequences of each of the first through the q-th kinds. The combining logic comprises first through (q−1)-th Exclusive NOR gates 189(1) to 189(q−1). The first gate 189(1) is supplied with the preselected first-kind and second-kind M sequences t(1) and t(2). The (q−1)-th gate 189(q−1) is supplied with an Exclusive NOR output signal of the (q−2)-th gate 189(q−2) and the preselected one of the q-th-kind M sequences t(q). The (q−1)-th gate 189(q−1) produces the product M sequence.

Figure 28:
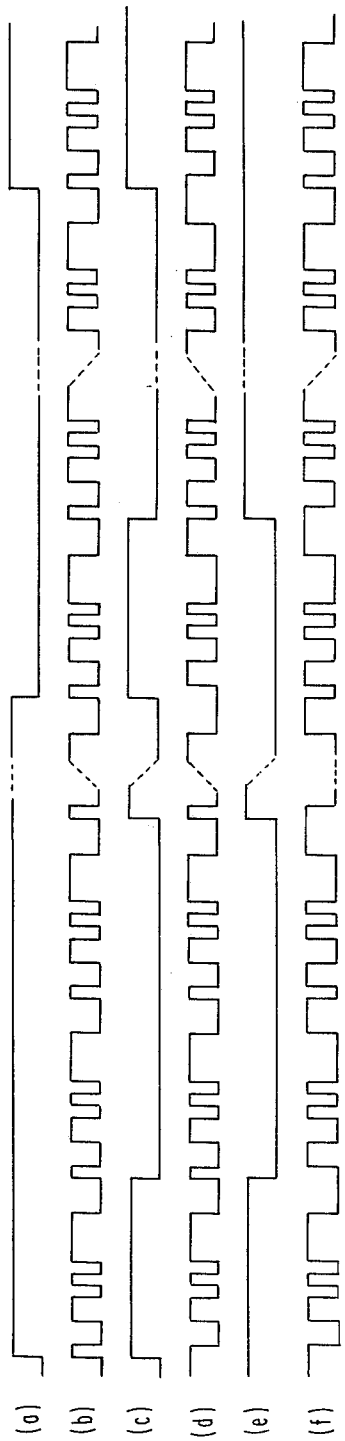
FIG. 28 schematically shows a binary information signal, two PN code sequences having different frame periods, and SS signals obtained by modulating the PN code sequences by the binary information signal.

Turning further to FIG. 28, a digital information signal depicted at (a) is a binary information signal of a 50% duty cycle. The information signal has a data clock period $T_D$ considerably longer than a first frame period T(1), of the type described above, common to first-kind M sequences. A preselected one of the first-kind M sequences is exemplified at (b). A second frame period T(2) of second-kind M sequences is rendered equal to the data clock period $T_D$. The second clock period t(2) is equal to the first frame period T(1). A preselected one of the second-kind M sequence is depicted at (c). For clarity of illustration, a single initial value is used in common to the preselected first-kind and second-kind M sequences with the M sequences of the first and the second kinds generated in compliance with a common generating polynomial specifying a frame period of fifteen bits. The initial value is that used in drawing the M sequence in FIG. 10.

When the preselected first-kind M sequence is modulated by the information signal, that element of an SS signal which corresponds or represents a high or a low level duration of the information signal includes a mere repetition of the M sequence codes of the first-kind M sequence as illustrated at (d). The SS signal is redundant. Let the preselected second-kind M sequence be modulated by the information signal. A first-stage SS signal thereby derived, is not redundant as depicted at (e). The preselected first-kind M sequence is now modulated by the first-stage SS signal. A second-stage SS signal thereby obtained has an entire frequency band [0, f(1)] as shown at (f), where f(1) represents the reciprocal of the first clock period t(1). It is possible to reverse the order of modulation. The second-stage SS signal is demodulated into the original information signal by the preselected first-kind and second-kind M sequences.

The product M sequences are effective in carrying out SS multiplex communication of information signals having a plurality of different data clock rates or periods. For this purpose, a certain number of component M sequence or sequences are used in providing each of several product M sequences. A different number of component M sequences are used in deriving each of several others of the product M sequences. In order to differentiate several of such product M sequences from several others thereof, such product M sequences will be classified into M sequences of a first through a Q-th family. The M sequences of the first through the Q-th kinds described above will be used.

The first-family M sequences are simple M sequences rather than true product M sequences and are for information signals having a shortest of the different data clock periods. The first-family M sequences are those of the first-kind M sequences which are preselected with at least one first-kind M sequence left remaining. The Q-th-family M sequences are for information signals of a longest of the different data clock periods. Each q-th-family M sequence is given by a product of a first through the q-th component M sequence, among which the first through the (q−1)-th component M sequences are preselected one from the at least one remaining M sequence of each of the first through the (q−1)-th kinds and among which the q-th component M sequence is preselected from the q-th-kind M sequence with at least one q-th-kind M sequence left remaining unless q is equal to Q. Furthermore, each component M sequence used to provide the product should be preselected so as not to be in duplication with any one of the component M sequences used to provide the products for the other q-th-family M sequences.

On carrying out SS modulation of an information signal having one of the different data clock periods, one of q'-th-family M sequences is used, where q' represents an integer selected between unit and Q so that the q'-th frame period T(q') should not be longer than the data clock period under consideration and should be nearest thereto among the first through the Q-th frame periods [T(q)]'s.

By way of example, let the subscribers deal with binary information signals classified into first through third groups according to the data clock periods. First-group information signals have a first common data clock rate of 2 MHs and second-group and third-group signals, a second and a third common data clock rate of 256 kHz and 64 kHz, respectively. The first through the third data clock periods become equal to ½ microsecond, 1/256 millisecond, and 1/64 millisecond. It is possible to use M sequences of only a first and a second family, namely, M sequences of only a first and a second kind. The first frame period T(1) of the first-kind M sequences may be equal to ½ microsecond. The first-kind M sequences may have a frame length of one hundred and twenty-seven bits. The first PN clock period t(1) becomes equal to 1/254 microsecond. The first-kind M sequences therefore have a first PN clock rate of 254 MHz and a first frame repetition frequency of 2 MHz. The second clock rate t(2) of the second-kind M sequences may be equal to the first frame period T(1), namely, ½ microsecond. The second-kind M sequences may have a frame length of thirty-one bits. The second frame period T(2) becomes equal to 31/2 microsecond. The second-kind M sequences have a second PN clock rate of 2 MHz and a second frame repetition frequency of 2/31 MHz. Incidentally, the first-kind and the second-kind M sequences are one hundred and twenty-seven and thirty-one in number.

The second data clock period of 1/256 millisecond is shorter than the second frame period of 31/2 microsecond. Although redundant, the first-family and the second-family M sequences should therefore be used as modulation and demodulation carriers for the second-group and the third-group information signals, respectively.

It will now be assumed that the subscribers dealing with the first-group and the second-group information signals are less in number than one hundred and twenty-seven. It is possible to assign optional ones of the first-kind M sequences as the first-family M sequences to the respective ones of such subscribers. The remaining first-kind M sequence or sequences are coupled to the second-kind M sequences to provide combinations for giving products as the second-family M sequences. The number of second-family M sequences become equal to an integral multiple of thirty-one depending on the number of remaining first-kind M sequences. If the subscribers dealing with the third-group information signals are less in number than the second-family M sequences, it is possible to optionally assign the second-family M sequences to these subscribers. Each remaining first-kind M sequence is thus used to provide thirty-one second-family M sequences.

When only the first-kind M sequences are used as the simple M sequences irrespective of the data clock rates of 2 MHz, 256 kHz, and 64 kHs and without the band division, the number of accommodated subscribers is one hundred ant twenty-seven as described before. On resorting to the product M sequences, let it be prusumed that x in number of the first-kind M sequences be used as component M sequences of the second-family M sequences. The number of first-family M sequences becomes equal to $(127-x)$. The number of second-family M sequences is equal to $31x$. The total number of product M sequences, the simple M sequences used as the first-family M sequences inclusive, is equal to $(127+30x)$. When the number x is equal to fifteen, it is possible to accommodate five hundred and seventy-seven subscribers. An increase in the number of accommodated subscribers is astonishing. If this great number of subscribers should be accommodated by the use of the simple M sequences alone without resorting to the band division technique, cyclically bit shifted M sequences have to be derived from M sequence codes having five different generating polynomials. This severely adversely affects the SN and the SD ratios.

An SS multiplex signal has a multiplicity of levels. It is therefore not seldom that a reduction in the data clock rate is important even at the cost of an increase in the number of levels of an information signal to be SS multiplexed. This provides an unexpected flexibility to design of an SS multiplex communication network.

Reverting to the example, the first-family M sequences have a frame period of ½ microsecond. The SS multiplex communication network can not accommodate a subscriber dealing with an information signal having a shorter data clock period. It is, however, possible to accommodate the subscriber in question by increasing the number of levels of the information signal and thereby lengthening the data clock period. A subscriber dealing with a 4-MHz binary information signal is accommodated when the information signal is converted to a four-level information signal having a data clock period of ½ microsecond.

When the number of subscribers dealing with second-group binary information signals is near to or even exceeds one hundred and twenty-seven, such second-group information signals may be converted to eight-level information signals having a data clock period of 1/64 millisecond. The data clock period is rendered longer than the second frame period, 31/2 microsecond, of the second-kind M sequences used as component M sequences of the second-family M sequences. With this, optional ones of the first-kind M sequences are assigned as the first-family M sequences to the respective ones of subscribers dealing with only the first-group information signals. The second-family M sequences are assigned to the subscribers dealing with the second-group and the third-group information signals.

Figure 29:
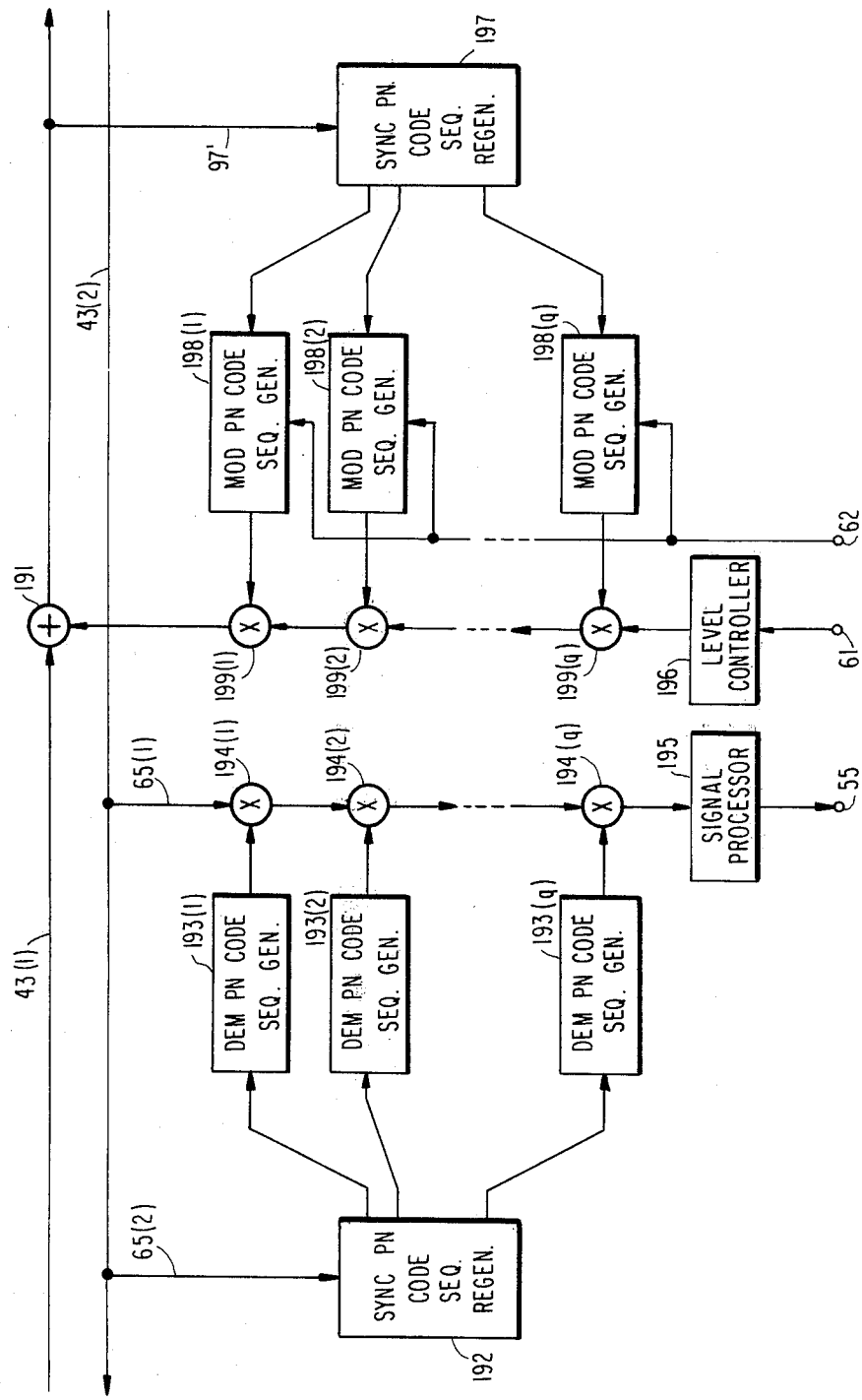
FIG. 29 is a block diagram of an SS multiplex communication network comprising SS modems according to an aspect of this invention.

Referring now to FIG. 29, an SS modem is connected to the up and the down transmission lines 43(1) and 43(2). It will be presumed hereafter that a received information signal delivered to the information output terminal 55 and a transmission information signal supplied to the information input terminal 61 for transmission to a destination SS modem specified by an address signal supplied to the address input terminal 62, have one of different data clock period. A first SS signal reaching the branch comprising first and second subbranches 65(1) and 65(2) through the down transmission line 43(2), comprises a first frame synchronizing signal and an SS signal in which a particular information signal to be received as the received information signal is carried by a first of the q-th-family M sequences that is assigned to the illustrated SS modem. Merely for simplicity of denotation, the letter q is substituted for the symbol q′ used heretobefore. In other words, the q-th frame period of the q-th-kind M sequences used as component M sequences of the q-th-family M sequences is not longer than the above-mentioned one data clock period. An SS signal which reaches an adder 191 through the up transmission line 43(1) and with which a transmission SS signal is multiplexed by the adder 191 into a second SS signal, comprises a second frame synchronizing signal. The received information signal is obtained by demodulating the first SS signal by the first q-th-family M sequence. The transmission SS signal is produced by modulating a second of the q-th-family M sequences by the transmission information signal. The first SS signal and the transmission information signal may successively be multiplied as described with reference to FIG. 28 by the component M sequences of at least one q-th-family M sequence used as the first and the second M sequences described in conjunction with any one of FIGS. 4, 6 through 8, and 14 and 15.

The SS modem comprises a first synchronizing signal regenerator 192, similar to the synchronizing signal regenerator 147. Supplied with the first SS signal through the second subbranch 65(2), the first synchronizing signal regenerator 192 recovers PN clocks for the first-kind through the q-th-kind M sequences preselected as component M sequences of the first q-th-family M sequence and regenerates frame synchronizing signals therefor. Responsive to the PN clocks and the frame synchronizing signals, first through q-th demodulation M sequence generators 193(1) to 193(q) generate the first through the q-th component M sequences of the first q-th-family M sequence with frame synchronism established. First through q-th demodulation multipliers 194(1) to 194(q) connected in series correspond to the first multiplier 66 and are for multiplying the first SS signal supplied to the first demodulation multiplier 194(1) through the first subbranch 65(1) successively by the first through the q-th component M sequences. The q-th demodulation multiplier 194(q) produces the first multiplied signal described heretobefore. A signal processor 195 comprises a low-pass filter and a discrimination circuit described above. Responsive to the first multiplied signal, the signal processor 195 delivers the received information signal to the information output terminal 55.

It may be mentioned here that some of the information signals, such as data and/or picture signals, should be transmitted with a superior transmission performance to the other information signals, such as speech signals. The SS modem being illustrated therefore comprises a level controller 196 responsive to the transmission information signal supplied from the information input terminal 61 for producing a level adjusted or controlled information signal with a higher and a lower level when the transmission information signal is to be transmitted with the superior transmission performance and need not be transmitted with the superior transmission performance, respectively. Such a level controller may be used also in the SS modem described herinabove and will readily be implemented by one skilled in the art.

A second synchronizing signal regenerator 197 is similar to the synchronizing signal regenerator 192 and is supplied with the SS signal from the up transmission line 43(1) through a branch 197'. Responsive to PN clocks and frame synchronizing signals regenerated by the second synchronizing signal regenerator 197 and controlled by the address signal supplied from the address input terminal 62, first through q-th modulation M sequence generators 198(1) to 198(q) generate first through q-th frame synchronized component M sequences of the second q-th-family M sequence. First through q-th modulation multipliers 199(1) to 199(q) connected in series correspond to the second multiplier 72. The q-th through the first modulation multipliers 199(q) to 199(1) are for multiplying the level adjusted information signal supplied to the q-th modulation multiplier 199(q) successively by the q-th through the first frame synchronized component M sequences. The first modulation multiplier 199(1) produces the transmission SS signal, which corresponds to the second multiplied signal. The adder 191 is what was not depicted in FIG. 4 at the point of junction of the tributary 75 with the up transmission line 43(1).

Figure 30:
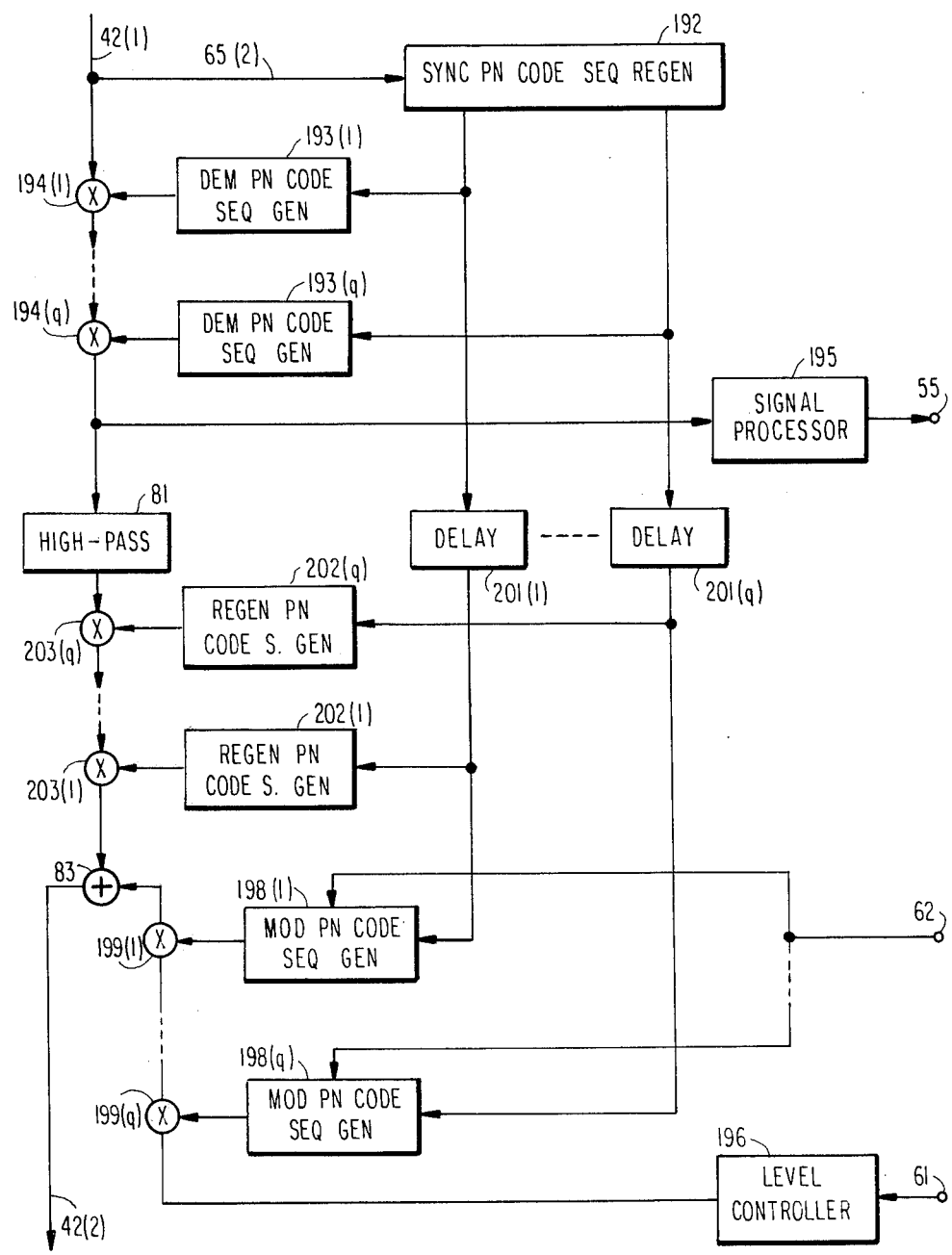
FIG. 30 is a block diagram of an SS modem according to a sixth embodiment of this invention.

Referring to FIG. 30, an SS modem according to a sixth embodiment of this invention is specifically effective when connected to the first and the second loop transmission line sections 42(1) and 42(2). The SS modem comprises similar parts designated by like reference numerals. Only one synchronizing signal regenerator is used, which is designated by the reference numeral 192 and connected to the second subbranch 65(2).

The first multipled signal produced by the q-th demodulation multiplier 194(q) is delivered to the high-pass filter 81 as well as to the signal processor 195. As before, the high-pass filter 81 produces a low frequency component rejected signal. PN clocks and frame synchronizing signals regenerated by the synchronizing signal regenerator 192 and supplied to the first through the q-th demodulation M sequence generators 193(1) to 193(q) are supplied also to first through q-th delay circuits 201(1) to 201(q), respectively. The first through the q-th delay circuits 201(1) to 201(q) are for producing delayed PN clocks and delayed frame synchronizing signals with delays which will presently become clear. Responsive to the delayed PN clocks and the delayed frame synchronizing signals, first through q-th local or regeneration M sequence generators 202(1) to 202(q) generate first through q-th frame synchronized local component M sequences which are the same as the first through the q-th component M sequences of the first q-th-family M sequence. First through q-th local or regeneration multipliers 203(1) to 203(q), connected in series, correspond to the third multiplier 82. The q-th through the first local multipliers 203(q) to 203(1) are for multiplying the low frequency component rejected signal supplied to the q-th local multiplier 203(q) successively by the q-th through the first local component M sequences. The first local multiplier 203(1) produces a third multiplied signal of the type described above.

Responsive to the delayed PN clocks and the delayed frame synchronizing signals, the first through the q-th modulation M sequence generators 198(1) to 198(q) generate first through q-th frame synchronized modulation M sequences in compliance with the address signal supplied from the address input terminal 62. The first through the q-th modulation M sequences are the first through the q-th component M sequences of the second q-th-family M sequence. The level adjusted signal supplied to the q-th modulation multiplier 199(q) successively modulates the q-th through the first modulation M sequences at the q-th through the first modulation multipliers 199(q) to 199(1). The first modulation multiplier 199(1) supplies the adder 83 with a transmission SS signal corresponding to the second multiplied signal. The adder 83 adds the second and the third multiplied signals into a second SS signal, which is delivered to the second loop transmission line section 42(2).

It is possible to dispense with the local M sequence generators 202(1) to 202(q) and substitute therefor first through q-th M sequence delay circuits (not shown) responsive to the first through the q-th component M sequences of the first q-th-family M sequence for producing first through q-th delayed M sequences. The first through the q-th local multipliers 203(1) to 203(q) are supplied with the first through the q-th delayed M sequences rather than with the first through the q-th local component M sequences.

Figure 31:
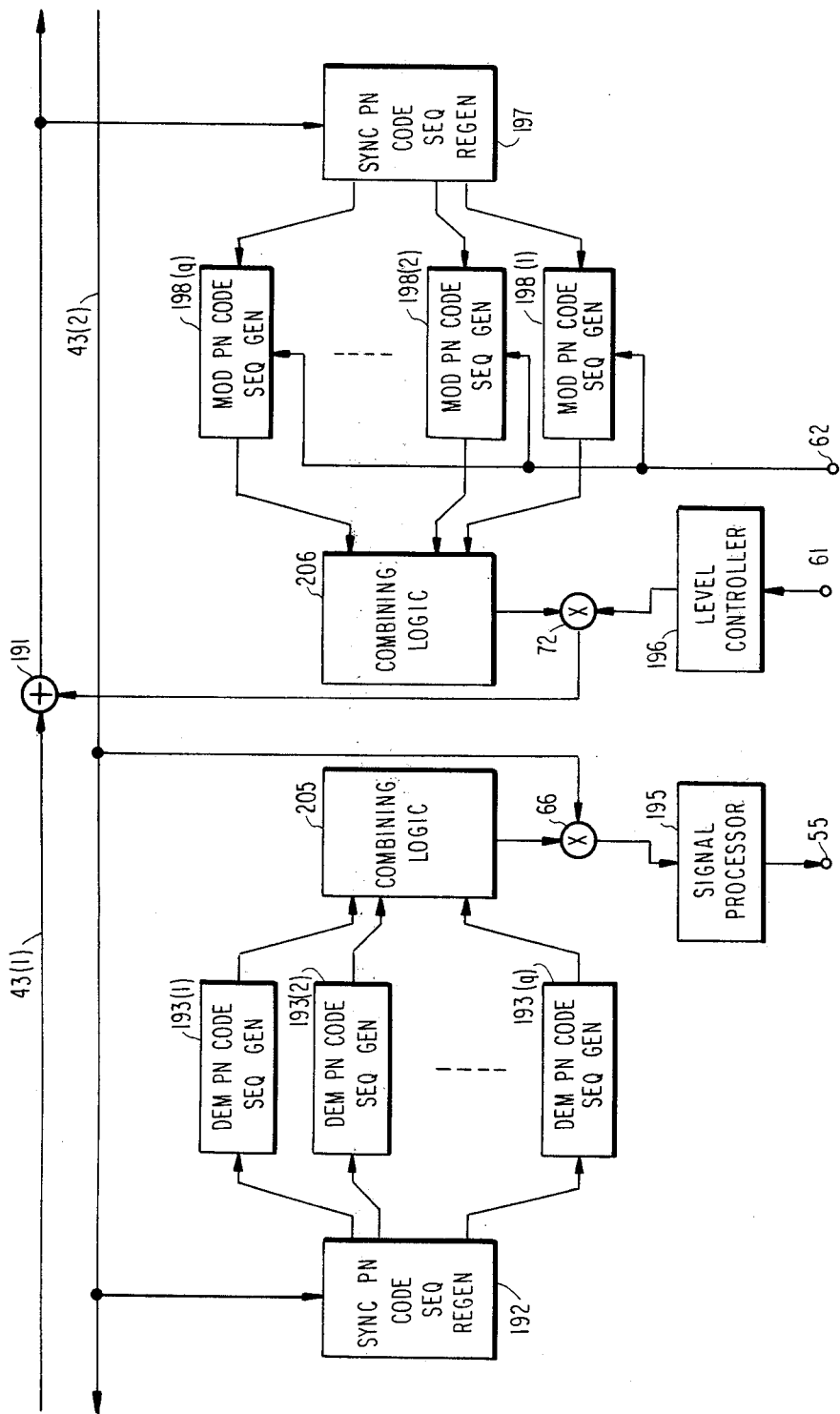
FIG. 31 is a block diagram of an SS multiplex communication network of the type shown in FIG. 29.

Referring to FIG. 31, an SS modem according to a modification of the circuitry illustrated with reference to FIG. 29 comprises similar parts designated by like reference numerals. A first single multiplier 66 is used instead of the first through the q-th demodulation multipliers 194(1) to 194(q). Responsive to the first through the q-th component M sequences, a first combining logic 205 of the type illustrated with reference to FIG. 27 produces the first q-th-family M sequence. The first through the q-th demodulation M sequence generators 193(1) to 193(q) and the first combining logic 205 are equivalent to the first M sequence generator 66 and the first q-th-family M sequence, to the first M sequence.

A second single multiplier 72 is substituted for the first through the q-th modulation multipliers 199(1) to 199(q). A second combining logic 206 is used instead, which corresponds to the first combining logic 205. The first through the q-th modulation M sequence generators 198(1) to 198(q) and the second combining logic 206 are equivalent to the second M sequence generator 71 and the second q-th-family M sequence, to the second M sequence.

Figure 32:
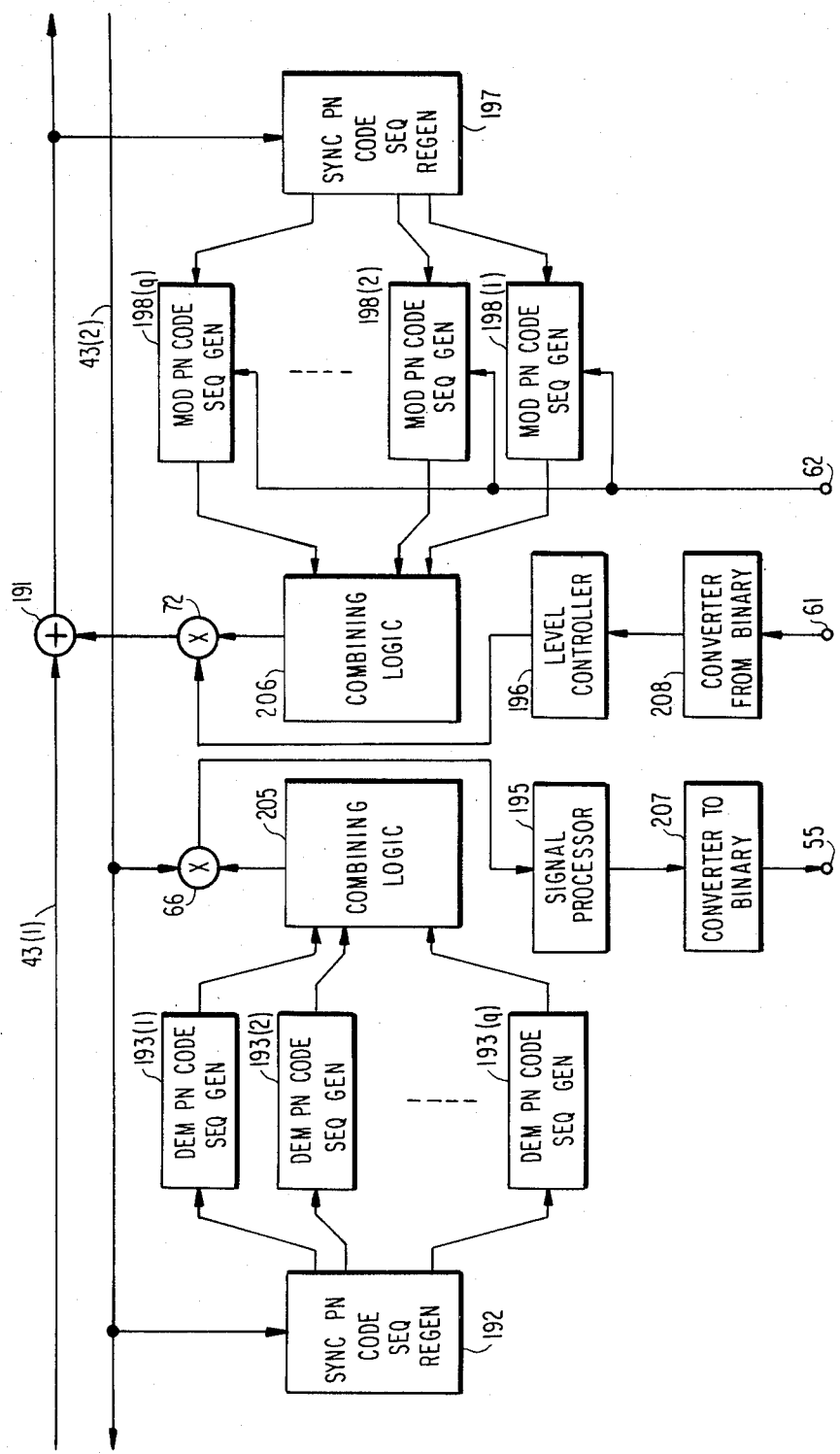
FIG. 32 is a block diagram of another SS multiplex communication network of the type depicted in FIG. 29.

Referring to FIG. 32, an SS modem according to another modification of the circuitry illustrated with reference to FIG. 29 comprises similar parts designated by like reference numerals. The first SS signal reaching the SS modem comprises an SS signal into which a binary information signal to be received is converted to a multilevel information signal and then SS modulated. This is for lengthening the data clock period as described above. The low frequency signal produced by the signal processor 195 is a reproduction of the multilevel information signal. A first converter 207 is for converting the reproduced multilevel information signal to a binary information signal, which is a reproduction of the original binary information signal and delivered to the information output terminal 55 as a received information signal.

A binary transmission information signal is supplied to a second converter 208 from the information input terminal 61. The second converter 208 is for converting the transmission information signal to a multilevel transmission information signal, which is supplied to the second multiplier 72 through the level controller 196.

Reviewing FIGS. 29 through 32, it will now be readily feasible to modify the circuitry illustrated with reference to any one of FIGS. 29, 31, and 32 so as to produce a second SS signal with an SS signal carrying the particular information signal rejected therefrom. The first multiplied signal should be supplied to a high-pass filter as well as to the signal processor 195. The low frequency component rejected signal should be multiplied by the first q-th-family M sequence with a delay preferably given thereto. The adder 191 may be renumbered to 83. It is also possible to substitute the circuitry illustrated with reference to either of FIGS. 7 and 8 for that illustrated with reference to FIG. 6.

Figure 33:
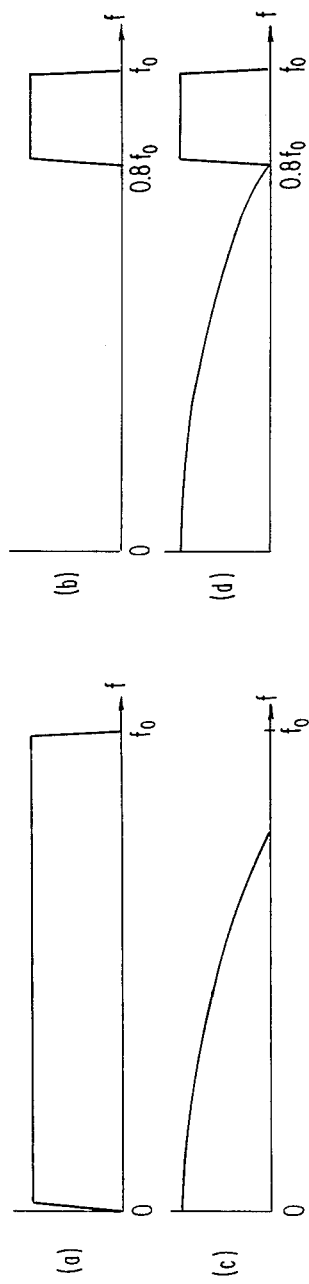
FIG. 33 drawn below FIG. 28, diagrammatically shows frequency distributions of an SS multiplex signal and a TDM signal.

Referring far back to FIGS. 19 and 20 and referring anew to FIG. 33, a partial frequency band having a normalized partial bandwidth of about 0.2 is fairly tolerable for transmission of an SS signal unless the center portion of the entire wide frequency band B or [0, $f_0$] depicted in FIG. 33 at (a) is included in the partial frequency band in question. It is therefore possible to furnish each of the input and the output filters 161 and 162 described in conjunction with FIG. 15 with a passband substantially at an upper frequency band B(U) or [0.8$f_0$, $f_0$] illustrated in FIG. 33 at (b) and to use the remaining lower frequency band B(L) or [0, 0.8$f_0$] in transmitting a baseband multiplex signal. For example, data and/or picture signals may not be processed by a level controller 196 but may be TDM'ed into a baseband digital multiplex signal having a spectrum exemplified in FIG. 33 at (c). As shown in FIG. 33 at (d), the upper frequency band is used for transmission of a partial band SS multiplex signal and the lower frequency band, for transmission of a TDM'ed signal.

Figure 34:
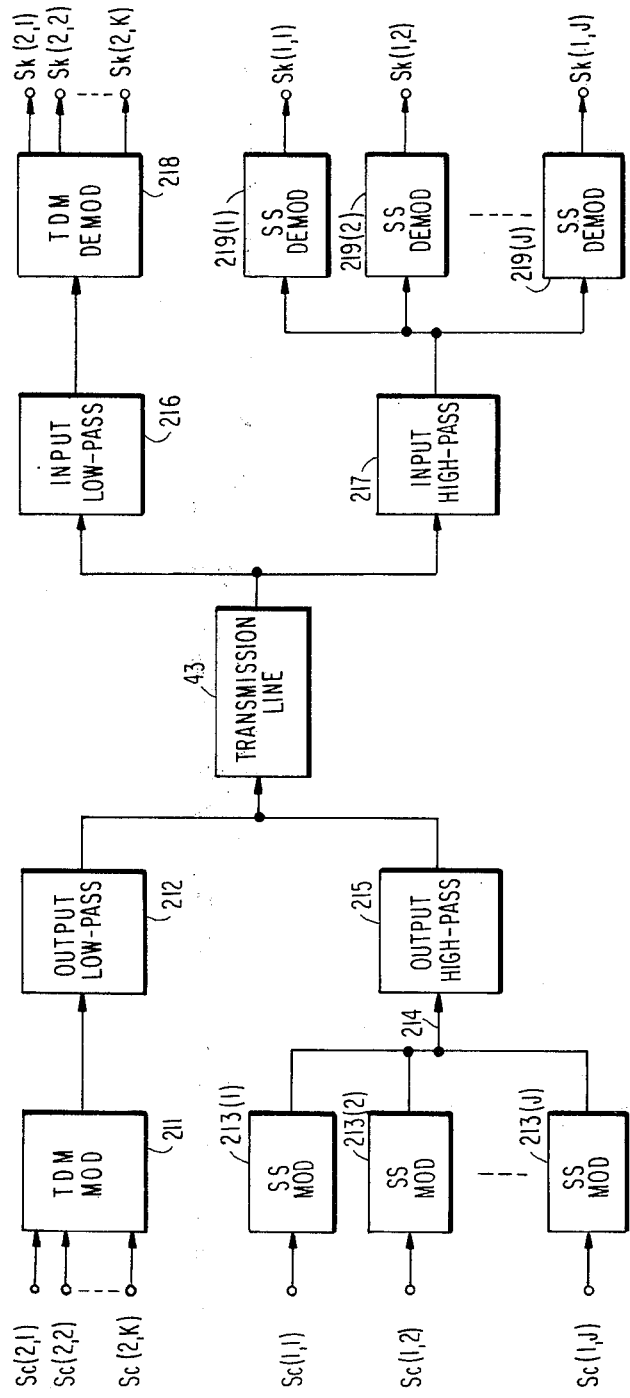
FIG. 34 is a block diagram of an SS multiplex communication network comprising transmitter-receivers according to a seventh embodiment of this invention.

Referring now to FIG. 34, an SS multiplex communication network accommodating first through J-th information sources of a first group Sc(1, j)'s and first through J-th information sinks of the first group Sk(1, j)'s, is combined with a TDM communication network accommodating first through K-th information sources of a second group Sc(2, k)'s and first through K-th information sinks of the second group Sk(2, k)'s with a transmission line 43 used in common. The letters K and k now represent a predetermined integer and an integer between unity and K, both inclusive. The subscribers of the first group deal with speech signals. The subscribers of the second group deal with data and/or picture signals. The whole wide frequency band B of the transmission line 43 is divided into upper and lower frequency bands B(U) and B(L) of the type described above.

The second-group information sources Sc(2, k)'s are accommodated by a TDM modulator 211 for producing a baseband transmission TDM signal as described in conjunction with FIG. 2. An output low-pass filter 212 is for restricting the frequency band of the transmission TDM signal to the lower frequency band B(L) to produce a partial band transmission TDM signal. The partial band transmission TDM signal is substantially the same as the baseband transmission TDM signal. First through J-th SS modulators 213(j)'s are for the respective information sources of the first group Sc(1, j)'s and for producing transmission SS signals for optional ones of the first-group information sinks Sk(1, j)'s as described in connection with FIGS. 6 through 8. The transmission SS signals are totaled on a signal lead 214 into a single transmission SS multiplex signal. An output low-pass filter 215 is for restricting the frequency band of the transmission SS multiplex signal to the upper frequency band B(U) to produce a partial band transmission SS multiplex signal. The partial band transmission TDM signal and the partial band transmission SS multiplex signal are transmitted through the transmission line 43 as a single transmission multiplex signal.

A single reception multiplex signal derived from the single transmission multiplex signal through the transmission line 43 is supplied to an input low-pass filter 216 and an input high-pass filter 217 for the lower and the upper frequency bands B(L) and B(U). The low-pass filter 216 produces a partial band reception TDM signal, which is a substantial reproduction of the baseband transmission TDM signal and can be called a baseband reception TDM signal. The baseband reception TDM signal is supplied to a TDM demodulator 218 accommodating the second-group information sinks Sk(2, k)'s. As described in conjunction with FIG. 2, the TDM demodulator 218 demultiplexes the baseband reception TDM signal into reproductions of the original data and/or picture signals. The high-pass filter 217 produces a partial band reception SS multiplex signal, which is a reproduction of the partial band transmission SS multiplex signal. First through J-th SS demodulators 219(j)'s are for the respective first-group information sinks Sk(1, j)'s. As described in connection with FIG. 15, the partial band reception SS multiplex signal is demodulated into reproductions of the original speech signals.

The multiplex communication network illustrated with reference to FIG. 34 is therefore a band division multiplex communication network. It should be understood that frame synchronism should be established for the SS signals as described in conjunction with FIGS. 14 and 17. The TDM modulator and demodulator 211 and 218 are what may be called a time division multiplexer and demultiplexer. A frame alignment signal consisting of the frame alignment bits described in connection with FIG. 2 should be generated in the TDM modulator 211 and transmitted through the output low-pass filter 212 and the transmission line 43 as a partial band frame alignment signal multiplexed in the single transmission multiplex signal. TDM clocks are also generated in the TDM modulator 211 for use in cyclically specifying the time slots. Responsive to the partial band frame alignment signal extracted from the single reception multiplex signal by the input low-pass filter 216 together with the baseband reception TDM signal, the TDM demodulator 218 regenerates the frame alignment signal and recovers the TDM clocks. The expression "groups" used for the subscribers Sc(1, j)'s, Sk(1, j)'s, Sc(2, k)'s, and Sk(2, k)'s is somewhat different from that used in conjunction with FIGS. 17 and 22 through 25.

Figure 35:
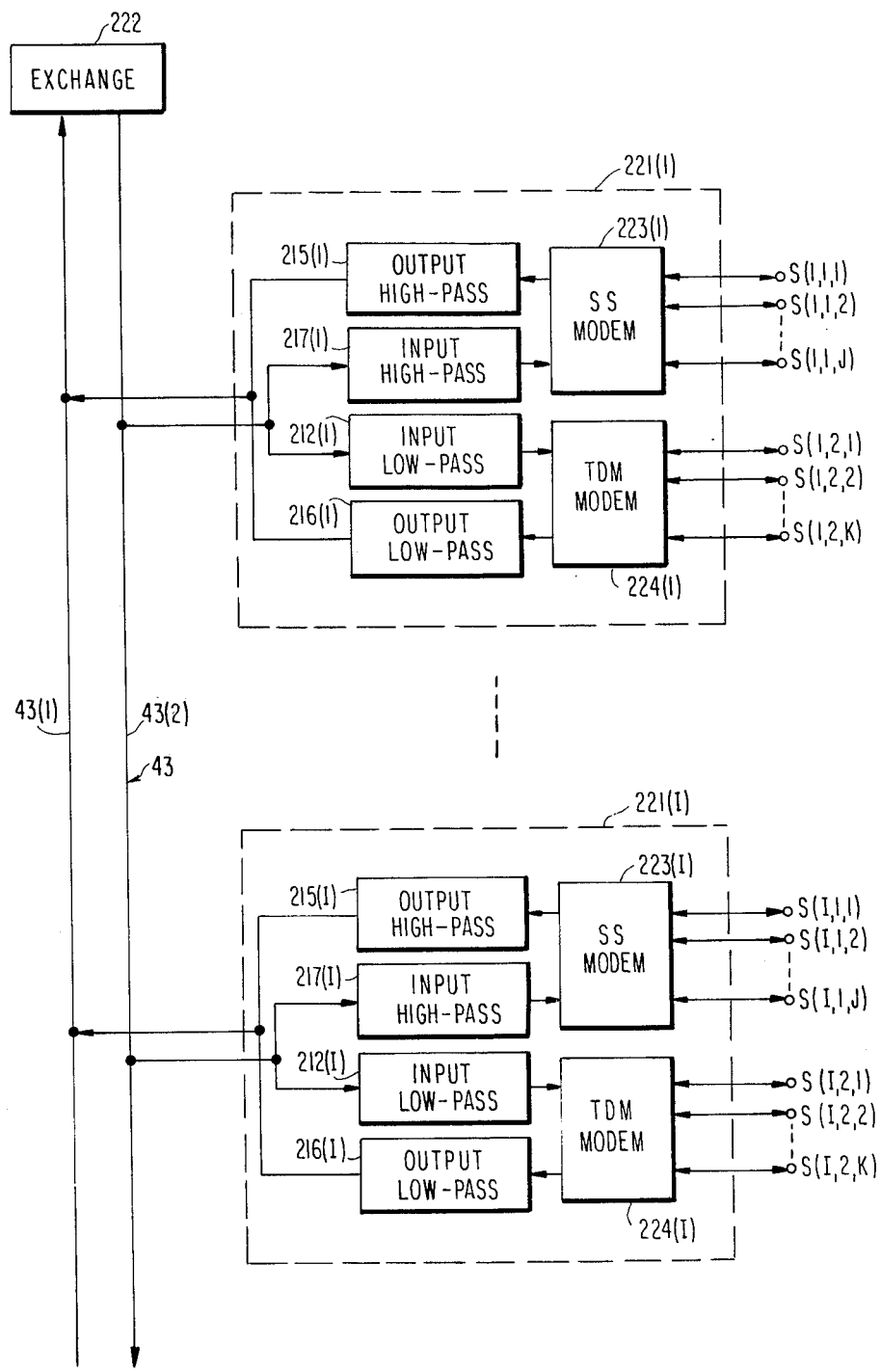
FIG. 35 is a block diagram of an SS multiplex communication network of the type depicted in FIG. 34.

Referring to FIG. 35, another band division multiplex communication network for SS multiplex and TDM signals comprises a transmission line 41 consisting of up and down transmission lines 43(1) and 43(2), first through I-th terminal stations 221(i)'s scattered along the transmission line 41, and an exchange station 222 connected to the transmission line 41 at the downstream end of the up transmission line 43(1) and the upstream end of the down transmission line 43(2). The letters I and i are used, insofar as the network being illustrated is concerned, merely to discriminate each terminal station and its element from other terminal stations and the corresponding elements rather than as used for the SS multiplex modulators and demodulators 166(i)'s and 167(i)'s or for the transmitting stations 181(i)'s, in which case the letters I and i are used also to specify the respective partial frequency bands.

The i-th terminal station 221(i) comprises an i-th SS modem 223(i) for first through J-th subscribers of a first group S(i, 1, j)'s dealing primarily with speech signals and an i-th TDM modem 224(i) for first through K-th subscribers of a second group S(i, 2, k)'s dealing primarily with data and/or picture signals. As will shortly be described more in detail, the exchange station 222 receives a first multiplex of SS multiplex and TDM signals from the up transmission line 43(1), carries out carrier conversion for the SS multiplex signals, and sends a second multiplex of SS multiplex and TDM signals to the down transmission line 43(2). The exchange station 222 generates synchronizing signals for the SS and the TDM modems 223(i)'s and 224(i)'s and sends the synchronizing signals together with the second multiplex.

Using the synchronizing signals received through an i-th input high-pass filter 217(i) for the upper frequency band B(U), the i-th SS modem 223(i) produces an i-th single transmission SS multiplex signal, which is delivered as an i-th partial band transmission SS multiplex signal to the up transmission line 43(1) through an i-th output high-pass filter 215(i) for the upper frequency band. Receiving the synchronizing signals through an i-th input low-pass filter 216(i) for the lower frequency band B(L), the i-th TDM modem 224(i) produced an i-th baseband transmission TDM signal and delivers the same as an i-th partial band transmission TDM signal to the up transmission line 43(1) through an i-th output low-pass filter 212(i) for the lower frequency band. The first through the I-th partial band transmission SS multiplex signals of the upper frequency band B(U) and the first through the I-th partial band transmission TDM signals of the lower frequency band B(L) are multiplexed into the first multiplex.

As described hereinabove, different ones of PN code sequences generated by PN clocks having a predetermined PN clock rate in compliance with a single generating polynomial and with different initial values, respectively, are assigned to the respective first-group subscribers S(i, 1, j)'s accommodated by the first through the I-th terminal stations 221(i)'s. The PN code sequences may be those of the first through the Q-th families described in conjunction with FIGS. 28 through 32. In the illustrated example, the family or product PN code sequences are primarily for increasing the number of SS channels of the multiplex communication network rather than coping with information signals of different data clock rates. At any rate, a particular first-group subscriber S(i, 1, j) accommodated by a particular SS modem 223(i) is assigned with a particular PN code sequence. As will presently become clear, the particular PN code sequence serve as modulation and demodulation carriers for the particular subscriber.

The particular subscriber S(i, 1, j) may initiate a call to a preselected first-group subscriber S(i', 1, j') accommodated by a specific SS modem 223(i') and assigned with a specific PN code sequence, where i' represents an integer between unity and I, both inclusive, and j' represents an integer between unity and J, both inclusive. Although the integers i'0 and j' may be equal to the integers i and j unless i' and j' are simultaneously equal to i and j, respectively, it will be presumed merely for brevity of description that i' is not equal to i, namely, the particular and the specific SS modem 223(i) and 223(i') are different modems.

The call includes a numerical signal, such as a dial impulse signal or a multifrequency signal, specifying the preselected subscriber. The call will subsequently be followed by a particular speech signal. In an SS signal produced by the particular SS modem 223(i) and multiplexed thereby with other SS signals into the i-th single transmission SS multiplex signal, the particular PN code sequence carries the original numerical signal as an SS numerical signal. A partial band SS numerical signal is multiplexed with other partial band SS signals in the i-th partial band transmission SS multiplex signal and then in the first multiplex. Subsequently, the particular speech signal will likewise be processed into a partial band transmission SS signal, which is multiplexed in the i-th partial band SS multiplex signal and subsequently in the first multiplex.

Responsive to the partial band SS numerical signal, the exchange station 222 selects the specific PN code sequence. According as the selection is successful or not, the particular subscriber S(i, 1, j) is informed of capability and incapability of communicating with the preselected subscriber S(i', 1, j'). When successful, the exchange station 222 converts the particular PN code sequence carrying the particular speech signal in the partial band transsission SS signal to the specific PN code sequence. By the carrier conversion, the partial band transmission SS signal is converted to a carrier converted full SS signal having the whole wide frequency band B. The exchange station 222 restricts the converted full SS signal into a partial band converted SS signal having the upper frequency band B(U). The partial band transmission TDM signals may or may not be converted to partial band converted TDM signals. The partial band converted SS signal is multiplexed in the second multiplex with similar SS signals and the partial band TDM signals.

Responsive to the second multiplex supplied through the i-th input high-pass filter 217(i) as an i-th partial band reception SS multiplex signal, the i-th SS modem 223(i) reproduces original speech signals directed to the first-group subscribers S(i, 1, j)'s accommodated thereby and delivers the reproduced speech signals to such subscribers. Likewise supplied with an i-th partial band reception TDM signal through the i-th low-pass filter 216(i), the i-th TDM modem 224(i) delivers reproductions of original data and/or picture signals to the second-group subscribers S(i, 2, k)'s accommodated thereby.

The partial band converted SS signal mentioned above, is multiplexed with other signals in each of the first through the I-th partial band reception SS multiplex signals. Only the specific SS modem 223(i') reproduces the particular speech signal from the i'-th partial band reception SS multiplex signal by the specific PN code sequence and delivers a reproduction of the particular speech signal to the preselected subscriber S(i', 1, j'). The specific SS modem 223(i') reproduces also the original speech signals for other first-group subscribers accommodated thereby. Other SS modems are unable to reproduce the particular speech signal in question because the specific PN code sequence is not available there.

Each SS modem 223(i) corresponds to the SS modem illustrated with reference to FIG. 4 except for the facts that the band division technique is resorted to and that the S modem 223(i) accommodates a plurality of subscribers rather than a single subscriber. The SS modem illustrated with reference to any one of FIGS. 6 through 8 may now readily be implemented as the SS modem 223(i) combined with the input and the output high-pass filters 217(i) and 215(i) when reference is had to FIG. 15 and the description relating to combinations of the SS modems illustrated with reference to FIG. 15 and any one of FIGS. 4 and 6 through 8. Incidentally, the transit filter 164 is now a low-pass filter corresponding to either of the input and the output low-pass filters 212(i) and 216(i).

Figure 36:
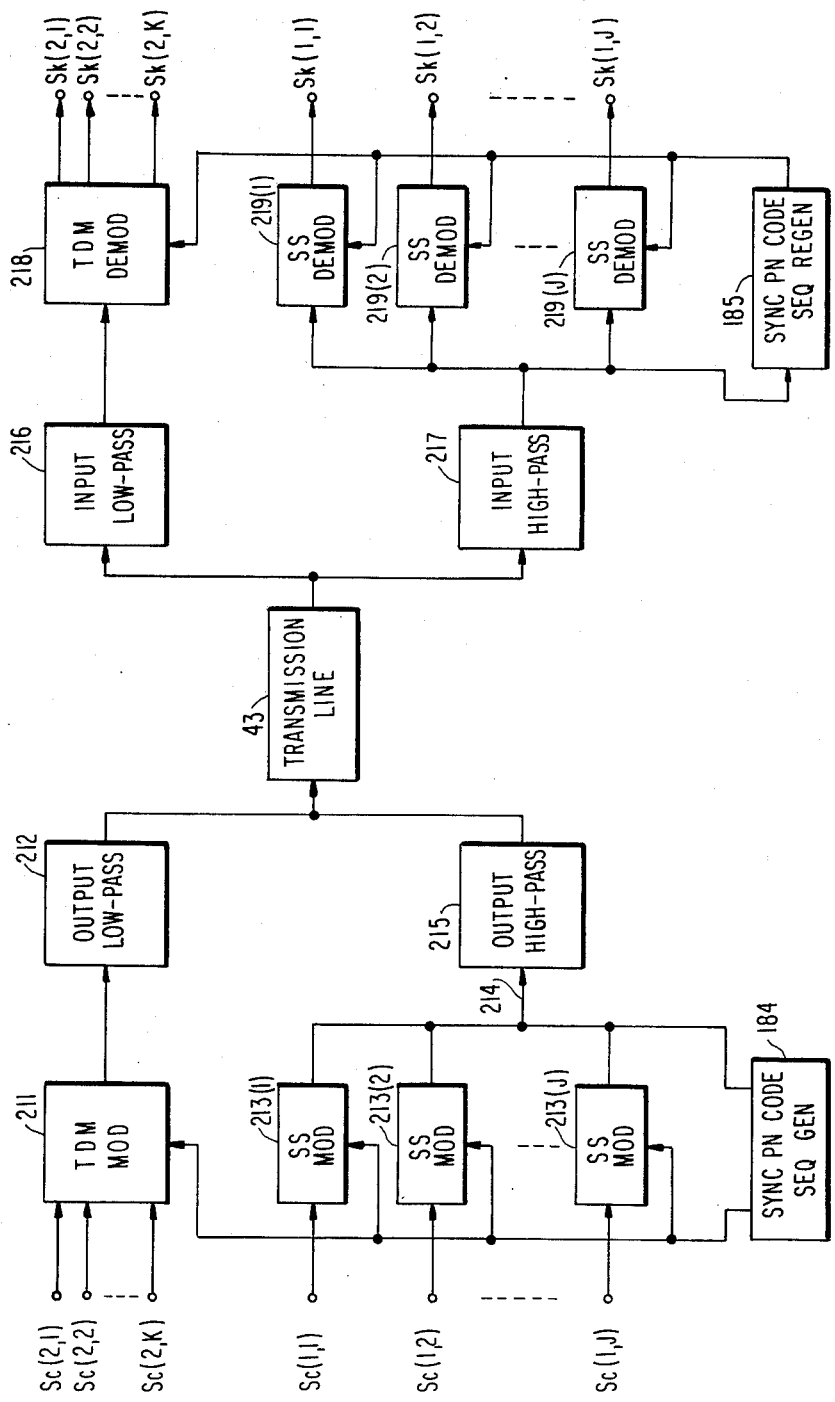
FIG. 36 is a block diagram of another SS multiplex communication network of the type shown in FIG. 34.

Referring to FIG. 36, still another band division multiplex communication network is similar to that illustrated with reference to FIG. 34 and comprises similar parts designated by like reference numerals. A single synchronizing signal generator 184 is for generating clocks and a frame synchronizing signal. The generated clocks and frame synchronizing signal are used in the TDM modulator 211 as the TDM clocks and the frame alignment signal. Responsive to the generated clocks and frame synchronizing signal, the SS modulators 213(i)'s generate PN code sequences in compliance with a single generating polynomial and with different initial values, respectively, for use as modulation carriers. The synchronizing signal generator 184 furthermore generates a synchronizing PN code sequence in compliance with a different generating polynomial and with a predetermined initial value. The synchronizing PN code sequence is delivered to the transmission line 43 through the signal lead 214 and then the output band-pass filter 215 as a narrow band PN code sequence of the type depicted in FIG. 18.

Responsive to the narrow band PN code sequence extracted from the single reception multiplex by the input band-pass filter 217 together with the partial band reception SS multiplex signal mentioned before, a synchronizing signal regenerator 185 regenerates the clocks and the frame synchronizing signal. The regenerated clocks and frame synchronizing signal are used in the TDM demodulator as described above and in the SS demodulators 219(i)'s in generating PN code sequences for use as demodulation carriers.

The illustrated multiplex communication network is featured by a simple clock and frame synchronizing signal regenerating facility. The circuitry is preferred when the TDM and the PN clock rates may be one and the same.

Figure 37:
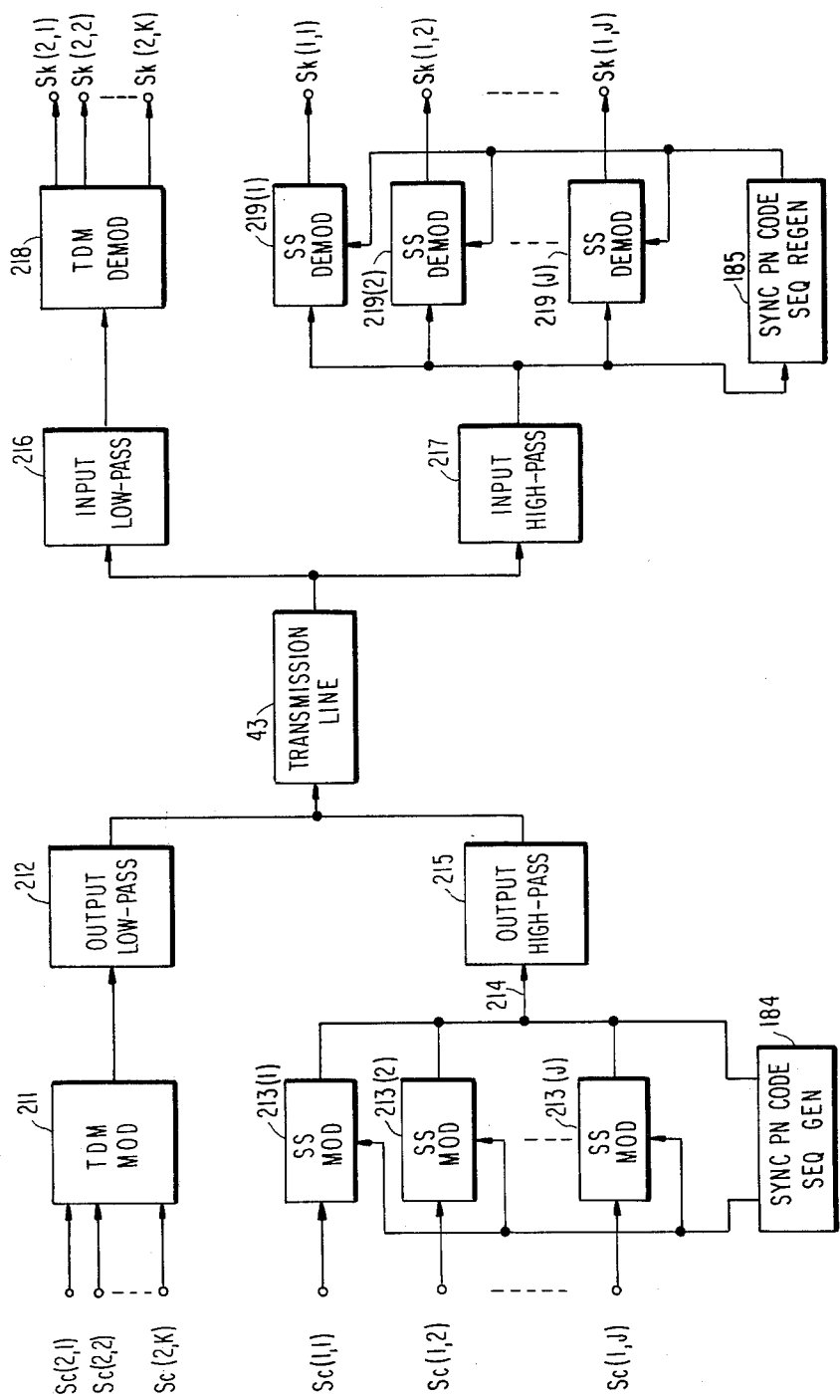
FIG. 37 is a block diagram of still another SS multiplex communication network of the type ilustrated in FIG. 34.

Finally referring to FIG. 37, yet another band division multiplex communication network is again similar to that illustrated with reference to FIG. 34 and comprises similar parts designated by like reference numerals. The clocks and the frame synchronizing signal generated by the synchronizing signal generator 184 are used only in the SS modulators 213(i)'s. Similarly, the clocks and the frame synchronizing signal regenerated by the synchronizing signal regenerator 185 are used only in the SS demodulators 219(i)'s. The TDM modulator 211 comprises clock and frame alignment signal generators as discribed in conjunction with FIG. 34. Likewise, the TDM demodulator 218 regenerates the frame alignment signal separately of regeneration of the synchronizing PN code sequence by the synchronizing signal regenerator 185. The illustrated multiplex communication network is preferred to that illustrated with reference to FIG. 36 when it is desired to select the clock rate of the TDM and the PN clock rates independently of each other.

It is now understood that each of the SS modems illustrated with reference to FIGS. 6 through 8, 15, 17, 22 through 24, 29 through 32, 34, 36, and 37 may comprise a single PN code sequence generator for generating a single PN code sequence or M sequence for use as modulation and demodulation carriers. On the contrary, each SS modem illustrated in conjunction with FIG. 35 may comprise a first and a second PN code sequence generator.

While this invention has thus far been described in specific conjunction with several preferred embodiments thereof and modifications, it will now readily be possible for one skilled in the art to carry this invention into effect in various other ways. For example, it is possible to combine, as has already been pointed out here and there, various parts of the SS modem illustrated with reference to any one of FIGS. 6 through 8, 15, 17, 22 through 24, 29 through 32, and 34 through 37 with other parts of such an SS modem and even with the SS modem illustrated with reference to FIG. 4. The SS modem 49 coupled to the loop and the branch transmission lines 42 and 43 or even to more than two transmission lines will readily be implemented. When an optical fiber is used as a transmission line 41, the SS multiplex signals may further be frequency division multiplexed. The information signal may be an analog signal. As is the case with the synchronizing signal generator 186 specifically described in connection with FIG. 24, each of the individual synchronizing signal generators 171(i)'s or the single synchronizing signal generator 184 may generate a synchronizing PN code sequence as the frame synchronizing signal for use in the accompanying SS multiplex modulator 166(i) or the like. In FIG. 36, the TDM modulator 211 can produce a frame alignment signal from such a PN code sequence as described in relation to the TDM demodulator 218. The exchange station 222 may supply the down transmission line 43(2) or the like with a wide band synchronizing PN code sequence as the synchronizing signals described in conjunction with FIG. 35.

Each M sequence may be a PN code sequence obtained by adding at least one redundant bit to the M sequence. An AGC (automatic gain control) circuit may be interposed in the first subbranch 65(1) depending on the architecture, particularly the scale, of the SS multiplex communication network so as to compensate for the loss caused to the SS signal transmitted a long distance through the transmission line 41. A differential amplifier is more preferable for use as each of the multipliers, such as 66, 72, and 82, than a ring modulator or the like because the differential amplifiers are readily implemented as an integrated semiconductor circuit. When the first multiplier 66 or its equivalent, such as the first of the multipliers 194(1) through 194(q), is implemented by a differential amplifier, a drift in the first SS signal will give rise to a problem. It is, however, readily possible to solve the problem by a.c. coupling either the branch 65 or an AGC circuit interposed therein to the first multiplier or its equivalent. The fact that the a.c.

coupling will little adversely affect the operation so far described is evident from the wide band nature of the SS signals. When the AGC circuit is used, it is also possible to interpose a peak value detector between the AGC circuit and the first multiplier 66 or its equivalent for always monitoring the peak value of the first SS signal to furnish the SS multiplex communication network with a call rate control facility.

In the SS multiplex communication network illustrated with reference to FIG. 17, each of some groups may consist of only one subscriber. Such a network is an equivalent of the circuitry in which each group consists of at least two subscribers as described above merely for brevity of the description. Incidentally, it is possible to understand that the band-pass filter mentioned in conjunction with FIG. 26 is depicted in the drawing as each of the input filters 176(i)'s and that the narrow band-pass filter, the local sinusoidal signal generator, and the demodulator for the received synchronizing information signal are collectively illustrated as each of the synchronizing PN code sequence regenerators 177(i)'s.

What is claimed is:

1. A transmitter-receiver for use in a spread spectrum multiplex communication network comprising a directional transmission line and a plurality of modems coupled to said transmission line, said transmitter-receiver being comprised by each of said modems to be responsive to a first spread spectrum signal received from said transmission line and comprising a spread spectrum signal into which a first of a plurality of different pseudo noise code sequences is modulated by a particular information signal for reproducing said particular information signal and to be responsive to a transmission information signal for supplying said transmission line with a second spread spectrum signal comprising a spread spectrum signal into which a second of said pseudo noise code sequences is modulated by said transmission information signal, said transmitter-receiver including reception spread spectrum signal producing means responsive to said first spread spectrum signal for producing a reception spread spectrum signal, pseudo noise code sequence generating means for generating at least one of said different pseudo noise code sequences as said first and said second pseudo noise code sequences, first multiplying means for multiplying said reception spread spectrum signal by the first pseudo noise code sequence generated by said pseudo noise code sequence generating means to produce a first multiplied signal, low frequency component extracting means for extracting a low frequency component from said first multiplied signal to produce a low frequency signal, means responsive to said low frequency signal for producing said particular information signal, second multiplying means for multiplying an input signal by the second pseudo noise code sequence generated by said pseudo noise code sequence generating means to produce a second multiplied signal, transmission information signal supplying means for supplying said transmission information signal to said second multiplying means as said input signal, and means responsive to a transmission spread spectrum signal for producing said second spread spectrum signal, wherein the improvement comprises combining means for combining said first and said second multiplied signals into said transmission spread spectrum signal with said low frequency component rejected from said first multiplied signal.

2. A transmitter-receiver as claimed in claim 1, said transmission line comprising a closed-loop transmission line, said modems comprising a plurality of specific modems coupled to said closed-loop transmission line, said different pseudo noise code sequences being assigned to said specific modems, respectively, said each modem being each of said specific modems, said first pseudo noise code sequence being the pseudo noise code sequence assigned to said each specific modem, said transmission information signal being for reception by a preselected one of said specific modems, said second pseudo noise code sequence being the pseudo noise code sequence assigned to said preselected modem, wherein said combining means comprises:
low frequency component rejecting means for rejecting said low frequency component from said first multiplied signal to produce a low frequency component rejected signal;
third multiplying means for multiplying said low frequency component rejected signal by the first pseudo noise code sequence generated by said pseudo noise code sequence generating means to produce a third multiplied signal; and
adding means for adding said second and said third multiplied signals into said transmission spread spectrum signal.

3. A transmitter-receiver as claimed in claim 1, said transmission line comprising a closed-loop transmission line, said modems comprising a plurality of specific modems coupled to said closed-loop transmission line, said different pseudo noise code sequences being a plurality of different maximum length code sequences generated by clocks having a predetermined clock period in compliance with a single generating polynomial and with different initial values, respectively, said maximum length code sequences being assigned to said specific modems, respectively, said first pseudo noise code sequence being a first of said maximum length code sequences, said each modem being each of said specific modems, said first maximum length code sequence being assigned to said each specific modem, said transmission information signal being for reception by a preselected one of said specific modems, wherein:
said pseudo noise code sequence generating means is for generating a second of said maximum length code sequences as said second pseudo noise code sequence that is selected in consideration of said preselected modem;
said combining means comprising:
low frequency component rejecting means for rejecting said low frequency component from said first multiplied signal to produce a low frequency component rejected signal; and
adding means for adding said low frequency component rejected signal and said second multiplied signal into said transmission spread spectrum signal.

4. A transmitter-receiver as claimed in claim 1, said transmission line comprising a closed-loop transmission line, said modems comprising a plurality of specific modems coupled to said closed-loop transmission line, said different pseudo noise code sequences being a plurality of different maximum length code sequences generated by cloks having a predetermined clock period in compliance with a single generating polynomial and with different initial values, respectively, said maximum length code sequences being assigned to said specific modems, respectively, said first pseudo noise code sequence being a first of said maximum length code sequences, said each modem being each of said specific modems, said first maximum length code sequence being assigned to said each specific modem, said transmission information signal being for reception by a preselected one of said specific modems, wherein:

said pseudo noise code sequence generating means is for generating a second of said maximum length code sequences as said second pseudo noise code sequence that is selected in consideration of said preselected modem;

said combining means comprising:
adding means for adding said first and said second multiplied signals into a sum signal; and
low frequency component rejecting means for rejecting at least said low frequency component from said sum signal to produce said transmission spread spectrum signal.

5. A transmitter-receiver as claimed in claim 1, said transmission line comprising a closed-loop transmission line, said modems comprising a plurality of specific modems coupled to said closed-loop transmission line, said transmitter-receiver being a particular transmitter-receiver comprised by one of said specific modems other than remaining ones of said specific modems, wherein said particular transmitter-receiver further comprises:

synchronizing pseudo noise code sequence generating means for generating a synchronizing pseudo noise code sequence with a predetermined frame period, a predetermined initial value, and a controllable frame phase;

transmission pseudo noise code sequence supplying means for supplying said synchronizing pseudo noise code sequence as a transmission pseudo noise code sequence to said closed-loop transmission line;

reception pseudo noise code sequence receiving means for receiving from said closed-loop transmission line, as a reception pseudo noise code sequence having a delayed frame phase, the transmission pseudo noise code sequence having once circulated through said closed-loop transmission line;

frame phase comparing means for comparing said controllable frame phase with said delayed frame phase to produce a phase difference signal representative of a phase difference between said controllable and said delayed frame phases;

reception pseudo noise code sequence supplying means for supplying said reception pseudo noise code sequence to said frame phase comparing means; and control means responsive to said phase difference signal for controlling said synchronizing pseudo noise code sequence generating means to synchronize said controllable frame phase to said delayed frame phase.

6. A particular transmitter-receiver as claimed in claim 5, wherein:

said reception pseudo noise code sequence supplying means comprises:
local pseudo noise code sequence generating means responsive to said reception pseudo noise code sequence for generating a local pseudo noise code sequence with said predetermined frame period and with said predetermined initial value so as to be put in a synchronized state relative to said reception pseudo noise code sequence and to have said delayed frame phase; and means for supplying said local pseudo noise code sequence to said frame phase comparing means;

said reception pseudo noise code sequence receiving means receiving an input spread spectrum signal multiplexed with said reception pseudo noise code sequence, said input spread spectrum signl being one of said first and said second spread spectrum signal:

said particular transmitter-receiver further comprising:

synchronism monitoring means coupled to said local pseudo noise code sequence generating means for monitoring said synchronized state to produce a switching signal having a first and a second value when said local pseudo noise code sequence is in and out of said synchronized state, respectively;

a first-stage and a second-stage multiplier;
first switching means responsive to said switching signal for making said first-stage multiplier multiply said input spread spectrum signal by said local pseudo noise code sequence to product a first-stage multiplier output signal only when said switching signal has said first value;

a bypass filter for rejecting a d.c. component from said first-stage multiplier output signal to produce a d.c. component rejected signal; and second switching means responsive to said switching signal for making said second-stage multiplier multiply said d.c. component rejected signal by said local pseudo noise code sequence to produce a substantial reproduction of said input spread spectrum signal only when said switching signal has said first value;

said transmission pseudo noise code sequence supplying means supplying said substantial reproduction multiplexed with said transmission pseudo noise code sequence.

7. A particular transmitter-receiver as claimed in claims 5 or 6, said different pseudo noise code sequence being assigned to said specific modems, respectively, said first pseudo noise code sequence being the pseudo noise code sequence assigned to said one specific modem, said transmission information signal being for reception by a preselected one of said remaining specific modems, said second pseudo noise code sequence being the pseudo noise code sequence assigned to said preselected modem, wherein said combining means comprises:

low frequency component rejecting means for rejecting said low frequency component from said first multiplied signal to produce a low frequency component rejected signal;

third multiplying means for multiplying said low frequency component rejected signal by said first pseudo noise code sequence generated by said pseudo noise code sequence generating means to produce a third multiplied signal; and adding means for adding said second and said third multiplied signal into said transmission spread spectrum signal.

8. A particular transmitter-receiver as claimed in claims 5 or 6, said different pseudo noise code sequences being a plurality of different maximum length code sequences generated by clocks having a predetermined clock period in compliance with a single generating polynomial and with different initial values, respectively, said synchronizing pseudo noise code sequence being a synchronizing maximum length code sequence generated by clocks having said predetermined clock period in compliance with a different generating polynomial specifying said predetermined frame period and with said predetermined initial value, said different maximum length code sequences being assigned to said one and said remaining specific modems, respectively, said first pseudo noise code sequence being a first of said maximum length code sequences that is assigned to said one specific modem, said transmission information signal being for reception by a preselected one of said remaining specific modems, wherein,
    said pseudo noise code sequence generating means is for generating a second of said different maximum length code sequences as said second pseudo noise code sequence that is selected in consideration of said preselected modem;
    said combining means comprising:
        low frequency component rejecting means for rejecting said low frequency component from said first multiplied signal to produce a low frequency component rejected signal; and
        adding means for adding said low frequency component rejected signal and said second multiplied signal into said transmission spread spectrum signal.

9. A particular transmitter-receiver as claimed in claims 5 or 6, said different pseudo noise code sequences being a plurality of different maximum length code sequences generated by clocks having a predetermined clock period in compliance with a single generating polynomial and with different initial values, respectively, said synchronizing pseudo noise code sequence being a synchronizing maximum length code sequence generated by clocks having said predetermined clock period in compliance with a different generating polynomial specifying said predetermined frame period and with said predetermined initial value, said different maximum length code sequences being assigned to said one and said remaining specific modems, respectively, said first pseudo noise code sequence being a first of said different maximum length code sequences that is assigned to said one specific modem, said transmission information signal being for reception by a preselected one of said remaining specific modems, wherein:
    said pseudo noise code sequence generating means is for generating a second of said different maximum length code sequences as said second pseudo noise code sequence that is selected in consideration of said preselected modem;
    said combining means comprising:
        adding means for adding said first and said second multiplied signals into a sum signal; and
        low frequency component rejecting means for rejecting at least said low frequency component from said sum signal to produce said transmission spread spectrum signal.

10. A transmitter-receiver as claimed in Claim 1, said transmission line comprising a closed-loop transmission line, said modems comprising a plurality of specific modems coupled to said closed-loop transmission line, said different pseudo noise code sequences excepting a predetermined one thereof being assigned to said specific modems, respectively, said predetermined pseudo noise code sequence being assigned in common to said specific modems, said each modem being each of said specific modems, said first pseudo noise code sequence being the pseudo noise code sequence assigned to said each specific modem, said second pseudo noise code sequence being the pseudo noise code sequence assigned to a preselected one of said specific modems, said each specific modem being operable in a selected one of a communicating mode of transmitting said transmission information signal to said preselected modem and receiving said particular information signal from said preselected modem, a carrier sensing mode of sensing whether said second pseudo noise code sequence is present or absent in said first spread spectrum signal, a broadcast transmitting mode of transmitting said transmission information signal to others of said specific modems as said second spread spectrum signal, and a broadcast receiving mode of receiving a broadcast spread spectrum signal supplied thereto as said first spread spectrum signal, wherein:
    said pseudo noise code sequence generating means comprises:
        first pseudo noise code sequence generating means for generating said predetermined and said first pseudo noise code sequences as said at least one pseudo noise code sequence in said broadcast transmitting mode and in each of said broadcast receiving, said carrier sensing, and said communicating modes, respectively; and
        second pseudo noise code sequence generating means for generating said predetermined and said second pseudo noise code sequences as said at least one pseudo noise code sequence in each of said broadcast receiving and transmitting modes and in each of said carrier sensing and said communicating modes, respectively;
    said first multiplying means being for further multiplying said first spread spectrum signal by the pseudo noise code sequence generated by said first pseudo noise code sequence generating means as said predetermined pseudo noise code sequence to produce said first multiplied signal;
    said second multiplying means being for further multiplying said input signal by the pseudo noise code sequence generated by said second pseudo noise code sequence generating means as said predetermined pseudo noise code sequence to produce said second multiplied signal;
    said transmitter-receiver further comprising control signal producing means for producing a control signal having a first and a second value in each of said broadcast receiving and said carrier sensing modes and in each of said broadcast transmitting and said communicating modes, respectively;
    said transmission information signal supplying means comprising a first switch responsive to the control signal of said first value for supplying said reception spread spectrum signal to said second multiplying means as said input signal and responsive to the control signal of said second value for supplying said transmission information signal to said second multiplying means as said input signal;
    said combining means comprising:
        low frequency component rejecting means for rejecting said low frequency component from said first multiplied signal to produce a low frequency component rejected signal;
        third multiplying means for multiplying said low frequency component rejected signal by the pseudo noise code sequence generated by said first pseudo noise code sequence generating means as either of said predetermined and said first pseudo noise code sequences to produce a third multiplied signal;

adding means for adding said first multiplied signal and an addend signal into said transmission spread spectrum signal;

and a second switch responsive to the control signal of said first value for supplying no signal to said adding means as said addend signal and instead producing said second multiplied signal as a switch output signal and responsive to the control signal of said second value for supplying said second multiplied signal to said adding means as said addend signal;

said transmitter-receiver still further comprising means responsive to said switch output signal for reproducing the particular information signal included in said broadcast spread spectrum signal and for sensing whether said second pseudo noise code sequence is present or absent in said first spread spectrum signal.

11. A transmitter-receiver as claimed in Claim 1, said different pseudo noise code sequences being generated by clocks having a predetermined clock period in compliance with a single generating polynomial with different initial values, respectively, said predetermined clock period defining a predetermined frequency band, said transmission information signal being for reception by a preselected one of said modems, wherein:

said predetermined frequency band is made to comprise first through I-th partial frequency bands having a substantially common partial bandwidth and not substantially overlapping each other, where I represents a predetermined integer greater than unity;

said modems being classified into first through I-th groups, each group consisting of at least two of said modems, said first through said I-th partial frequency bands being allotted to said first through said I-th groups, respectively, different ones of said different pseudo noise code sequences being assigned to the respective modems in each group, said each modem being a modem in a group allotted with a particular one of said partial frequency bands, said preselected modem being a modem in a group allotted with a preselected one of said partial frequency bands, said first spread sprectrum signal comprising a particular spread spectrum component in said particular partial frequency band;

said reception spread spectrum signal producing means comprising means for extracting said particular spread spectrum component from said first spread spectrum signal as said reception spread spectrum signal;

said combining means comprising:

first through I-th filters having passbands at said first through said I-th partial frequency bands, respectively;

means for selecting one of said first through said I-th filters that has a passband at said preselected partial frequency band, said selected filter being responsive to said second multiplied signal for producing a partial band spread spectrum signal in said preselected partial frequency band;

particular spread spectrum component rejecting means for rejecting said particular spread spectrum component from said first spread spectrum signal to produce a particular spread spectrum component rejected signal; and composing means for composing said first multiplied signal, said partial band spread spectrum signal, and said particular spread spectrum component rejected signal into said transmission spread spectrum signal with said low frequency component rejected from said first multiplied signal.

12. A transmitter-receiver as claimed in claim 11, said transmission line comprising a closed-loop transmission line, the modems of said first through said I-th groups comprising a plurality of specific modems coupled to said closed-loop transmission line, each of said first through said I-th groups consisting of at least two of said specific modems, different ones of said different pseudo noise code sequences being assigned to the specific modems in each group, respectively, said each modem being a specific modem that is in the group allotted with said particular partial frequency band and that is assigned with said first pseudo noise code sequence, said preselected modem being a specific modem that is in the group allotted with said preselected partial frequency band and that is assigned with said second pseudo noise code sequence, wherein said composing means comprises:

low frequency component rejecting means for rejecting said low frequency component from said first multiplied signal to produce a low frequency component rejected signal;

third multiplying means for multiplying said low frequency component rejected signal by the first pseudo noise code sequence generated by said pseudo noise code sequence generating means to produce a third multiplied signal; and adding means for adding said third multiplied signal, said partial band spread spectrum signal, and said particular spread spectrum component rejected signal into said transmission spread spectrum signal.

13. A transmitter-receiver as claimed in claims 11 or 12, said first spread spectrum signal including a synchronizing pseudo noise code sequence generated by clocks having said predetermined clock period in compliance with a different generating polynomial and with a predetermined initial value, wherein said transmitter-receiver further comprises:

synchronizing signal regenerating means responsive to said reception spread spectrum signal for regenerating said synchronizing pseudo noise code sequence; and means for supplying said regenerated synchronizing pseudo noise code sequence to said pseudo noise code sequence generating means to synchronize the first pseudo noise code sequence generated thereby to the first pseudo noise code sequence carrying said particular information signal in said first spread spectrum signal;

said composing means producing said transmission spread spectrum signal with the synchronizing pseudo noise code sequence included in said first spread spectrum signal substantially included therein.

14. A transmitter-receiver as claimed in claim 11, said transmission line comprising a closed-loop transmission line, the modems of said first through said I-th groups comprising a plurality of specific modems coupled to said closed-loop transmission line, each of said first through said I-th groups consisting of at least two of said specific modems, said different pseudo noise code sequences being a plurality of different maximum length code sequences generated by clocks having said predetermined clock period in compliance with a single generating polynomial and with said different initial values, respectively, different ones of said maximum length code sequences being assigned to the specific modems in each group, respectively, said first pseudo noise code sequence being a first of said maximum length code sequences, said each modem being a specific modem that is in the group allotted with said particular partial frequency band and that is assigned with said first maximum length code sequence, said preselected modem being a specific modem that is in the group allotted with said preselected partial frequency band, wherein:
said pseudo noise code sequence generating means is for generating a second of said maximum length code sequences as said second noise code sequence that is selected in consideration of said preselected modem;
said composing means comprising:
low frequency component rejecting means for rejecting said low frequency component from said first multiplied signal to produce a low frequency component rejected signal; and
adding means for adding said low frequency component rejected signal, said partial band spread spectrum signal, and said particular spread spectrum component rejected signal into said transmission spread spectrum signal.

15. A transmitter-receiver as claimed in claim 1, said transmission line comprising a closed-loop transmission line, said modems comprising a plurality of specific modems coupled to said closed-loop transmission line, said different pseudo noise code sequences being a plurality of different maximum length code sequences generated by clocks having a predetermined clock period in compliance with a single generating polynomial and with different initial values, respectively, said predetermined clock period defining a predetermined frequency band, said transmission information signal being for reception by a preselected one of said specific modems, wherein:
said predetermined frequency band is made to comprise first through I-th partial frequency bands having a substantially common partial bandwidth and not substantially overlapping each other, where I represents a predetermined integer greater than unity;
said specific modems being classified into first through I-th groups, each group consisting of at least two of said specific modems, said first through said I-th partial frequency bands being allotted to said first through said I-th groups, respectively, different ones of said maximum length code sequences being assigned to the specific modems in each group, respectively, said first pseudo noise code sequence being a first of said maximum length code sequences, said each modem being a specific modem that is in a group allotted with a particular one of said partial frequency bands and that is assigned with said first maximum length code sequence, said preselected modem being in a group allotted with a preselected one of said partial frequency bands, said first spread spectrum signal comprising a particular spread spectrum component in said particular partial frequency band;
said reception spread spectrum signal producing means comprising means for extracting said particular spread spectrum component from said first spread spectrum signal as said reception spread spectrum signal;
said pseudo noise code sequence generating means being for generating a second of said maximum length code sequences as said second pseudo noise code sequence that is selected in consideration of said preselected modem;
said combining means comprising:
adding means for adding said first and said second multiplied signals into a sum signal;
low frequency component rejecting means for rejecting at least said low frequency component from said sum signal to produce a low frequency component rejected signal;
first through I-th filters having passbands at said first through said I-th partial frequency bands, respectively;
means for selecting one of said first through said I-th filters that has a passband at said preselected partial frequency band, said selected filter being responsive to said low frequency component rejected signal for producing a partial band spread spectrum signal in said preselected partial frequency band;
particular spread spectrum component rejecting means for rejecting said particular spread spectrum component from said first spread spectrum signal to produce a particular spread spectrum component rejected signal; and
composing means for composing said low frequency component rejected signal, said partial band spread spectrum signal, and said particular spread spectrum component rejected signal into said transmission spread spectrum signal.

16. A transmitter-receiver as claimed in claims 14 or 15, said first spread spectrum signal including a synchronizing maximum length code sequence generated by clocks having said predetermined clock period in compliance with a different generating polynomial and with a predetermined initial value, wherein said transmitter-receiver further comprises:
synchronizing signal regenerating means responsive to said reception spread spectrum signal for regenerating said synchronizing maximum length code sequence; and
means for supplying said regenerated synchronizing maximum length code sequence to said pseudo noise code sequence generating means to synchronize the first maximum length code sequence generated thereby to the first maximum length code sequence carrying said particular information signal in said first spread spectrum signal;
said composing means producing said transmission spread spectrum signal with the synchronizing maximum length code sequence included in said first spread spectrum signal substantially included therein.

17. A transmitter-receiver as claimed in any one of claims 11, 12, 14, and 15, wherein:
said predetermined frequency band is made to further comprise a synchronizing signal transmission band at a center portion of said predetermined frequency band so as not to substantially overlap said first through said I-th partial frequency bands, said first spread spectrum signal including a synchronizing signal in said synchronizing signal transmission band;

said reception spread spectrum signal producing means further comprising:
a band-pass filter having a passband at said synchronizing signal transmission band for deriving said synchronizing signal from said first spread spectrum signal; and
means for supplying said derived synchronizing signal to said pseudo noise code sequence generating means to synchronize the first pseudo noise code sequence generated thereby to the first pseudo noise code sequence carrying said particular information signal in said first spread spectrum signal;
said composing means producing said particular spread spectrum component rejected signal with the synchronised signal included in said first spread spectrum signal included therein.

18. A transmitter-receiver as claimed in claim 1, said modems dealing with information signals of a plurality of different data clock periods, each of said particular and said transmission information signals having one of said different data clock periods, wherein:
said different pseudo noise code sequences consist of pseudo noise code sequences of a first through a Q-th family, where Q represents a predetermined integer greater than unity, said first-family pseudo noise code sequences being for at least one of said modems that deals with information signals of a shortest of said different data clock periods, said Q-th-family pseudo noise code sequences being for at least one of said modems that deals with information signals of a longest of said different data clock periods, said first-family through said Q-th-family pseudo noise code sequences being given by pseudo noise code sequences of a first through a Q-th kind, said first-kind pseudo noise code sequences being generated by clocks having a first clock period in compliance with a first generating polynomial specifying a first frame period not longer than said shortest data clock period and with different initial values, respectively, the q-th-kind pseudo noise code sequences being generated by clocks having a q-th clock period in compliance with a q-th generating polynomial specifying a q-th frame period and with different initial values, respectively, where q represents an integer between two and Q, both inclusive, said q-th clock period being equal to an integral multiple of the (q−1)-th frame period, said integral multiple being selected from natural numbers for each of the second through the Q-th clock periods, the Q-th frame period being not longer than said longest data clock period, said first-family pseudo noise code sequences being given by those of said first-kind pseudo noise code sequences, respectively, which are preselected with at least one first-kind pseudo noise code sequence left remaining, each of the q-th family pseudo noise code sequences being given by a product of a first through a q-th component pseudo noise code sequence, the first through the (q−1)-th component pseudo noise code sequence being those preselected one from the at least one remaining pseudo noise code sequences of each of the first through the (q−1)-th kinds, the q-th component pseudo noise code sequence being one preselected from the q-th-kind pseudo noise code sequences with at least one q-th-kind pseudo noise code sequence left remaining unless q is equal to Q, each component pseudo noise code sequence used to provide said product being preselected so as not to be in duplication with any one of the component pseudo noise code sequences used to provide the products for others of said q-th-family pseudo noise code sequences;
said pseudo noise code sequence generating means being for generating at least one q'-th-family pseudo noise code sequence as said first and said second pseudo noise code sequences, where q' represents an integer selected between unity and Q, both inclusive, so that the q'-th frame period be not longer than said one data clock period and nearest thereto among said first through said Q-th frame periods.

19. A transmitter-receiver as claimed in claim 18, said transmission line comprising a closed-loop transmission line, said modems comprising a plurality of specific modems coupled to said closed-loop transmission line, said first-family through said Q-th-family pseudo noise code sequences being assigned to said specific modems according to the data clock periods of information signals thereby dealt with, said each modem being each of said specific modems, said first pseudo noise code sequence being a first of said q'-th-family pseudo noise code sequences that is assigned to said each specific modem, said transmission information signal being for reception by a preselected one of said specific modems that deals with information signals of said one data clock period, said second pseudo noise code sequence being a second of said q'-th-family pseudo noise code sequences that is assigned to said preselected modem, wherein said combining means comprises:
low frequency component rejecting means for rejecting said low frequency component from said first multiplied signal to produce a low frequency component rejected signal;
third multiplying means for multiplying said low frequency component rejected signal by the first q'-th-family pseudo noise code sequence to produce a third multiplied signal; and
adding means for adding said second and said third multiplied signals into said transmission spread spectrum signal.

20. A transmitter-receiver as claimed in claim 1, said modems dealing with information signals of a plurality of different data clock periods, each of said particular and said transmission information signals having one of said different data clock periods, wherein:
said different pseudo noise code sequences consist of pseudo noise code sequences of a first through a Q-th family, where Q represents a predetermined integer greater than unity, said first-family pseudo noise code sequences being for at least one of said modems that deals with information signals of a shortest of said different data clock periods, said Q-th-family pseudo noise code sequences being for at least one of said modems that deals with information signals of a longest of said different data clock periods, said first-family through said Q-th-family pseudo noise code sequences being given by pseudo noise code sequences of a first through a Q-th kind, said first-kind pseudo noise code sequences being generated by clocks having a first clock period in compliance with a first generating polynominal specifying a first frame period not longer than said shortest data clock period and with different initial values, respectively, the q-th-kind pseudo noise code sequences being generated by clocks having a q-th clock period in compliance with a q-th generating polynominal specifying a q-th frame period and with different initial values, respectively, where q represents an integer between two and Q, both inclusive, said q-th clock period being equal to an integral multiple of the (q−1)-th frame period, said integral multiple being selected from natural numbers for each of the second through the Q-th clock periods, the Q-th frame period being not longer than said longest data clock period, said first-family pseudo noise code sequences being given by combinations of a first set, respectively, each first-set combination consisting of only one pseudo noise code sequence preselected from said first-kind pseudo noise code sequence with at least one first-kind pseudo noise code sequence left remaining, each of the q-th-family pseudo noise code sequences being given by a product of a first through a q-th component pseudo noise code sequence, the first through the (q−1)-th component pseudo noise code sequencies being those preselected one from the at least one remaining pseudo noise code sequences of each of the first through the (q−1)-th kinds, the q-th component pseudo noise code sequence being one preselected from the q-th-kind pseudo noise code sequences with at least one q-th-kind pseudo noise code sequence left remaining unless q is equal to Q, each of said first through said q-th component pseudo noise code sequences used to provide said product being preselected so as not to be in duplication with any one of the first through the q-th component pseudo noise code sequences which are used to provide the products for others of said q-th-family pseudo noise code sequences;

said pseudo noise code sequence generating means being for generating at least one component pseudo noise code sequence of the q'-th-set combination for use as said first and said second pseudo noise code sequences, where q' represents an integer selected between unity and Q, both inclusive, so that the q'-th frame period be not longer than said one data clock period and be nearest thereto among said first through said Q-th frame periods;

said first multiplying means comprising means for producing said first multiplied signal by multiplying said reception spread spectrum signal in a predetermined order by the at least one component pseudo noise code sequence of said q'-th-set combination for use as said first pseudo noise code sequence;

said second multiplying means comprising means for producing said second multiplied signal by multiplying said transmission information signal in a preselected order by the at least one component pseudo noise code sequence of said q'-th-set combination for use as said second pseudo noise code sequence.

21. A transmitter-receiver as claimed in claim 20, said transmission line comprising a closed-loop transmission line, said modems comprising a plurality of specific modems coupled to said closed-loop transmission line, said first-family through said Q-th-family pseudo noise code sequences being assigned to said specific modems, respectively, according to the data clock periods of information signals thereby dealt with, said each modem being each of said specific modems, said first pseudo noise code sequence being a first of the q'-th-family pseudo noise code sequences that is assigned to said each specific modem, said transmission information signal being for reception by a preselected one of said specific modems that deals with information signals of said one data clock period, said second pseudo noise code sequence being a second of said q'-th-family pseudo noise code sequence that is assigned to said preselected modem, wherein said combining means comprises:

low frequency component rejecting means for rejecting said low frequency component from said first multiplied signal to produce a low frequency component rejected signal;

third multiplying means for multiplying said low frequency component rejected signal in said preselected order by the at least one component pseudo noise code sequence of said q'-th-set combination for use as said first pseudo noise code sequence, said third multiplying means thereby producing a third multiplied signal; and adding means for adding said second and said third multiplied signals into said transmission spread spectrum signal.

22. A transmitter-receiver as claimed in claim 1 and being further responsive to a first time division multiplex signal comprising a particular bit sequence and received through said transmission line for reproducing said particular bit sequence and responsive to an input information signal for supplying said transmission line with a second time division multiplex signal comprising a transmission bit sequence representative of said input information signal, said different pseudo noise code sequences being generated by clocks having a predetermined clock period in compliance with a single generating polynominal and with different initial values, respectively, said predetermined clock period defining a predetermined frequency band, wherein:

said predetermined frequency band is divided into an upper and a lower frequency band, said upper frequency band being not narrower than about a fifth of said predetermined frequency band and being for transmitting the first and the second spread spectrum signals having a frequency band restricted to said upper frequency band, said lower frequency band being for transmitting the first and the second time division multiplex signals having a frequency band restricted to said lower frequency band;

said reception spread spectrum signal producing means comprising an input high-pass filter responsive to said first band restricted spread spectrum signal for producing said reception spread spectrum signal;

said second spread spectrum signal supplying means comprising an output high-pass filter responsive to said transmission spread spectrum signal for producing said second band restricted spread spectrum signal as said second spread spectrum signal;

said transmitter-receiver further comprising:

an input low-pass filter responsive to said first band restricted time division multiplex signal for producing a received time division multiplex signal;

means responsive to said received time division multiplex signal for separating said particular bit sequence from other bit sequences comprised by said received time division multiplex signal to reproduce said particular bit sequence;

means responsive to said input information signal for producing said transmission bit sequence;

means for multiplexing said transmission and said other bit sequences into a transmission time division multiplex signal, and an output low-pass filter responsive to said transmission time division multiplex signal for producing said second band restricted time division multiplex signal.

23. In a transmitter-receiver for use in a spread spectrum multiplex communication network comprising an up and a down transmission line and a plurality of modems coupled to said up and said down transmission lines, said transmitter-receiver being comprised by each of said modems to be responsive to a first spread spectrum signal received from said down transmission line and comprising a spread spectrum signal into which a first of a plurality of different pseudo noise code sequences is modulated by a particular information signal for reproducing said particular information signal and to be responsive to a transmission information signal for supplying towards a preselected one of said modems through said up transmission line a second spread spectrum signal comprising a spread spectrum signal into which a second of said pseudo noise code sequences is modulated by said transmission information signal, said transmitter-receiver including reception spread spectrum signal producing means responsive to said first spread spectrum signal for producing a reception spread spectrum signal, pseudo noise code sequence generating means for generating at least one of said different pseudo noise code sequences as said first and said second pseudo noise code sequences, first multiplying means for multiplying said reception spread spectrum signal by the first pseudo noise code sequence generated by said pseudo noise code sequence generating means to produce a first multiplied signal, low frequency component extracting means for extracting a low frequency component from said first multiplied signal to produce a low frequency signal, means responsive to said low frequency signal for producing said particular information signal, second multiplying means for multiplying said transmission information signal by the second pseudo noise code sequence generated by said pseudo noise code sequence generating means to produce a second multiplied signal, and second spread spectrum signal supplying means for supplying said second multiplied signal as said second spread spectrum signal to said up transmission line, said different pseudo noise code sequences being generated by clocks having a predetermined clock period in compliance with a single generating polynomial and with different initial values, respectively, said predetermined clock period defining a predetermined frequency band, the improvement wherein:

said predetermined frequency band is made to comprise first through I-th partial frequency bands having a substantially common partial bandwidth and not substantially overlapping each other, where I represents a predetermined integer greater than unity;

said modems being classified into first through I-th groups, each group consisting of at least two of said modems, said first through said I-th partial frequency bands being allotted to said first through said I-th groups, respectively, different ones of said different pseudo noise code sequences being assigned to the respective modems in each group, said each modem being a modem in a group allotted with a particular one of said partial frequency bands, said preselected modem being a modem in a group allotted with a preselected one of said partial frequency bands, said first spread spectrum signal comprising a particular spread spectrum component in said particular partial frequency band;

said reception spread spectrum signal producing means comprising means for extracting said particular spread spectrum component from said first spread spectrum signal as said reception spread spectrum signal;

said second spread spectrum signal supplying means comprising:

first through I-th filters having passbands at said first through said I-th partial frequency bands, respectively;

and means for selecting one of said first through said I-th filters that has a passband at said preselected partial frequency band, said selected filter being responsive to said second multiplied signal for producing said second spread spectrum signal in said preselected partial frequency band.

24. A transmitter-receiver as claimed in claim 23, wherein:

said predetermined frequency band is made to further comprise a synchronizing signal transmission band at a center portion of said predetermined frequency band so as not to substantially overlap said first through said I-th partial frequency bands, said first spread spectrum signal including a synchronizing signal in said synchronizing signal transmission band;

said reception spread spectrum signal producing means further comprising:

a band-pass filter having a passband at said synchronizing signal transmission band for deriving said synchronizing signal from said first spread spectrum signal; and means for supplying said derived synchronizing signal to said pseudo noise code sequence generating means to synchronize the first pseudo noise code sequence generated thereby to the first pseudo noise code sequence carrying said particular information signal in said first spread spectrum signal.

25. In a transmitter-receiver for use in a spread spectrum multiplex communication network comprising an up and a down transmission line and a plurality of modems coupled to said up and said down transmission lines and dealing with information signals of a plurality of different data clock periods, said transmitter-receiver being comprised by a modem dealing with information signals of one of said different data clock periods to be responsive to a first spread spectrum signal received from said down transmission line and comprising a spread spectrum signal into which a first of different pseudo noise code sequences is modulated by a particular information signal having said one data clock period for reproducing said particular information signal and to be responsive to a transmission information signal having said one data clock period for supplying towards a preselected one of the modems dealing with information signals of said one data clock period through said up transmission line a second spread spectrum signal comprising a spread spectrum signal into which a second of said pseudo noise code sequences is modulated by said transmission information signal, said transmitter-receiver including reception spread spectrum signal producing means responsive to said first spread spectrum signal for producing a reception spread spectrum signal, pseudo noise code sequence generating means for generating at least one of said different pseudo noise code sequences as said first and said second pseudo noise code sequences, first multiplying means for multiplying said reception spread spectrum signal by the first pseudo noise code sequence generated by said pseudo noise code sequence generating means to produce a first multiplied signal, low frequency component extracting means for extracting a low frequency component from said first multiplied signal to produce a low frequency signal, means responsive to said low frequency signal for producing said particular information signal, second multiplying means for multiplying said transmission information signal by the second pseudo noise code sequence generated by said pseudo noise code sequence generating means to produce a second multiplied signal, and second spread spectrum signal supplying means for supplying said second multiplied signal as said second spread spectrum signal, the improvement wherein:

said different pseudo noise code sequences consist of pseudo noise code sequences of a first through a Q-th family, where Q represents a predetermined integer greater than unity, said first-family pseudo noise code sequences being for at least one modem dealing with information signals of a shortest of said different data clock periods, said Q-th-family pseudo noise code sequences being for at least one modem dealing with information signals of a longest of said different data clock rates, said first-family through said Q-th-family pseudo noise code sequences being given by pseudo noise code sequences of a first through a Q-th kind, said first-kind pseudo noise code sequences being generated by clocks having a first clock period in compliance with a first generating polynomial specifying a first frame period not longer than said shortest data clock period and with different initial values, respectively, the q-th-kind pseudo noise code sequences being generated by clocks having a q-th clock period in compliance with a q-th generating polynomial specifying a q-th frame period and with different initial values, respectively, where q represents an integer between two and Q, both inclusive, said q-th clock period being equal to an integral multiple of the (q−1)-th frame period, said integral multiple being selected from natural numbers for each of the second through the Q-th clock periods, the Q-th frame period being not longer than said longest data clock period, said first-family pseudo noise code sequences being given by those of said first-kind pseudo noise code sequences, respectively, which are preselected with at least one first-kind pseudo noise code sequence left remaining, each of the q-th-family pseudo noise code sequences being given by a product of a first through a q-th component pseudo noise code sequences, the first through the (q−1)-th component pseudo noise code sequences being those preselected one from the at least one remaining pseudo noise code sequence of each of the first through the (q−1)-th kinds, the q-th component pseudo noise code sequence being one preselected from the q-th-kind pseudo noise code sequences with at least one q-th-kind pseudo noise code sequence left remaining unless q is equal to Q, each of said first through said q-th component pseudo noise code sequences used to provide said product being preselected so as not to be in duplication with any one of the first through the q-th component pseudo noise code sequences used to provide the products for others of said q-th-family pseudo noise code sequences;

said pseudo noise code sequence generating means being for generating at least one q'-th-family pseudo noise code sequence as said first and said second pseudo noise code sequences, where q' represents an integer selected between unity and Q, both inclusive, so that the q'-th frame period be not longer than said one data clock period and be nearest thereto among said first through said Q-th frame periods.

26. In a transmitter-receiver for use in a spread spectrum multiplex communication network comprising an up and a down transmission line and a plurality of modems coupled to said up and said down transmission lines and dealing with information signals of a plurality of different data clock periods, said transmitter-receiver being comprised by a modem dealing with information signals of one of said different data clock periods to be responsive to a first spread spectrum signal received from said down transmisson line and comprising a spread spectrum signal into which a first of different pseudo noise code sequences is modulated by a particular information signal having said one data clock period for reproducing said particular information signal and to be responsive to a transmissfon information signal having said one data clock period for supplying towards a preselected one of the modems dealing with information signals of said one data clock period through said up transmission line a second spread spectrum signal comprising a spread spectrum signal into which a second of said pseudo noise code sequences is modulated by said transmission information signal, said transmitter-receiver including reception spread spectrum signal producing means responsive to said first spread spectrum signal for producing a reception spread spectrum signal, pseudo noise code sequence generating means for generating at least one of said different pseudo noise code sequences as said first and said second pseudo noise code sequences, first multiplying means for multiplying said reception spread spectrum signal by the first pseudo noise code sequence generated by said pseudo noise code sequence generating means to produce a first multiplied signal, low frequency component extracting means for extracting a low frequency component from said first multiplied signal to produce a low frequency signal, means responsive to said low frequency signal for producing said particular information signal, second multiplying means for multiplying said transmission information signal by the second pseudo noise code sequence generated by said pseudo noise code sequence generating means to produce a second multiplied signal, and second spread spectrum signal supplying means for supplying said second multiplied signal as said second spread spectrum signal, the improvement wherein:

said different pseudo noise code sequences consist of pseudo noise code sequences of a first through a Q-th family, where Q represents a predetermined integer greater than unity, said first-family pseudo noise code sequences being for at least one modem dealing with information signals of a shortest of said different data clock periods, said Q-th-family pseudo noise code sequences being for at least one modem dealing with information signals of a longest of said different data clock periods, said first-family through said Q-th-family pseudo noise code sequences being given by pseudo noise code sequences of a first through a Q-th kind said first-kind pseudo noise code sequences being generated by clocks having a first clock period in compliance with a first generating polynomial specifying a first frame period not longer than said shortest data clock period and with different initial values, respectively, the q-th-kind pseudo noise code sequences being generated by clocks having a q-th clock period in compliance with a q-th generating polynomial specifying a q-th frame period and with different initial values, respectively, where q represents an integer between two and Q, both inclusive, said q-th clock period being equal to an integral multiple of the (q−1)-th frame period, said integral multiple being selected from natural numbers for each of the second through the Q-th clock periods, the Q-th frame period being not longer than said longest data clock period, said first-family pseudo noise code sequences being given by combinations of a first set, respectively, each first-set combination consisting of only one pseudo noise code sequence preselected from said first-kind pseudo noise code sequences with at least one first-kind pseudo noise code sequence left remaining, each of the q-th-family pseudo noise code sequences being given by a product of a first through a q-th component pseudo noise code sequences, the first through the (q−1)-th component pseudo noise code sequences being those preselected one from the at least one remaining pseudo noise code sequence of each of the first through the (q−1)-th kinds, the q-th component pseudo noise code sequence being one preselected from the q-th-kind pseudo noise code sequences with at least one q-th-kind pseudo noise code sequence left remaining unless q is equal to Q, each of said first through said q-th component pseudo noise code sequences used to provide said product being preselected so as not to be in duplication with any one of the first through the q-th component pseudo noise code sequences which are used to provide the products for others of said q-th-family pseudo noise code sequences;

said pseudo noise code sequences generating means being for generating at least one component pseudo noise code sequence of the q'-th-set combination for use as said first and said second pseudo noise code sequences, where q' represents an integer selected between unity and Q, both inclusive, so that the q'-th frame period be not longer than said one data clock period and be nearest thereto among said first through said Q-th frame periods;

said first multiplying means comprising means for producing said first multiplied signal by multiplying said reception spread spectrum signal in a predetermined order by the at least one component pseudo noise code sequence of said q'-th-set combination for use as said first pseudo noise code sequence;

said second multiplying means comprising means for producing said second multiplied signal by multiplying the transmission information signal supplied thereto in a preselected order by at least one component pseudo noise code sequence of said q'-th-set combination for use as said second pseudo noise code sequence.

* * * * *